United States Patent
Amano et al.

(10) Patent No.: US 11,835,697 B2
(45) Date of Patent: Dec. 5, 2023

(54) ZOOM LENS, PROJECTION DISPLAY DEVICE, AND IMAGING APPARATUS FOR FORMING AN INTERMEDIATE IMAGE

(71) Applicant: FUJIFILM Corporation, Tokyo (JP)

(72) Inventors: Masaru Amano, Saitama (JP); Akiko Nagahara, Saitama (JP); Yukiko Nagatoshi, Saitama (JP); Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/650,444

(22) Filed: Feb. 9, 2022

(65) Prior Publication Data
US 2022/0269053 A1 Aug. 25, 2022

Related U.S. Application Data

(62) Division of application No. 16/686,246, filed on Nov. 18, 2019, now Pat. No. 11,280,986, which is a
(Continued)

(30) Foreign Application Priority Data

Aug. 30, 2016 (JP) ................. 2016-168097

(51) Int. Cl.
*G02B 15/14* (2006.01)
*G02B 13/06* (2006.01)

(52) U.S. Cl.
CPC .......... *G02B 15/144* (2019.08); *G02B 13/06* (2013.01); *G02B 15/142* (2019.08); *G02B 15/145* (2019.08)

(58) Field of Classification Search
CPC ... G02B 9/00; G02B 9/34; G02B 9/60; G02B 15/00; G02B 15/14; G02B 15/16; G02B 15/163
(Continued)

(56) References Cited

U.S. PATENT DOCUMENTS 10,527,828 B2 * 1/2020 Amano ................ G02B 15/145
11,280,986 B2 * 3/2022 Amano ................ G02B 13/16
(Continued)

FOREIGN PATENT DOCUMENTS

JP 2012-108267 A 6/2012
JP 2014-170129 A 9/2014
(Continued)

OTHER PUBLICATIONS

An Office Action mailed by the Japanese Patent Office dated May 28, 2019, which corresponds to Japanese Patent Application No. 2016-168097 and is related to U.S. Appl. No. 15/687,729.
(Continued)

*Primary Examiner* — Arnel C Lavarias
(74) *Attorney, Agent, or Firm* — Studebaker & Brackett PC

(57) ABSTRACT

A zoom lens forms an intermediate image at a position conjugate to a reduction side imaging plane and forms the intermediate image again on a magnification side imaging plane. The zoom lens includes a plurality of lens groups including at least two movable lens groups, which move by changing spacings between the groups adjacent to each other in a direction of an optical axis during zooming, at a position closer to the reduction side than the intermediate image. Among the plurality of lens groups, a final lens group closest to the reduction side has a positive refractive power, and remains stationary with respect to the reduction side imaging plane during zooming. The zoom lens satisfies predetermined conditional expressions (1) and (2) about the focal lengths of the movable lens groups.

21 Claims, 28 Drawing Sheets

Related U.S. Application Data division of application No. 15/687,729, filed on Aug. 28, 2017, now Pat. No. 10,527,828.

(58) Field of Classification Search
USPC ....... 359/362, 363, 432, 434, 642, 676, 683, 359/684, 686, 687, 688, 694, 695, 754, 359/763, 771
See application file for complete search history.

(56) References Cited

U.S. PATENT DOCUMENTS

| | | | |
|---|---|---|---|
| 2012/0120484 A1 | 5/2012 | Konuma et al. | |
| 2013/0229635 A1 | 9/2013 | Lin et al. | |
| 2014/0313589 A1* | 10/2014 | Winterot | G02B 15/146 359/663 |
| 2015/0234167 A1 | 8/2015 | Ode | |
| 2015/0268453 A1 | 9/2015 | Oe et al. | |
| 2017/0153427 A1* | 6/2017 | Masui | G02B 15/145131 |
| 2018/0059385 A1 | 3/2018 | Amano et al. | |
| 2019/0025561 A1 | 1/2019 | Imaoka | |
| 2019/0129285 A1 | 5/2019 | Masui et al. | |

FOREIGN PATENT DOCUMENTS

| | | |
|---|---|---|
| JP | 2015-152890 A | 8/2015 |
| JP | 2015-179270 A | 10/2015 |
| JP | 2016-143032 A | 8/2016 |
| JP | 2017-102239 A | 6/2017 |
| JP | WO2017/195561 A1 | 3/2019 |
| JP | WO2017/195857 A1 | 3/2019 |

OTHER PUBLICATIONS

An Office Action mailed by the Japan Patent Office dated Dec. 17, 2019, which corresponds to Japanese Patent Application No. 2016-168097 and is related to U.S. Appl. No. 16/686,246; with English translation.

* cited by examiner

EXAMPLE 1

EXAMPLE 9
WIDE-ANGLE END

EXAMPLE 11

EXAMPLE 10

EXAMPLE 11

EXAMPLE 12

ZOOM LENS, PROJECTION DISPLAY DEVICE, AND IMAGING APPARATUS FOR FORMING AN INTERMEDIATE IMAGE

CROSS REFERENCE TO RELATED APPLICATIONS

The present application is a Divisional of U.S. application Ser. No. 16/686,246, filed Nov. 18, 2019, which is a Divisional of U.S. application Ser. No. 15/687,729, filed Aug. 28, 2017, and claims priority under 35 U.S.C. § 119 to Japanese Patent Application No. 2016-168097, filed on Aug. 30, 2016. The above applications are hereby expressly incorporated by reference, in its entirety, into the present application.

BACKGROUND OF THE INVENTION

1. Field of the Invention

The present invention relates to a zoom lens forming an intermediate image, a projection display device comprising the zoom lens, and an imaging apparatus comprising the zoom lens.

2. Description of the Related Art

In the past, projection display devices, each of which uses a light valve such as a liquid crystal display element or a Digital Micromirror Device (DMD: registered trademark) display element, have come into widespread use. In particular, some widely used devices adopt a configuration in which three light valves are used, illumination light beams with three primary colors of red, green, and blue respectively correspond to the light valves, synthesizes the light beams, which are modulated through the respective light valves, through a prism or the like, and displays an image onto a screen through a zoom lens.

In such a zoom lens used in a type of the projection display device that synthesizes the light beams modulated through the three light valves through a color synthesis optical system and projects the light beams, as described above, in order for a prism or the like for performing color synthesis to be disposed therein and in order to avoid a thermal problem, a long back focal length is necessary. Further, since spectral characteristics of the color synthesizing prism change depending on an angle of incident light, it is necessary for the projection lens to have the characteristic that the entrance pupil is at a sufficiently far position in a case where the reduction side is set as the incident side, that is, to be telecentric on the reduction side.

It has become necessary for such a type of the zoom lens to perform favorable aberration correction appropriate for the resolutions of light valves. Further, from the viewpoint of installability, in order to cope with the demands to have a high zoom ratio function and to perform projection onto a large screen at a short distance, it is necessary for a zoom lens to have a wider angle of view.

A zoom lens, which forms an intermediate image at a position conjugate to the reduction side imaging plane and forms the intermediate image again on the magnification side imaging plane, has been proposed so as to cope with such demands (for example, JP2015-152890A).

SUMMARY OF THE INVENTION

In a normal zoom lens of a system which does not form an intermediate image, in a case where an increase in angle of view is intended to be achieved by shortening a focal length thereof, the size of the magnification side lens inevitably becomes excessively large. However, in a zoom lens of a system which forms an intermediate image as described above, it is possible to shorten a back focal length of the lens system closer to the magnification side than the intermediate image. Therefore, it is possible to decrease a magnification side lens diameter of the lens system closer to the magnification side than the intermediate image, and this configuration is appropriate for achieving an increase in angle of view by shortening a focal length thereof. However, fluctuation in aberrations becomes large during zooming, and thus a problem arises in that it is difficult to keep optical performance high in the entire zooming range. In the lens system described in JP2015-152890A, a problem also arises in that fluctuation in aberrations is large.

The present invention has been made in consideration of the above-mentioned situation, and its object is to provide a zoom lens of a system that forms an intermediate image and has high performance by satisfactorily suppressing fluctuation in aberrations during zooming while achieving a wide angle, a projection display device comprising the zoom lens, and an imaging apparatus comprising the zoom lens.

A zoom lens of the present invention forms an intermediate image at a position conjugate to a reduction side imaging plane and forms the intermediate image again on a magnification side imaging plane. The zoom lens comprises a plurality of lens groups including at least two movable lens groups, which move by changing spacings between the groups adjacent to each other in a direction of an optical axis during zooming, at a position closer to the reduction side than the intermediate image. Among the plurality of lens groups, a final lens group closest to the reduction side has a positive refractive power, and remains stationary with respect to the reduction side imaging plane during zooming. The zoom lens satisfies the following conditional expressions (1) and (2).

$$0 < |fw|/fA < 0.145 \qquad (1)$$

$$0.01 < |fw|/fB < 0.2 \qquad (2)$$

Here, fw is a focal length of the whole system at a wide-angle end, fA is a focal length of a movable lens group closest to the reduction side among the plurality of movable lens groups, and fB is a focal length of a second movable lens group from the reduction side among the plurality of movable lens groups.

Here, "comprises a plurality of lens groups including at least two movable lens groups, which move by changing spacings between the groups adjacent to each other in a direction of an optical axis during zooming, at a position closer to the reduction side than the intermediate image" the term means that the at least two movable lens groups other than the lens group including the intermediate image are provided at the position closer to the reduction side than the lens group including the intermediate image in a case where the intermediate image is formed in the lens group.

It is preferable that the zoom lens of the present invention satisfies the following conditional expression (1-1) and/or (2-1).

$$0 < |fw|/fA < 0.14 \quad (1\text{-}1)$$

$$0.03 < |fw|/fB < 0.16 \quad (2\text{-}1)$$

The zoom lens may comprise four or five lens groups as a whole. A lens group closest to the magnification side and the final lens group closest to the reduction side may remain stationary with respect to the reduction side imaging plane during zooming. Among lens groups between the lens group closest to the magnification side and the final lens group closest to the reduction side, at least two lens groups may move by changing spacings between the groups adjacent to each other in the direction of the optical axis during zooming.

It is preferable that the zoom lens satisfies the following conditional expression (3), and it is more preferable that the zoom lens satisfies the following conditional expression (3-1).

$$6 < fM/|fw| < 20 \quad (3)$$

$$7 < fM/|fw| < 18 \quad (3\text{-}1)$$

Here, fM is a focal length of the final lens group, and
fw is a focal length of the whole system at the wide-angle end.

It is preferable that the zoom lens satisfies the following conditional expression (4), and it is more preferable that the zoom lens satisfies the following conditional expression (4-1).

$$0 < Y\max/|exPw| < 0.1 \quad (4)$$

$$0 < Y\max/|exPw| < 0.07 \quad (4\text{-}1)$$

Here, Ymax is an effective image circle radius on the reduction side, and
  exPw is a distance on the optical axis from the reduction side imaging plane to a paraxial exit pupil position at the wide-angle end in a case where the reduction side is set as an exit side.

It is preferable that the zoom lens satisfies the following conditional expression (5), and it is more preferable that the zoom lens satisfies the following conditional expression (5-1).

$$2 < Bfw/|fw| \quad (5)$$

$$3 < Bfw/|fw| < 11 \quad (5\text{-}1)$$

Here, Bfw is a back focal length of the whole system as an air conversion length at the wide-angle end, and
  fw is a focal length of the whole system at the wide-angle end.

A projection display device of the present invention comprises: a light source; a light valve into which light originating from the light source is incident; and the zoom lens of the present invention, the zoom lens projecting an optical image, which is formed by light modulated through the light valve, onto a screen.

An imaging apparatus of the present invention comprises the above-mentioned zoom lens of the present invention.

It should be noted that the "magnification side" means a projected side (screen side). Even in a case where projection is performed in a reduced manner, for convenience, the screen side is referred to as the magnification side. On the other hand, the "reduction side" means an image display element side (light valve side). Even in a case where projection is performed in a reduced manner, for convenience, the light valve side is referred to as the reduction side.

Further, the "comprises . . . " means that the zoom lens may include not only the above-mentioned elements but also lenses substantially having no powers, optical elements, which are not lenses, such as a mirror having no power, a stop, a mask, a cover glass, a filter, and the like.

Further, the "lens group" is not necessarily formed of a plurality of lenses, but may be formed of only one lens.

Further, regarding the "back focal length", the following assumption is considered: the magnification side and the reduction side respectively correspond to the object side and the image side of a general imaging lens, and the magnification side and the reduction side are respectively referred to as the front side and the back side.

According to the present invention, a zoom lens forms an intermediate image at a position conjugate to a reduction side imaging plane and forms the intermediate image again on a magnification side imaging plane. The zoom lens comprises the plurality of lens groups including at least two movable lens groups, which move by changing spacings between the groups adjacent to each other in the direction of the optical axis during zooming, at the position closer to the reduction side than the intermediate image. Among the plurality of lens groups, the final lens group closest to the reduction side has a positive refractive power, and remains stationary with respect to the reduction side imaging plane during zooming. The zoom lens satisfies the following conditional expressions (1) and (2). Therefore, it is possible to provide a zoom lens that has high performance by satisfactorily suppressing fluctuation in aberrations during zooming while achieving a wide angle, a projection display device comprising the zoom lens, and an imaging apparatus comprising the zoom lens.

$$0 < |fw|/fA < 0.145 \quad (1)$$

$$0.01 < |fw|/fB < 0.2 \quad (2)$$

DESCRIPTION OF THE PREFERRED EMBODIMENTS

Figure 1:
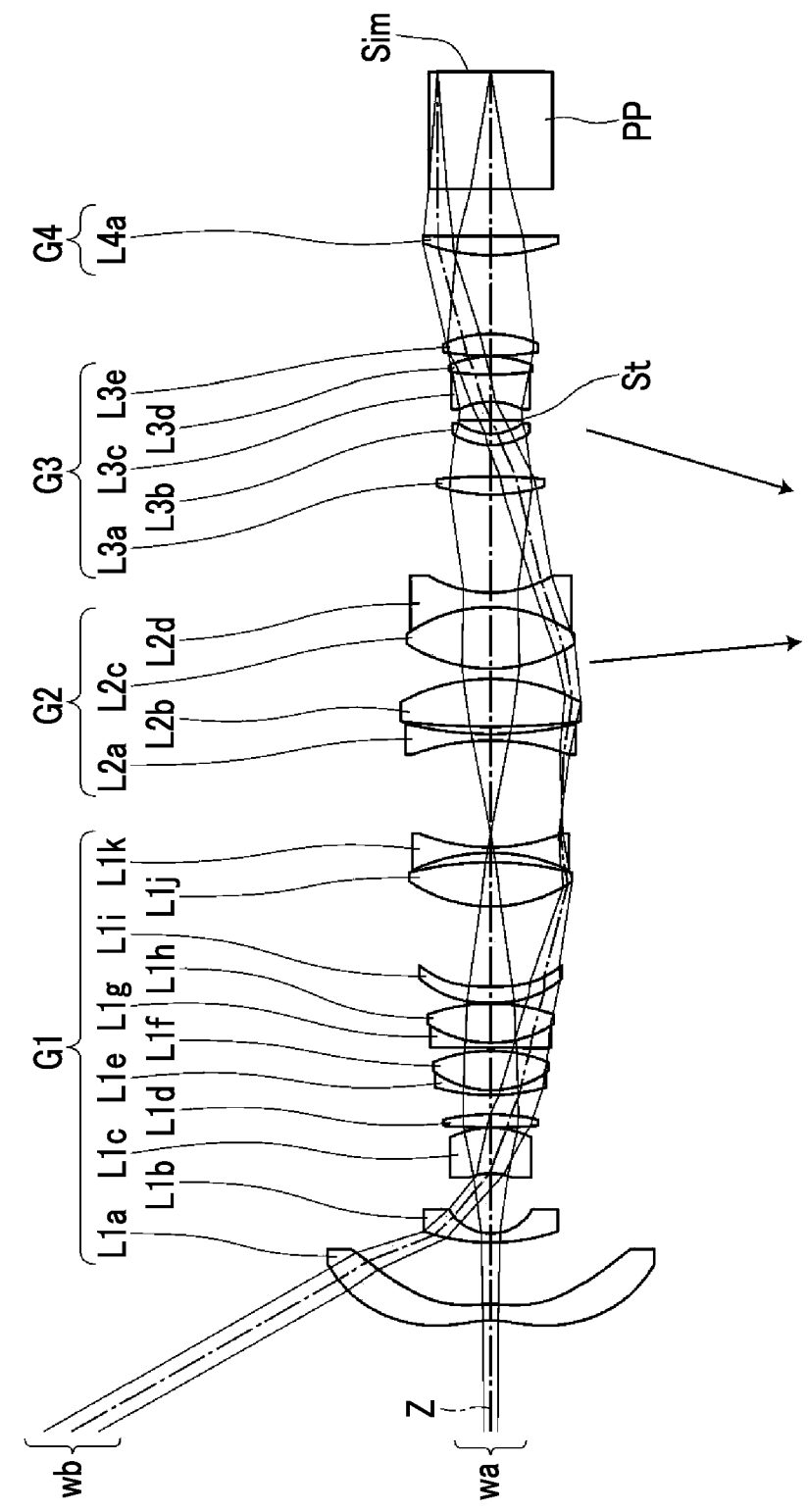
FIG. 1 is a cross-sectional view illustrating a configuration of a zoom lens (common to Example 1) according to an embodiment of the present invention.

Hereinafter, embodiments of the present invention will be described with reference to drawings. FIG. 1 is a cross-sectional view illustrating a configuration of a zoom lens according to an embodiment of the present invention. The exemplary configuration shown in FIG. 1 is the same as the configuration of the zoom lens of Examples 1 to be described later. FIG. 1 shows a state at the wide-angle end, where an image display surface Sim side is the reduction side, a lens L1a side of the first lens group G1 is a magnification side, and an aperture stop St shown in the drawing does not necessarily show its real size and shape, but show a position on an optical axis Z. Further, in FIG. 1, on-axis rays wa and rays with a maximum angle of view wb are also shown together.

This zoom lens is, for example, mounted on a projection display device, and can be used to project image information displayed on the light valve onto the screen. In FIG. 1, assuming that the zoom lens is mounted on the projection display device, an optical member PP such as a filter or a prism used in a color synthesizing section or an illumination light separating section, and an image display surface Sim of a light valve positioned on a reduction side surface of the optical member PP are also shown. In the projection display device, rays, which are made to have image information through the image display surface Sim on the image display element, are incident into the zoom lens through the optical member PP, and are transmitted onto a screen, which is not shown in the drawing, through the zoom lens.

As shown in FIG. 1, the zoom lens of the present embodiment forms an intermediate image at a position conjugate to a reduction side imaging plane (image display surface Sim) and forms the intermediate image again on a magnification side imaging plane. The zoom lens includes a plurality of lens groups including at least two movable lens groups, which move by changing spacings between the groups adjacent to each other in a direction of an optical axis during zooming, at a position closer to the reduction side than the intermediate image. Among the plurality of lens groups, a final lens group closest to the reduction side has a positive refractive power, and remains stationary with respect to the reduction side imaging plane during zooming.

In the example shown in FIG. 1, the zoom lens includes, in order from the magnification side, a first lens group G1, a second lens group G2, a third lens group G3, and a fourth lens group G4. An intermediate image is formed between the first lens group G1 and the second lens group G2. The first lens group G1 and the fourth lens group G4 remain stationary with respect to the reduction side imaging plane (image display surface Sim) during zooming. The second lens group G2 and the third lens group G3 are configured to move by changing spacings of the groups adjacent to each other in the direction of the optical axis during zooming. That is, the second lens group G2 and the third lens group G3 correspond to the movable lens groups, and the fourth lens group G4 corresponds to the final lens group.

In a normal zoom lens of a system which does not form an intermediate image, in a case where an increase in angle of view is intended to be achieved by shortening a focal length thereof, the size of the magnification side lens inevitably becomes excessively large. However, in a manner similar to that of the present embodiment, in a zoom lens of a system which forms an intermediate image, it is possible to shorten a back focal length of the lens system (in the example shown in FIG. 1, the first lens group G1) closer to the magnification side than the intermediate image. In addition, it is possible to decrease a magnification side lens diameter, and this configuration is appropriate for achieving an increase in angle of view by shortening a focal length thereof.

Further, zooming is performed by moving a lens system closer to the reduction side than the intermediate image. As for the zooming operation, change in relay magnification of the lens system closer to the reduction side than the intermediate image corresponds to change in size of the intermediate image, and thus it is possible to achieve an optically simple configuration.

Further, the final lens group, which remains stationary with respect to the reduction side imaging plane during zooming and has a positive refractive power, is disposed to be closest to the reduction side. Thereby, it is possible to reduce fluctuation in aberrations during zooming while keeping the zoom lens telecentric.

Further, the zoom lens is configured to satisfy the following conditional expressions (1) and (2).

$$0 < |fw|/fA < 0.145 \quad (1)$$

$$0.01 < |fw|/fB < 0.2 \quad (2)$$

Here, fw is a focal length of the whole system at the wide-angle end,
- fA is a focal length of a movable lens group closest to the reduction side among the plurality of movable lens groups, and
- fB is a focal length of a second movable lens group from the reduction side among the plurality of movable lens groups.

The conditional expression (1) is a conditional expression for satisfactorily correcting fluctuation in aberrations during zooming. By not allowing the result of the conditional expression (1) to be equal to or less than the lower limit, among the plurality of movable lens groups, the power of the movable lens group closest to the reduction side can be prevented from becoming excessively weak. Thus, an amount of movement for ensuring a desired zoom ratio is minimized, and this contributes to reduction in lens total length. By not allowing the result of the conditional expression (1) to be equal to or greater than the upper limit, among the plurality of movable lens groups, the power of the movable lens group closest to the reduction side can be prevented from becoming excessively strong. Thus, it is possible to suppress fluctuation in longitudinal chromatic aberration and spherical aberration during zooming.

The conditional expression (2) is also a conditional expression for satisfactorily correcting fluctuation in aberrations during the same zooming. By not allowing the result of the conditional expression (2) to be equal to or less than the lower limit, among the plurality of movable lens groups, the power of the second movable lens group from the reduction side can be prevented from becoming excessively weak. Thus, it becomes easy to ensure the desired zoom ratio, and this contributes to reduction in lens diameter of the movable lens group. By not allowing the result of the conditional expression (2) to be equal to or greater than the upper limit, among the plurality of movable lens groups, the power of the second movable lens group from the reduction side can be prevented from becoming excessively strong. Thus, it is possible to easily correct astigmatism during zooming.

In addition, in a case where the following conditional expression (1-1) and/or (2-1) is satisfied, it is possible to obtain more favorable characteristics.

$$0 < |fw|/fA < 0.14 \quad (1-1)$$

$$0.03 < |fw|/fB < 0.16 \quad (2-1)$$

The zoom lens of the present invention may comprise four or five lens groups as a whole. A lens group closest to the magnification side and the final lens group closest to the reduction side may remain stationary with respect to the reduction side imaging plane during zooming. Among lens groups between the lens group closest to the magnification side and the final lens group closest to the reduction side, at least two lens groups may move by changing spacings between the groups adjacent to each other in the direction of the optical axis during zooming.

As described above, by adopting a configuration using at most five lens groups, it is possible to simplify a configuration of the entire zoom lens. Further, in a case where the lens group closest to the magnification side is intended to move during zooming, mechanical parts for the zooming operation are increased in size and elongated, and this leads to an increase in costs. Therefore, in addition to the final lens group, the lens group closest to the magnification side is also set to be stationary during zooming, whereby it is possible to solve such a problem.

It is preferable that the zoom lens satisfies the following conditional expression (3). By not allowing the result of the conditional expression (3) to be equal to or less than the lower limit, it is possible to prevent the power of the final lens group from becoming excessively strong. Thus, by minimizing an amount of occurrence of lateral chromatic aberration in the final lens group, it is possible to easily correct lateral chromatic aberration in other groups. By not allowing the result of the conditional expression (3) to be equal to or greater than the upper limit, it is possible to prevent the power of the final lens group from becoming excessively weak. Thus, it becomes easy to make the zoom lens telecentric on the reduction side. In addition, in a case where the following conditional expression (3-1) is satisfied, it is possible to obtain more favorable characteristics.

$$6 < fM/|fw| < 20 \quad (3)$$

$$7 < fM/|fw| < 18 \quad (3-1)$$

Here, fM is a focal length of the final lens group, and
fw is a focal length of the whole system at the wide-angle end.

It is preferable that the zoom lens satisfies the following conditional expression (4). By satisfying the conditional expression (4), it becomes easy to ensure telecentricity while obtaining a size of a desired image circle. In addition, in a case where the following conditional expression (4-1) is satisfied, it is possible to obtain more favorable characteristics.

$$0 < Y\max/|exPw| < 0.1 \quad (4)$$

$$0 < Y\max/|exPw| < 0.07 \quad (4-1)$$

Here, Ymax is an effective image circle radius on the reduction side, and
exPw is a distance on the optical axis from the reduction side imaging plane to a paraxial exit pupil position at the wide-angle end in a case where the reduction side is set as an exit side.

It is preferable that the zoom lens satisfies the following conditional expression (5). By not allowing the result of the conditional expression (5) to be equal to or less than the lower limit, it is possible to prevent the back focal length from being excessively shortened. Thus, it becomes easy to arrange the color synthesizing prism and the like. In addition, in a case where the following conditional expression (5-1) is satisfied, it is possible to obtain more favorable characteristics. By not allowing the result of the conditional expression (5-1) to be equal to or greater than the upper limit, it is possible to prevent the back focal length from becoming excessively large and the lens diameter from becoming large. Thus, it is possible to suppress an increase in number of lenses and an increase in costs of materials.

$$2 < Bfw/|fw| \quad (5)$$

$$3 < Bfw/|fw| < 11 \quad (5-1)$$

Here, Bfw is a back focal length of the whole system as an air conversion length at the wide-angle end, and fw is a focal length of the whole system at the wide-angle end.

Next, numerical examples of the zoom lens of the present invention will be described.

First, a zoom lens of Example 1 will be described. FIG. 1 is a cross-sectional diagram illustrating a configuration of the zoom lens of Example 1. In addition, in FIG. 1 and FIGS. 2 to 12 corresponding to Examples 2 to 12 to be described later, an image display surface Sim side is the reduction side, a lens L1a side of the first lens group G1 is a magnification side, and an aperture stop St shown in the drawing does not necessarily show its real size and shape, but show a position on an optical axis Z. Further, in FIGS. 1 to 12, on-axis rays wa and rays with a maximum angle of view wb are also shown together.

The zoom lens of Example 1 includes, in order from the magnification side, a first lens group G1, a second lens group G2, a third lens group G3, and a fourth lens group G4. An intermediate image is formed between the first lens group G1 and the second lens group G2. The first lens group G1 and the fourth lens group G4 remain stationary with respect to the reduction side imaging plane (image display surface Sim) during zooming. The second lens group G2 and the third lens group G3 are configured to move by changing spacings of the groups adjacent to each other in the direction of the optical axis during zooming.

The first lens group G1 includes eleven lenses as lenses L1a to L1k. The second lens group G2 includes four lenses as lenses L2a to L2d. The third lens group G3 includes five lenses as lenses L3a to L3e. The fourth lens group G4 includes one lens as only a lens L4a.

Table 1 shows lens data of the zoom lens of Example 1, Table 2 shows data about specification, Table 3 shows surface spacings which are variable during zooming, and Table 4 shows data about aspheric coefficients thereof. Hereinafter, meanings of the reference signs in the tables are, for example, as described in Example 1, and are basically the same as those in Examples 2 to 12.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface spacing shows spacings on the optical axis Z between the respective surfaces and the subsequent surfaces. Further, the column of n shows a refractive index of each optical element at the d line (a wavelength of 587.6 nm), and the column of v shows an Abbe number of each optical element at the d line (a wavelength of 587.6 nm). Here, the sign of the radius of curvature is positive in a case where a surface has a shape convex toward the magnification side, and is negative in a case where a surface has a shape convex toward the reduction side. In the lens data, the aperture stop St and the optical member PP are additionally noted. In a place of a surface number of a surface corresponding to the aperture stop St, the surface number and a term of (stop) are noted. Further, in the lens data, in each place of the surface spacing which is variable during zooming, DD[surface number] is noted. Numerical values each corresponding to the DD[surface number] are shown in Table 3.

In the data about the specification of Table 2, values of the zoom ratio, the focal length f', the F number FNo., and the total angle of view 2ω are noted.

In the lens data of Table 1, the reference sign * is attached to surface numbers of aspheric surfaces, and radii of curvature of the aspheric surfaces are represented by numerical values of paraxial radii of curvature. In the data about aspheric coefficients of Table 4, surface numbers of aspheric surfaces, and aspheric coefficients of these aspheric surfaces are noted. The "E±n" (n: an integer) in numerical values of the aspheric coefficients of Table 4 indicates "×10$^{\pm n}$". The aspheric coefficients are values of the coefficients KA and Am (m=3 . . . 20) in aspheric surface expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric coefficients (m=3 . . . 20).

TABLE 1

| EXAMPLE 1•LENS DATA (n AND v ARE BASED ON d LINE) | | | | |
|---|---|---|---|---|
| SURFACE NUMBER | RADIUS OF CURVATURE | SURFACE SPACING | n | v |
| *1 | −16.8844 | 3.1041 | 1.53158 | 55.08 |
| *2 | −39.1686 | 11.7946 | | |
| 3 | 39.1318 | 1.7292 | 1.65160 | 58.55 |
| 4 | 8.9360 | 11.4741 | | |
| 5 | −10.7817 | 8.5447 | 1.80400 | 46.58 |
| 6 | −16.6204 | 0.1373 | | |
| 7 | 174.0429 | 2.4222 | 1.89286 | 20.36 |
| 8 | −41.4827 | 3.6906 | | |
| 9 | 38.6978 | 0.9310 | 1.76182 | 26.52 |
| 10 | 18.0298 | 7.5292 | 1.49700 | 81.61 |
| 11 | −27.6451 | 0.5877 | | |
| 12 | −693.0195 | 0.9310 | 1.84666 | 23.78 |
| 13 | 21.3262 | 7.4898 | 1.49700 | 81.61 |
| 14 | −35.1609 | 0.1385 | | |
| *15 | 34.7539 | 3.0952 | 1.49100 | 57.58 |
| *16 | 70.7753 | 15.2752 | | |
| 17 | 26.7420 | 8.4868 | 1.72916 | 54.68 |
| 18 | −59.7421 | 1.8359 | | |
| 19 | −33.6663 | 1.0341 | 1.51742 | 52.43 |
| 20 | 35.9185 | DD[20] | | |
| 21 | −42.1553 | 1.2414 | 1.48749 | 70.24 |
| 22 | 65.7706 | 1.4019 | | |
| 23 | 144.0055 | 9.1288 | 1.80518 | 25.42 |
| 24 | −34.5237 | 1.9741 | | |
| 25 | 28.9067 | 11.7248 | 1.80100 | 34.97 |
| 26 | −26.9627 | 2.7659 | 1.78472 | 25.68 |
| 27 | 22.7511 | DD[27] | | |
| 28 | 34.2130 | 3.4384 | 1.83400 | 37.16 |
| 29 | −104.2555 | 5.9827 | | |

TABLE 1-continued

EXAMPLE 1·LENS DATA (n AND v ARE BASED ON d LINE)

| SURFACE NUMBER | RADIUS OF CURVATURE | SURFACE SPACING | n | v |
|---|---|---|---|---|
| 30 | 12.8227 | 2.1765 | 1.67270 | 32.10 |
| 31 | 10.2706 | 2.5533 | | |
| 32(STOP) | ∞ | 3.5533 | | |
| 33 | −12.9988 | 5.0138 | 1.84666 | 23.78 |
| 34 | 57.0049 | 3.4611 | 1.55032 | 75.50 |
| 35 | −19.5485 | 0.1376 | | |
| 36 | 56.8352 | 4.1949 | 1.49700 | 81.61 |
| 37 | −21.9908 | DD[37] | | |
| 38 | 37.1429 | 3.6237 | 1.89286 | 20.36 |
| 39 | ∞ | 9.1782 | | |
| 40 | ∞ | 22.2759 | 1.51633 | 64.14 |
| 41 | ∞ | | | |

TABLE 2

EXAMPLE 1·SPECIFICATION (d LINE)

| | WIDE-ANGLE END | TELEPHOTO END |
|---|---|---|
| ZOOM RATIO | 1.0 | 1.3 |
| f | −5.72 | −7.44 |
| FNo. | 2.00 | 2.17 |
| 2ω [°] | 119.8 | 106.2 |

TABLE 3

EXAMPLE 1·SURFACE SPACING

| | WIDE-ANGLE END | TELEPHOTO END |
|---|---|---|
| DD[20] | 20.3768 | 25.3250 |
| DD[27] | 18.9370 | 4.8281 |
| DD[37] | 15.0605 | 24.2212 |

TABLE 4

EXAMPLE 1·ASPHERIC COEFFICIENT

| SURFACE NUMBER | 1 | 2 |
|---|---|---|
| KA | 2.7941853E−01 | 1.8105190E+00 |
| A3 | −5.0921570E−04 | −3.2728478E−04 |
| A4 | 6.3873272E−04 | 4.7708143E−04 |
| A5 | −4.4839039E−05 | −1.7854103E−05 |
| A6 | −1.1876211E−06 | −3.0297809E−06 |
| A7 | 2.7572123E−07 | 3.0052470E−07 |
| A8 | −5.3141374E−09 | −4.6232008E−09 |
| A9 | −8.4646589E−10 | −7.6097494E−10 |
| A10 | 4.3494235E−11 | 4.9961876E−11 |
| A11 | 9.4985984E−13 | 6.6383244E−14 |
| A12 | −1.1598267E−13 | −1.4799288E−13 |
| A13 | 9.2980013E−16 | 5.0835011E−15 |
| A14 | 1.4520584E−16 | 1.5760865E−16 |
| A15 | −3.6120298E−18 | −1.1489940E−17 |
| A16 | −7.3169783E−20 | −7.8026822E−21 |
| A17 | 3.5273362E−21 | 1.1320168E−20 |
| A18 | −6.9875354E−24 | −1.3162372E−22 |
| A19 | −1.1897307E−24 | −4.0731287E−24 |
| A20 | 1.3709873E−26 | 7.3579689E−26 |

| SURFACE NUMBER | 15 | 16 |
|---|---|---|
| KA | 1.0000000E+00 | 1.0000000E+00 |
| A3 | 7.2478928E−05 | −5.0237120E−05 |
| A4 | 7.6173442E−05 | 1.9586015E−04 |
| A5 | −6.1936748E−07 | −2.6030817E−05 |

TABLE 4-continued

EXAMPLE 1·ASPHERIC COEFFICIENT

| A6 | −1.1944480E−06 | 1.8240676E−06 |
|---|---|---|
| A7 | 6.6734463E−07 | 9.6318799E−07 |
| A8 | −9.8855940E−08 | −2.1538581E−07 |
| A9 | −4.1374715E−09 | 2.1708011E−09 |
| A10 | 2.2518107E−09 | 3.5847728E−09 |
| A11 | −9.2586206E−11 | −2.6409287E−10 |
| A12 | −2.2927738E−11 | −2.7713036E−11 |
| A13 | 2.0673603E−12 | 3.7445443E−12 |
| A14 | 9.4851376E−14 | 7.0466950E−14 |
| A15 | −1.6277207E−14 | −2.5195342E−14 |
| A16 | 3.5575532E−17 | 3.5827741E−16 |
| A17 | 5.9040344E−17 | 8.4327983E−17 |
| A18 | −1.4206486E−18 | −2.6831459E−18 |
| A19 | −8.2650517E−20 | −1.1255821E−19 |
| A20 | 3.0223753E−21 | 4.8065952E−21 |

Figure 13:
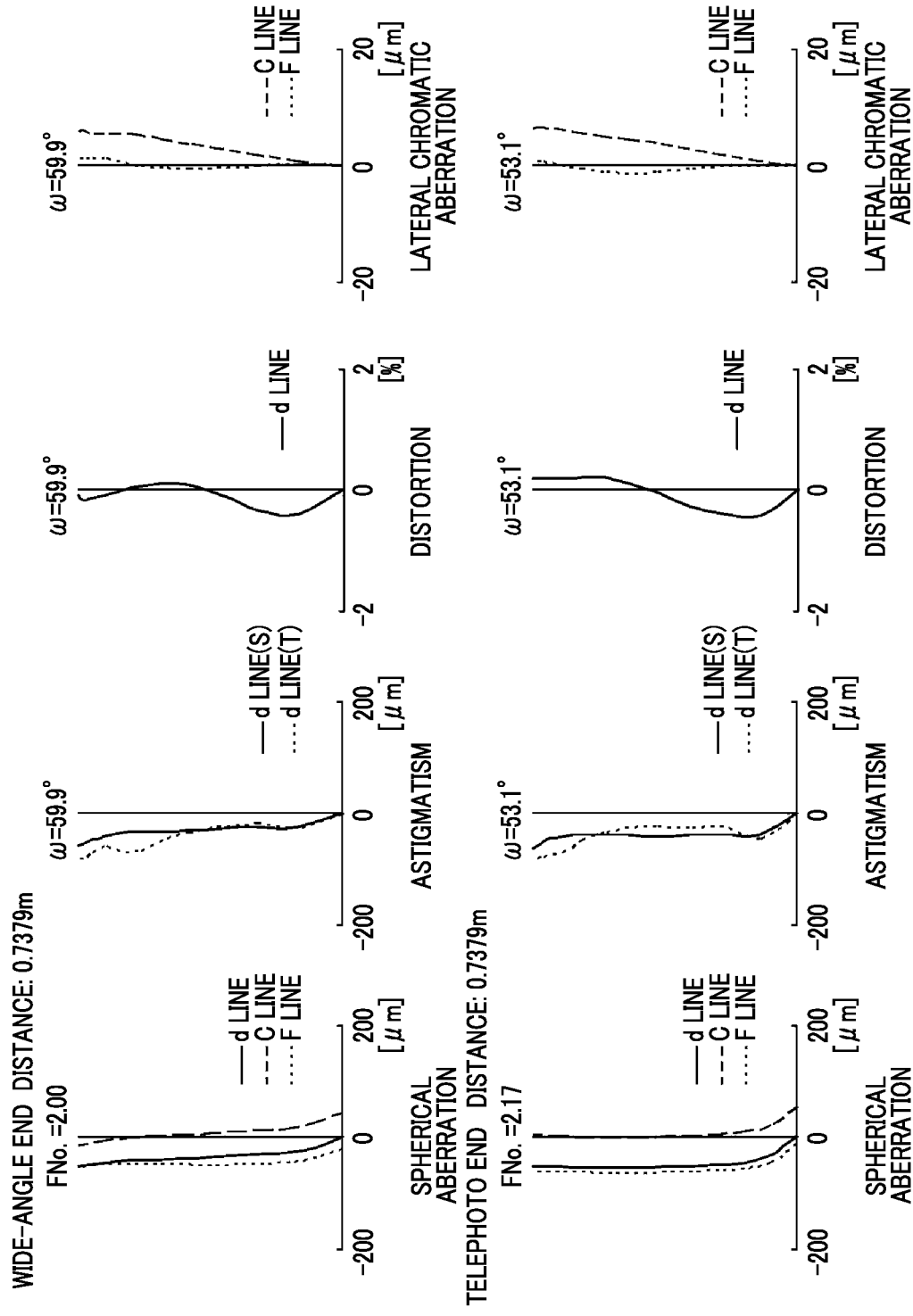
FIG. 13 is a diagram of aberrations of the zoom lens of Example 1 of the present invention.

FIG. 13 shows aberration diagrams of the zoom lens of Example 1. In addition, in order from the upper left side of FIG. 13, spherical aberration, astigmatism, distortion, and lateral chromatic aberration at the wide-angle end are shown. In order from the lower left side of FIG. 13, spherical aberration, astigmatism, distortion, and lateral chromatic aberration at the telephoto end are shown. These aberration diagrams show states in a case where the projection distance is set as distances noted in the aberration diagrams. The aberration diagrams illustrating spherical aberration, astigmatism, and distortion indicate aberrations that occur in a case where the d line (a wavelength of 587.6 nm) is set as a reference wavelength. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (wavelength 656.3 nm) and F line (wavelength 486.1 nm) are respectively indicated by the long dashed line and the short dashed line. In the spherical aberration diagram, FNo. means an F number. In the other aberration diagrams, to means a half angle of view.

Reference signs, meanings, and description methods of the respective data pieces according to Example 1 described above are the same as those in the following examples unless otherwise noted. Therefore, in the following description, repeated description will be omitted.

Figure 2:
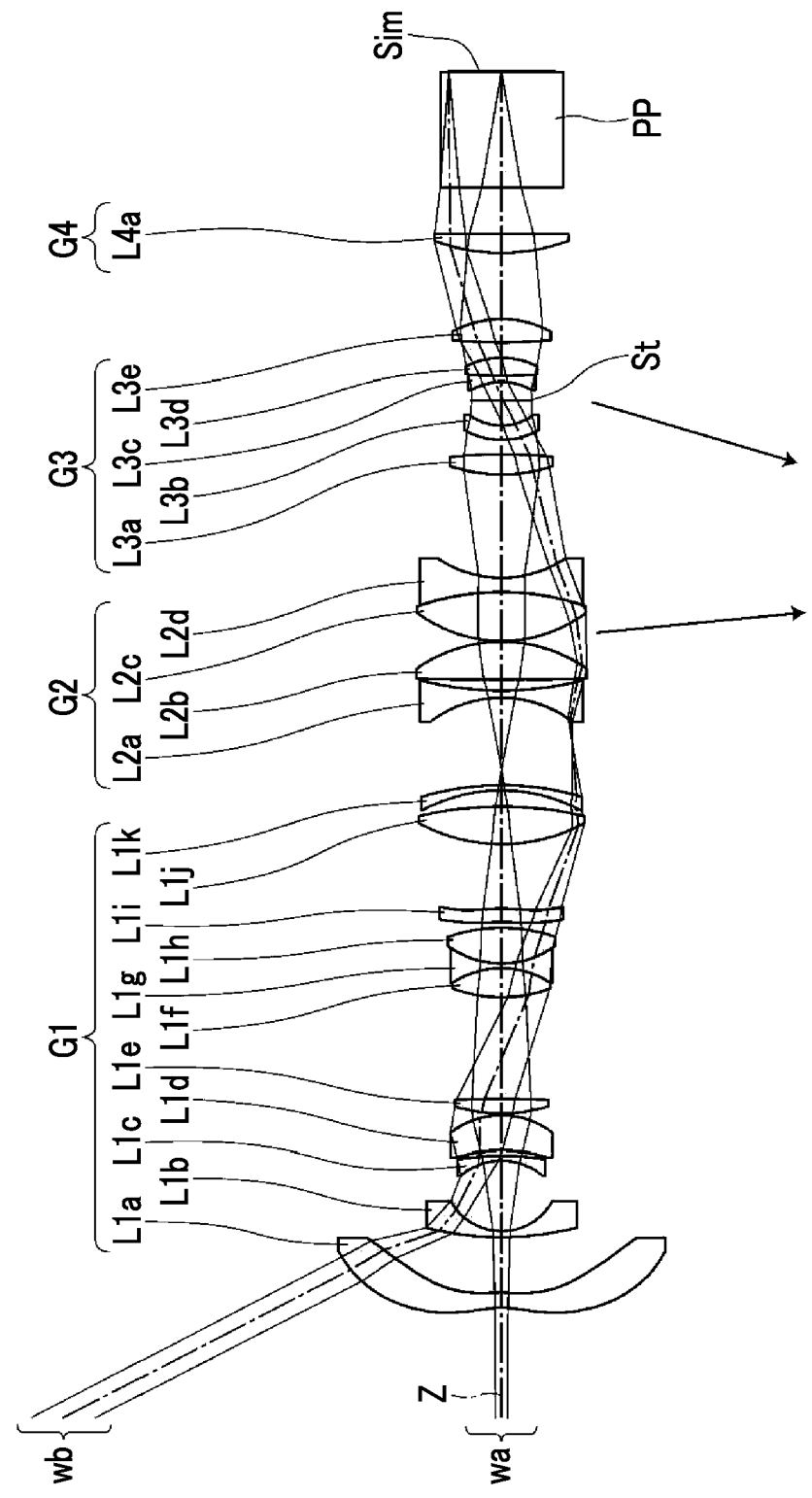
FIG. 2 is a cross-sectional view illustrating a configuration of a zoom lens of Example 2 of the present invention.
Figure 14:
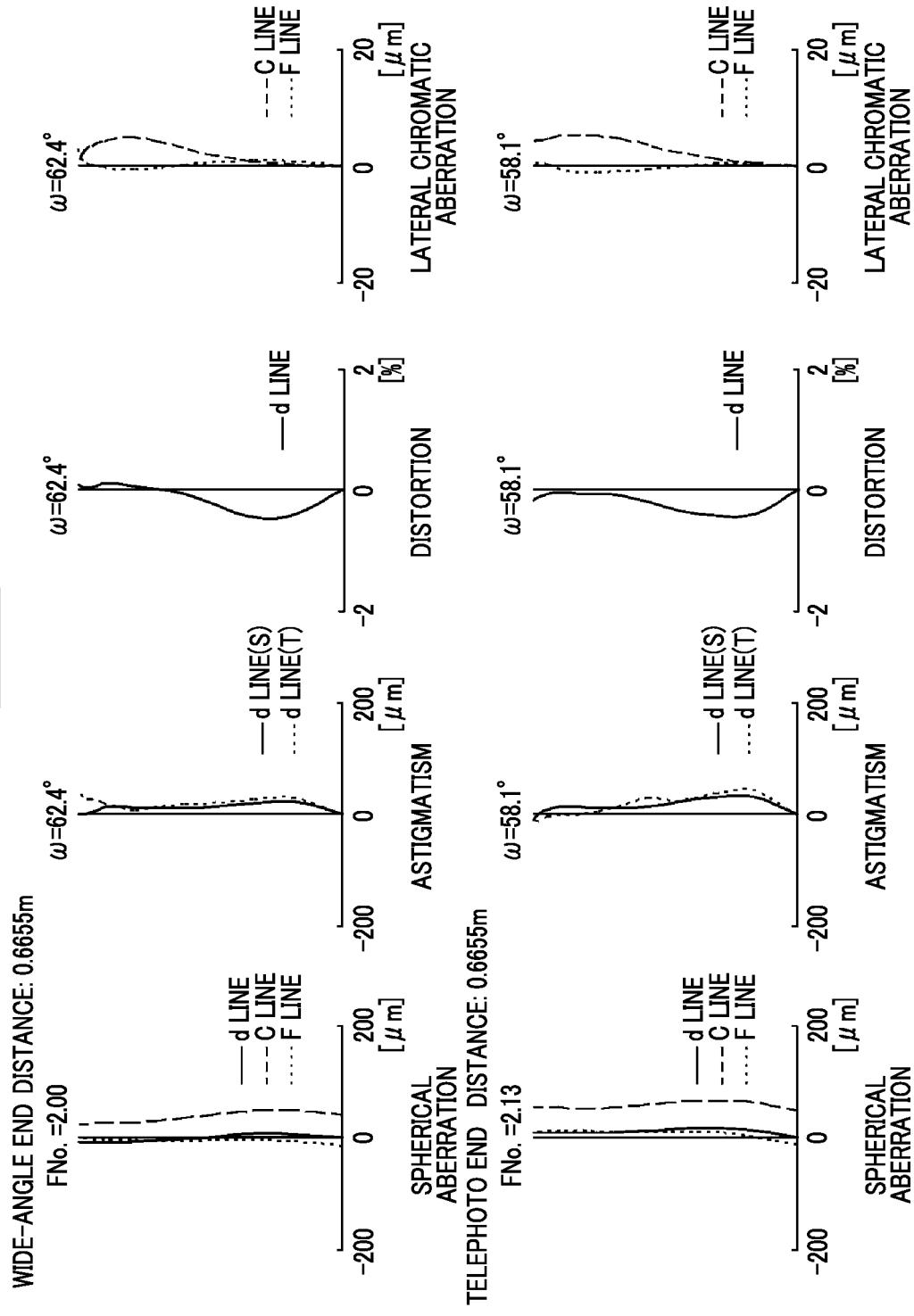
FIG. 14 is a diagram of aberrations of the zoom lens of Example 2 of the present invention.

Next, a zoom lens of Example 2 will be described. FIG. 2 is a cross-sectional diagram illustrating a configuration of the zoom lens of Example 2. The zoom lens of Example 2 has the same lens groups and has the same number of lenses as that of Example 1. Table 5 shows lens data of the zoom lens of Example 2, Table 6 shows data about specification, Table 7 shows surface spacings which are variable during zooming, Table 8 shows data about aspheric coefficients thereof, and FIG. 14 shows aberration diagrams.

TABLE 5

EXAMPLE 2·LENS DATA (n AND v ARE BASED ON d LINE)

| SURFACE NUMBER | RADIUS OF CURVATURE | SURFACE SPACING | n | v |
|---|---|---|---|---|
| *1 | −17.2414 | 2.9654 | 1.53158 | 55.08 |
| *2 | −49.2125 | 10.6787 | | |
| 3 | 57.6342 | 1.1725 | 1.90525 | 35.04 |
| 4 | 10.9253 | 13.5667 | | |

TABLE 5-continued

EXAMPLE 2•LENS DATA (n AND v ARE BASED ON d LINE)

| SURFACE NUMBER | RADIUS OF CURVATURE | SURFACE SPACING | n | v |
|---|---|---|---|---|
| 5 | −11.9107 | 0.8969 | 1.76182 | 26.52 |
| 6 | −55.1342 | 1.0121 | | |
| 7 | −28.3277 | 6.7268 | 1.83481 | 42.72 |
| 8 | −15.6842 | 0.3448 | | |
| 9 | 30.1823 | 2.7995 | 1.84666 | 23.78 |
| 10 | −215.4952 | 19.5983 | | |
| 11 | 26.2021 | 5.6143 | 1.67790 | 55.34 |
| 12 | −16.8209 | 0.9310 | 1.84666 | 23.78 |
| 13 | 17.1590 | 6.8415 | 1.49700 | 81.61 |
| 14 | −31.6692 | 1.0851 | | |
| *15 | −80.8098 | 2.6353 | 1.49100 | 57.58 |
| *16 | −38.8874 | 12.4450 | | |
| 17 | 32.6910 | 7.2819 | 1.80100 | 34.97 |
| 18 | −67.1562 | 3.0694 | | |
| 19 | −31.6933 | 1.0338 | 1.80518 | 25.42 |
| 20 | −52.7040 | DD[20] | | |
| 21 | −21.9713 | 1.4031 | 1.51633 | 64.14 |
| 22 | 62.1066 | 2.1324 | | |
| 23 | 733.6327 | 7.3028 | 1.80518 | 25.42 |
| 24 | −27.6406 | 0.1378 | | |
| 25 | 26.5908 | 9.4251 | 1.80400 | 46.58 |
| 26 | −48.4069 | 2.7655 | 1.71736 | 29.52 |
| 27 | 21.6402 | DD[27] | | |
| 28 | 31.1458 | 3.8751 | 1.80400 | 46.58 |
| 29 | −105.1127 | 2.7886 | | |
| 30 | 14.2690 | 2.7937 | 1.51742 | 52.43 |
| 31 | 10.2577 | 4.8370 | | |
| 32(STOP) | ∞ | 3.5141 | | |
| 33 | −11.7925 | 1.1040 | 1.84666 | 23.78 |
| 34 | 96.5438 | 3.4211 | 1.55032 | 75.50 |
| 35 | −14.7066 | 2.9957 | | |
| 36 | 103.9823 | 4.4743 | 1.49700 | 81.61 |
| 37 | −19.3386 | DD[37] | | |
| 38 | 35.9871 | 3.6093 | 1.89286 | 20.36 |
| 39 | ∞ | 9.1786 | | |
| 40 | ∞ | 22.2759 | 1.51633 | 64.14 |
| 41 | ∞ | | | |

TABLE 6

EXAMPLE 2•SPECIFICATION (d LINE)

| | WIDE-ANGLE END | TELEPHOTO END |
|---|---|---|
| ZOOM RATIO | 1.0 | 1.2 |
| f′ | −5.17 | −6.20 |
| FNo. | 2.00 | 2.13 |
| 2ω [°] | 124.8 | 116.2 |

TABLE 7

EXAMPLE 2•SURFACE SPACING

| | WIDE-ANGLE END | TELEPHOTO END |
|---|---|---|
| DD[20] | 16.8556 | 21.6374 |
| DD[27] | 20.0994 | 8.4390 |
| DD[37] | 12.7668 | 19.6455 |

TABLE 8

EXAMPLE 2•ASPHERIC COEFFICIENT

| SURFACE NUMBER | 1 | 2 |
|---|---|---|
| KA | 2.1299037E−01 | 2.9144487E+00 |
| A3 | 2.1095964E−04 | 5.7447036E−04 |

TABLE 8-continued

EXAMPLE 2•ASPHERIC COEFFICIENT

| | | |
|---|---|---|
| A4 | 4.5494679E−04 | 2.3158155E−04 |
| A5 | −3.0728584E−05 | 5.6029895E−06 |
| A6 | −8.5803525E−07 | −3.1229607E−06 |
| A7 | 1.6042162E−07 | 1.2387605E−07 |
| A8 | −1.4132779E−09 | 8.2162984E−09 |
| A9 | −4.8514693E−10 | −5.5504688E−10 |
| A10 | 1.6347892E−11 | −1.6373047E−11 |
| A11 | 6.9633654E−13 | 1.8271759E−12 |
| A12 | −4.4319169E−14 | −1.3615695E−16 |
| A13 | −1.9328421E−16 | −3.1116331E−15 |
| A14 | 5.6298774E−17 | 3.7160148E−17 |
| A15 | −6.9018194E−19 | 3.4446901E−18 |
| A16 | −3.2317123E−20 | −7.3840296E−20 |
| A17 | 8.1516171E−22 | −1.8154739E−21 |
| A18 | 3.7783423E−24 | 5.0354866E−23 |
| A19 | −2.7885931E−25 | 4.5311465E−25 |
| A20 | 2.2694514E−27 | −1.4253624E−26 |

| SURFACE NUMBER | 15 | 16 |
|---|---|---|
| KA | 1.0000000E+00 | 1.0000000E+00 |
| A3 | 1.2537575E−04 | 1.7242359E−04 |
| A4 | 2.8429524E−05 | 7.7526916E−05 |
| A5 | 2.8712325E−05 | 1.6185371E−05 |
| A6 | −4.9968459E−06 | −1.9412912E−06 |
| A7 | 4.4197647E−07 | 4.6908716E−07 |
| A8 | −2.8611748E−08 | −1.1584632E−07 |
| A9 | 2.9140944E−09 | 8.6560687E−09 |
| A10 | −1.9704001E−10 | 1.1343582E−09 |
| A11 | −1.8448163E−11 | −1.9872789E−10 |
| A12 | 2.0237386E−12 | −1.2612510E−12 |
| A13 | 1.0981586E−13 | 1.5863631E−12 |
| A14 | −1.2176285E−14 | −3.8512783E−14 |
| A15 | −2.9884319E−16 | −6.4106638E−15 |
| A16 | 3.5718411E−17 | 2.5553464E−16 |
| A17 | 4.6057267E−19 | 1.2872602E−17 |
| A18 | −5.5606437E−20 | −6.4962653E−19 |
| A19 | −1.9054616E−22 | −9.6472547E−21 |
| A20 | 3.1275425E−23 | 5.7790698E−22 |

Figure 3:
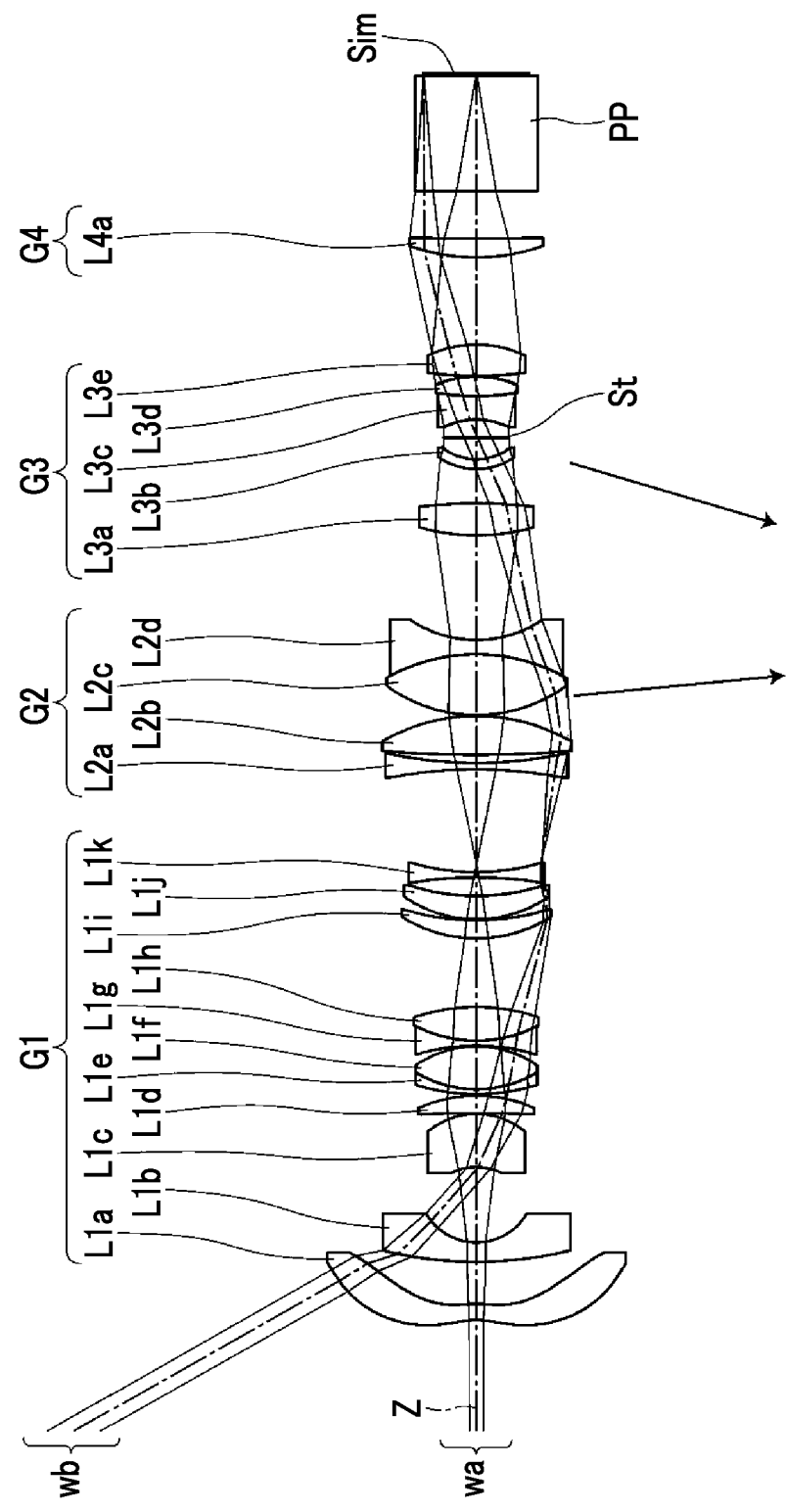
FIG. 3 is a cross-sectional view illustrating a configuration of a zoom lens of Example 3 of the present invention.
Figure 15:
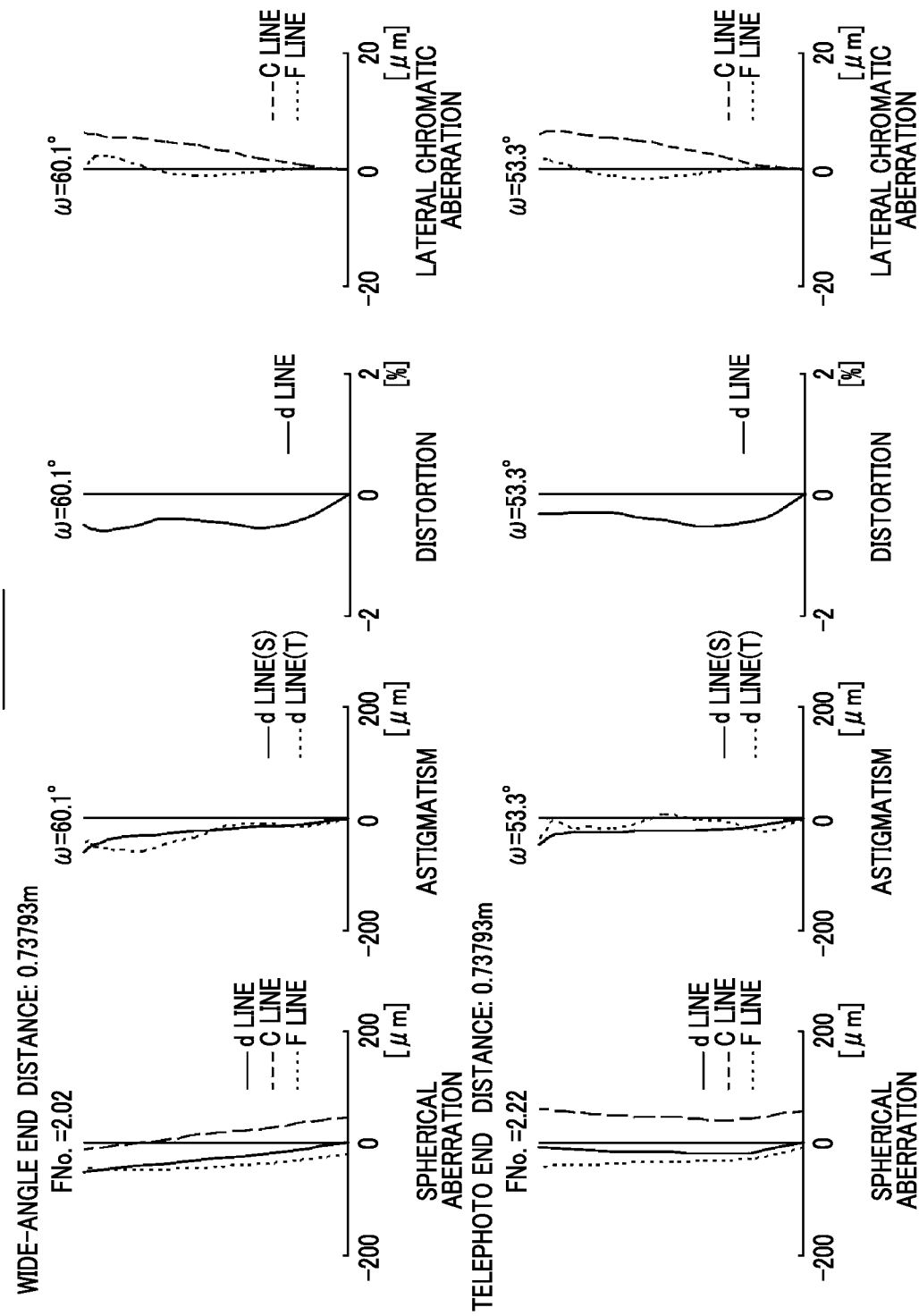
FIG. 15 is a diagram of aberrations of the zoom lens of Example 3 of the present invention.

Next, a zoom lens of Example 3 will be described. FIG. 3 is a cross-sectional diagram illustrating a configuration of the zoom lens of Example 3. The zoom lens of Example 3 has the same lens groups and has the same number of lenses as that of Example 1. Table 9 shows lens data of the zoom lens of Example 3, Table 10 shows data about specification, Table 11 shows surface spacings which are variable during zooming, Table 12 shows data about aspheric coefficients thereof, and FIG. 15 shows aberration diagrams.

TABLE 9

EXAMPLE 3•LENS DATA (n AND v ARE BASED ON d LINE)

| SURFACE NUMBER | RADIUS OF CURVATURE | SURFACE SPACING | n | v |
|---|---|---|---|---|
| *1 | −15.3256 | 3.1041 | 1.53158 | 55.08 |
| *2 | −42.8676 | 8.1208 | | |
| 3 | 72.9696 | 3.7466 | 1.58913 | 61.13 |
| 4 | 10.9570 | 14.4952 | | |
| *5 | −11.4427 | 10.1271 | 1.69350 | 53.18 |
| *6 | −13.5555 | 0.1385 | | |
| 7 | −226.4073 | 3.3920 | 1.85896 | 22.73 |
| 8 | −26.1220 | 0.2797 | | |
| 9 | 38.9490 | 0.9310 | 1.84666 | 23.78 |
| 10 | 22.1582 | 8.2830 | 1.43875 | 94.66 |
| 11 | −20.0167 | 0.1384 | | |
| 12 | −38.0629 | 0.9311 | 1.84666 | 23.78 |
| 13 | 25.0469 | 6.4998 | 1.55032 | 75.50 |
| 14 | −36.6114 | 13.2095 | | |
| 15 | 26.1474 | 3.5448 | 1.69680 | 55.53 |
| 16 | 47.4517 | 0.1377 | | |
| 17 | 23.8780 | 4.5094 | 1.80400 | 46.58 |

TABLE 9-continued

EXAMPLE 3•LENS DATA (n AND v ARE BASED ON d LINE)

| SURFACE NUMBER | RADIUS OF CURVATURE | SURFACE SPACING | n | v |
|---|---|---|---|---|
| 18 | 41.0164 | 3.5961 | | |
| 19 | −73.4033 | 1.0339 | 1.80400 | 46.58 |
| 20 | 44.4268 | DD[20] | | |
| 21 | −85.9366 | 1.2410 | 1.48749 | 70.24 |
| 22 | 78.8404 | 1.5622 | | |
| 23 | 218.4867 | 7.5126 | 1.80518 | 25.42 |
| 24 | −34.9428 | 0.1379 | | |
| 25 | 28.5891 | 11.7248 | 1.80100 | 34.97 |
| 26 | −34.4084 | 2.7656 | 1.78472 | 25.68 |
| 27 | 22.1365 | DD[27] | | |
| 28 | 38.5640 | 6.1592 | 1.79952 | 42.22 |
| 29 | −96.1119 | 6.6148 | | |
| 30 | 12.5863 | 1.9009 | 1.51742 | 52.43 |
| 31 | 10.4680 | 4.1820 | | |
| 32(STOP) | ∞ | 3.4483 | | |
| 33 | −13.7491 | 4.5080 | 1.80518 | 25.42 |
| 34 | 44.2803 | 3.5843 | 1.55032 | 75.50 |
| 35 | −20.9332 | 0.1385 | | |
| 36 | 66.5912 | 6.0558 | 1.49700 | 81.61 |
| 37 | −21.3539 | DD[37] | | |
| 38 | 37.9065 | 3.6665 | 1.89286 | 20.36 |
| 39 | 1065.0734 | 9.5172 | | |
| 40 | ∞ | 22.2759 | 1.51633 | 64.14 |
| 41 | ∞ | | | |

TABLE 10

EXAMPLE 3•SPECIFICATION (d LINE)

| | WIDE-ANGLE END | TELEPHOTO END |
|---|---|---|
| ZOOM RATIO | 1.0 | 1.0 |
| f | −5.71 | −7.42 |
| FNo. | 2.02 | 2.22 |
| 2ω [°] | 120.2 | 106.6 |

TABLE 11

EXAMPLE 3•SURFACE SPACING

| | WIDE-ANGLE END | TELEPHOTO END |
|---|---|---|
| DD[20] | 19.7566 | 23.3435 |
| DD[27] | 20.3350 | 7.3697 |
| DD[37] | 16.8274 | 26.2058 |

TABLE 12

EXAMPLE 3•ASPHERIC COEFFICIENT

| SURFACE NUMBER | 1 | 2 |
|---|---|---|
| KA | 2.7887118E−01 | 2.5297850E+00 |
| A3 | −1.3189565E−03 | −1.0834090E−03 |
| A4 | 1.0077504E−03 | 7.5981861E−04 |
| A5 | −7.6981053E−05 | −2.8914229E−05 |
| A6 | −2.4419326E−06 | −6.0428862E−06 |
| A7 | 6.0487795E−07 | 5.6995162E−07 |
| A8 | −1.2399329E−08 | 3.8888099E−09 |
| A9 | −2.3034355E−09 | −2.3238253E−09 |
| A10 | 1.2557565E−10 | 5.3186008E−11 |
| A11 | 3.3640761E−12 | 4.7688518E−12 |
| A12 | −4.0808819E−13 | −2.4246931E−13 |
| A13 | 2.6645072E−15 | −1.6706577E−15 |
| A14 | 6.2698984E−16 | 3.7971228E−16 |
| A15 | −1.5354132E−17 | −7.7910013E−18 |

TABLE 12-continued

EXAMPLE 3•ASPHERIC COEFFICIENT

| A16 | −4.0281086E−19 | −2.2338518E−19 |
|---|---|---|
| A17 | 1.8615292E−20 | 1.3249510E−20 |
| A18 | −1.3664475E−23 | −9.4582008E−23 |
| A19 | −7.6715055E−24 | −6.0756592E−24 |
| A20 | 9.0985547E−26 | 1.0743584E−25 |

| SURFACE NUMBER | 5 | 6 |
|---|---|---|
| KA | 1.0000000E+00 | 1.0000000E+00 |
| A3 | −5.7528541E−20 | 2.7450788E−20 |
| A4 | −1.0110759E−04 | 4.9449064E−06 |
| A5 | −1.9485961E−05 | 9.7355695E−06 |
| A6 | 4.9299861E−06 | −3.3054473E−06 |
| A7 | −2.4783632E−07 | 6.1001854E−07 |
| A8 | −8.6033137E−08 | −5.4636126E−08 |
| A9 | 1.4733516E−08 | 2.1328996E−09 |

Figure 4:
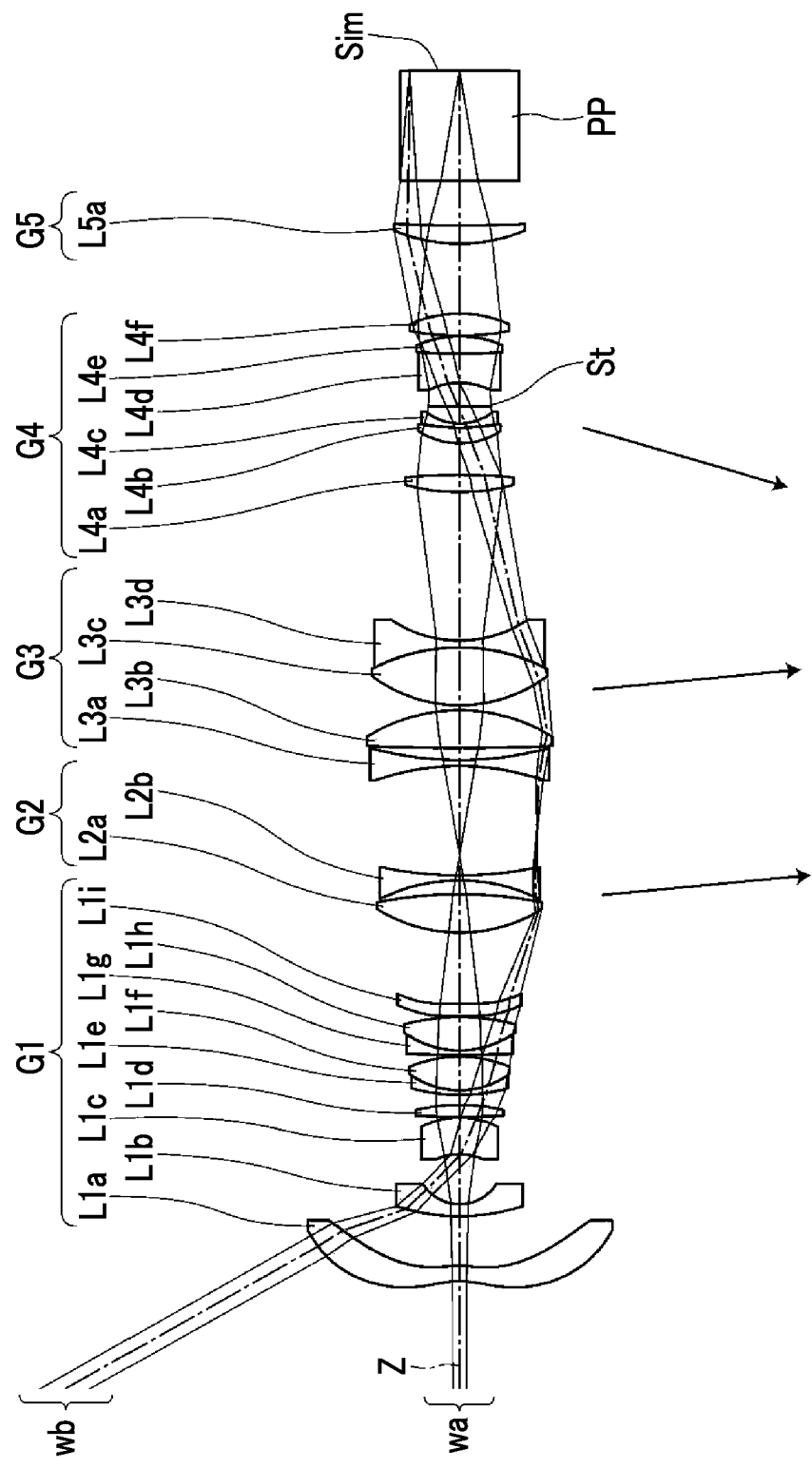
FIG. 4 is a cross-sectional view illustrating a configuration of a zoom lens of Example 4 of the present invention.

Next, a zoom lens of Example 4 will be described. FIG. 4 is a cross-sectional diagram illustrating a configuration of the zoom lens of Example 4.

The zoom lens of Example 4 includes, in order from the magnification side, a first lens group G1, a second lens group G2, a third lens group G3, a fourth lens group G4, and a fifth lens group G5. An intermediate image is formed between the second lens group G2 and the third lens group G3. The first lens group G1 and the fifth lens group G5 remain stationary with respect to the reduction side imaging plane (image display surface Sim) during zooming. The second lens group G2, the third lens group G3, and the fourth lens group G4 are configured to move by changing spacings of the groups adjacent to each other in the direction of the optical axis during zooming.

The first lens group G1 includes nine lenses as lenses L1a to L1i. The second lens group G2 includes two lenses as lenses L2a and L2b. The third lens group G3 includes four lenses as lenses L3a to L3d. The fourth lens group G4 includes six lenses as lenses L4a to L4f. The fifth lens group G5 includes one lens as only a lens L5a.

Figure 16:
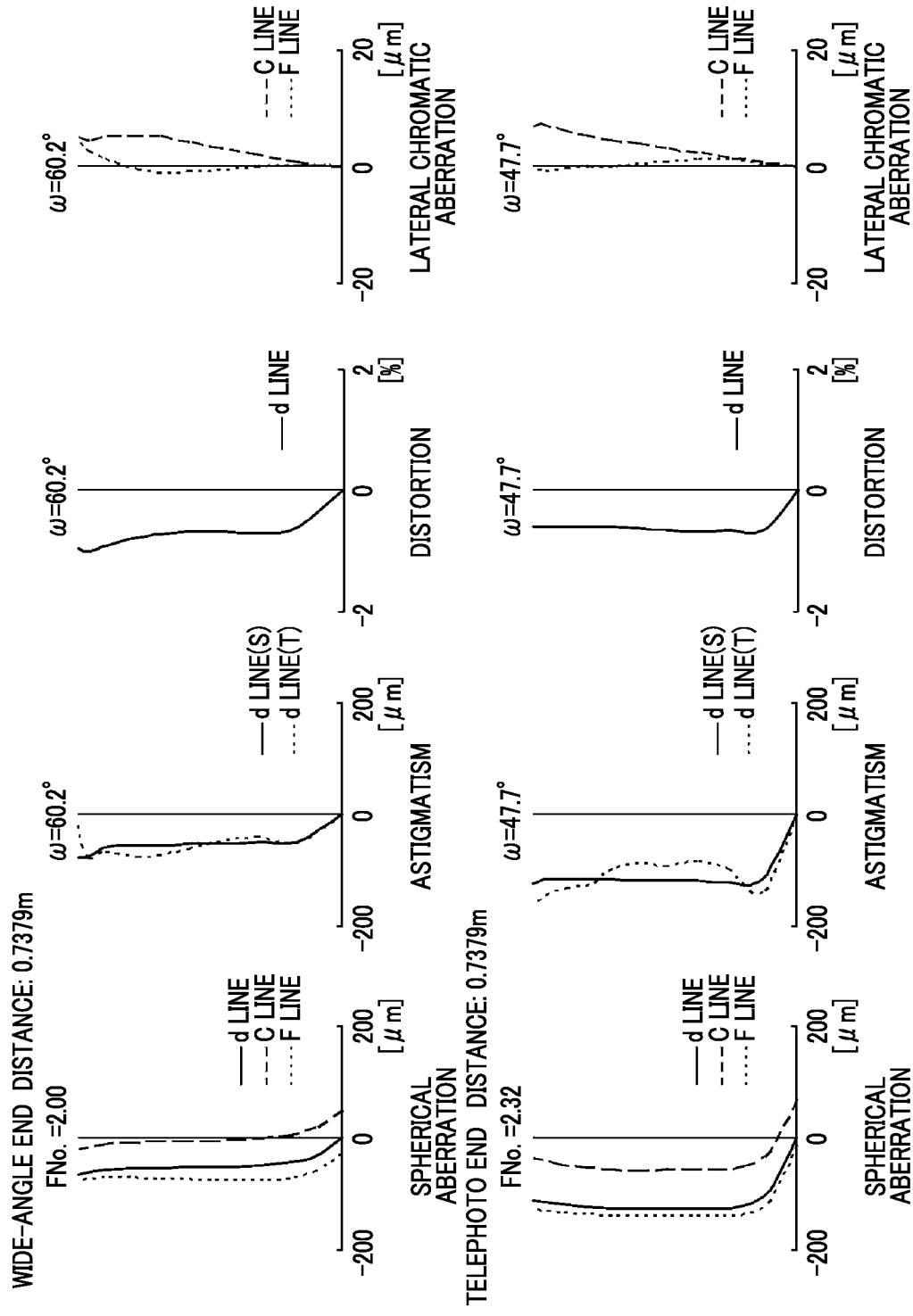
FIG. 16 is a diagram of aberrations of the zoom lens of Example 4 of the present invention.

Table 13 shows lens data of the zoom lens of Example 4, Table 14 shows data about specification, Table 15 shows surface spacings which are variable during zooming, Table 16 shows data about aspheric coefficients thereof, and FIG. 16 shows aberration diagrams.

TABLE 13

EXAMPLE 4•LENS DATA (n AND v ARE BASED ON d LINE)

| SURFACE NUMBER | RADIUS OF CURVATURE | SURFACE SPACING | n | v |
|---|---|---|---|---|
| *1 | −15.3257 | 3.1041 | 1.53158 | 55.08 |
| *2 | −33.1892 | 10.0852 | | |
| 3 | 40.4538 | 2.4685 | 1.62041 | 60.29 |
| 4 | 8.6430 | 10.0936 | | |
| 5 | −11.2762 | 7.2577 | 1.83481 | 42.72 |
| 6 | −17.0955 | 0.1381 | | |
| 7 | 182.9952 | 2.4765 | 1.89286 | 20.36 |
| 8 | −36.5411 | 2.0001 | | |
| 9 | 35.6081 | 0.9317 | 1.75520 | 27.51 |
| 10 | 16.8209 | 6.8261 | 1.49700 | 81.61 |
| 11 | −25.4795 | 0.3399 | | |
| 12 | 267.6247 | 0.9304 | 1.84666 | 23.78 |
| 13 | 18.9387 | 6.7530 | 1.49700 | 81.61 |
| 14 | −42.8291 | 0.1383 | | |
| *15 | 106.4754 | 2.6191 | 1.49100 | 57.58 |
| *16 | −349.9175 | DD[16] | | |
| 17 | 30.8964 | 7.7906 | 1.80400 | 46.58 |
| 18 | −83.2641 | 2.7908 | | |

TABLE 13-continued

EXAMPLE 4•LENS DATA (n AND v ARE BASED ON d LINE)

| SURFACE NUMBER | RADIUS OF CURVATURE | SURFACE SPACING | n | v |
|---|---|---|---|---|
| 19 | −35.5354 | 1.0345 | 1.54814 | 45.78 |
| 20 | 74.1099 | DD[20] | | |
| 21 | −50.1018 | 1.2416 | 1.48749 | 70.24 |
| 22 | 67.5112 | 2.4368 | | |
| 23 | 445.9501 | 7.6268 | 1.80518 | 25.42 |
| 24 | −35.0369 | 1.0354 | | |
| 25 | 28.9876 | 11.7241 | 1.80100 | 34.97 |
| 26 | −37.3021 | 1.3867 | 1.78472 | 25.68 |
| 27 | 24.2172 | DD[27] | | |
| 28 | 40.2271 | 3.4845 | 1.80610 | 40.93 |
| 29 | −134.3021 | 6.4061 | | |
| 30 | 14.8879 | 3.2023 | 1.59282 | 68.62 |
| 31 | 40.2390 | 0.8342 | 1.51742 | 52.43 |
| 32 | 10.6429 | 3.4847 | | |
| 33(STOP) | ∞ | 4.7459 | | |
| 34 | −14.0751 | 5.7552 | 1.85478 | 24.80 |
| 35 | 121.0700 | 3.5097 | 1.59282 | 68.62 |
| 36 | −20.9375 | 0.1385 | | |
| 37 | 53.7339 | 4.4732 | 1.43875 | 94.66 |
| 38 | −23.5498 | DD[38] | | |
| 39 | 32.9929 | 3.7045 | 1.80809 | 22.76 |
| 40 | 286.0748 | 9.1738 | | |
| 41 | ∞ | 22.2759 | 1.51633 | 64.14 |
| 42 | ∞ | | | |

TABLE 14

EXAMPLE 4•SPECIFICATION (d LINE)

| | WIDE-ANGLE END | TELEPHOTO END |
|---|---|---|
| ZOOM RATIO | 1.0 | 1.6 |
| f' | −5.71 | −9.14 |
| FNo. | 2.00 | 2.32 |
| 2ω [°] | 120.4 | 95.4 |

TABLE 15

EXAMPLE 4•SURFACE SPACING

| | WIDE-ANGLE END | TELEPHOTO END |
|---|---|---|
| DD[16] | 14.3660 | 18.1309 |
| DD[20] | 22.1353 | 27.6169 |
| DD[27] | 30.2604 | 4.8273 |
| DD[38] | 14.1661 | 30.3527 |

TABLE 16

EXAMPLE 4•ASPHERIC COEFFICIENT

| SURFACE NUMBER | 1 | 2 |
|---|---|---|
| KA | 2.4141499E−01 | 1.2443569E+00 |
| A3 | −1.0548641E−03 | −8.8448311E−04 |
| A4 | 8.3674285E−04 | 6.3492583E−04 |
| A5 | −6.2203974E−05 | −2.5148517E−05 |
| A6 | −1.6931733E−06 | −4.7634497E−06 |
| A7 | 4.3265443E−07 | 4.6820320E−07 |
| A8 | −9.2963393E−09 | 7.7190760E−10 |
| A9 | −1.4486672E−09 | −1.7808022E−09 |
| A10 | 7.8786293E−11 | 4.9251890E−11 |
| A11 | 1.7996418E−12 | 3.5072008E−12 |
| A12 | −2.2614666E−13 | −2.0320674E−13 |
| A13 | 1.6945437E−15 | −1.2839303E−15 |
| A14 | 3.0897395E−16 | 3.2125472E−16 |
| A15 | −7.5571704E−18 | −4.7675296E−18 |

TABLE 16-continued

EXAMPLE 4•ASPHERIC COEFFICIENT

| A16 | −1.7512626E−19 | −2.3371888E−19 |
|---|---|---|
| A17 | 8.0909075E−21 | 8.0064105E−21 |
| A18 | −9.3635563E−24 | 9.2687753E−24 |
| A19 | −2.9829776E−24 | −3.5001412E−24 |
| A20 | 3.4190869E−26 | 4.0836144E−26 |

| SURFACE NUMBER | 15 | 16 |
|---|---|---|
| KA | 1.0000000E+00 | 1.0000000E+00 |
| A3 | 9.9188567E−05 | −1.9710878E−04 |
| A4 | 3.0661548E−05 | 2.7699157E−04 |
| A5 | 4.3824644E−05 | −3.4909821E−05 |
| A6 | −1.4133218E−05 | 5.8330314E−07 |
| A7 | 1.7507446E−06 | 1.2714550E−06 |
| A8 | 1.6107809E−07 | −1.8605027E−07 |
| A9 | −6.5380545E−08 | −5.4440996E−09 |
| A10 | 2.8124535E−09 | 2.8459871E−09 |
| A11 | 8.8411414E−10 | −9.8577866E−11 |
| A12 | −1.0033635E−10 | −1.9648267E−11 |
| A13 | −3.1296368E−12 | 1.5012748E−12 |
| A14 | 9.9989872E−13 | 5.0112842E−14 |
| A15 | −2.7219117E−14 | −8.7059294E−15 |
| A16 | −3.9426279E−15 | 1.2726604E−16 |
| A17 | 2.5945002E−16 | 2.3563163E−17 |
| A18 | 2.3858327E−18 | −1.0153859E−18 |
| A19 | −6.0714673E−19 | −2.4244280E−20 |
| A20 | 1.4353112E−20 | 1.6658139E−21 |

Figure 5:
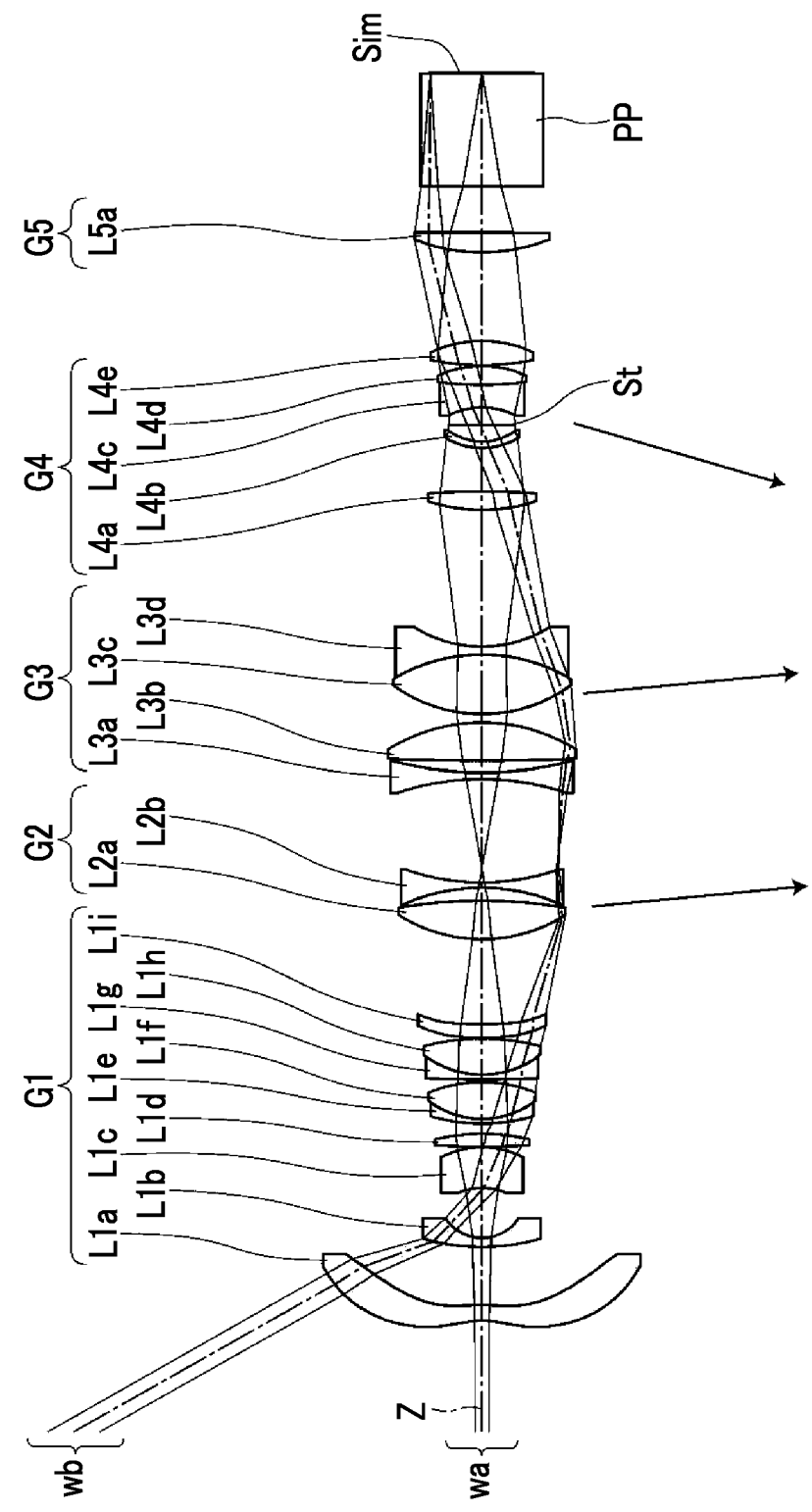
FIG. 5 is a cross-sectional view illustrating a configuration of a zoom lens of Example 5 of the present invention.
Figure 17:
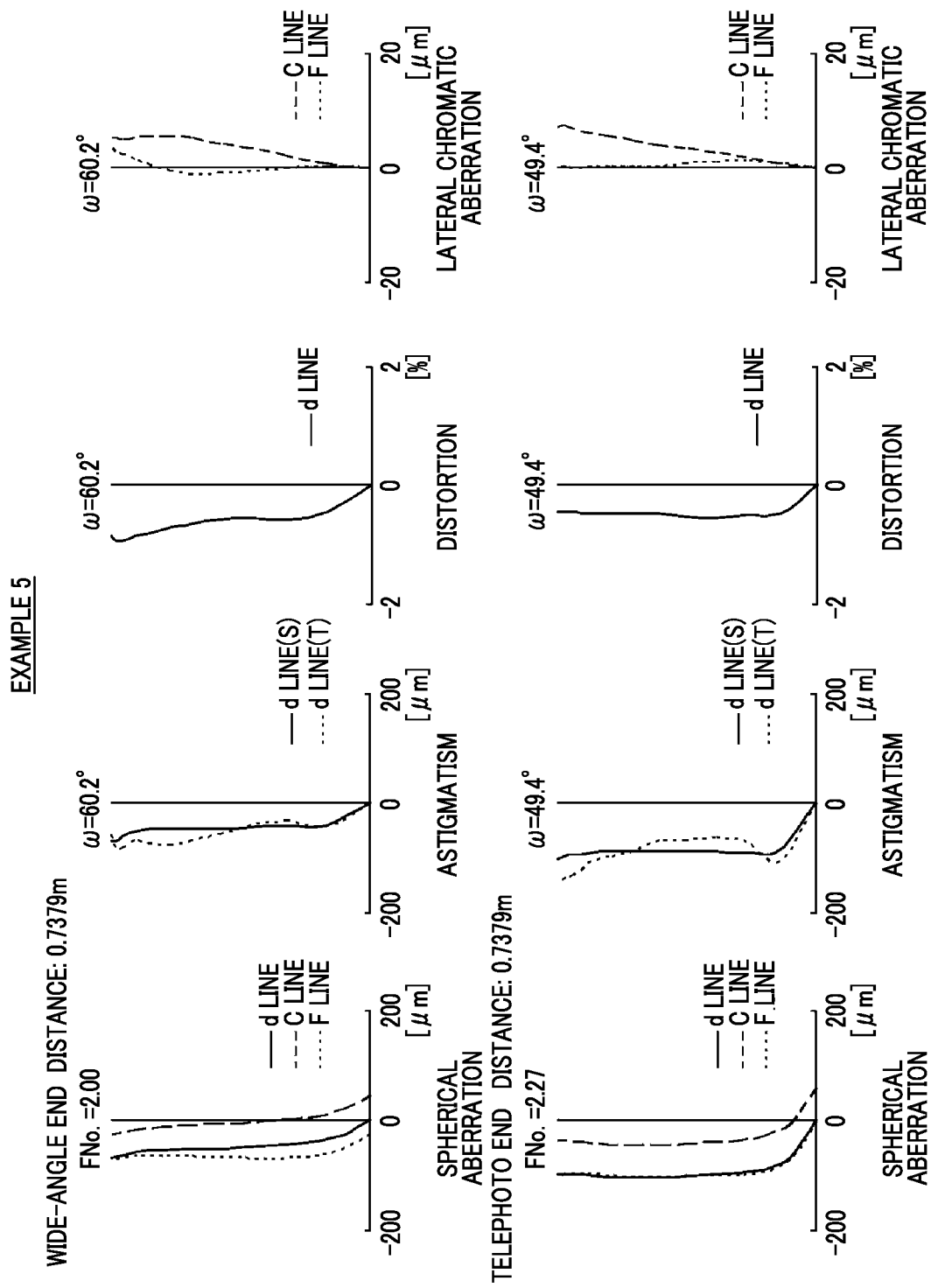
FIG. 17 is a diagram of aberrations of the zoom lens of Example 5 of the present invention.

Next, a zoom lens of Example 5 will be described. FIG. 5 is a cross-sectional diagram illustrating a configuration of the zoom lens of Example 5. The zoom lens of Example 5 has the same lens groups and has the same number of lenses as that of Example 4 except that the fourth lens group G4 includes five lenses as lenses L4a to L4e. Table 17 shows lens data of the zoom lens of Example 5, Table 18 shows data about specification, Table 19 shows surface spacings which are variable during zooming, Table 20 shows data about aspheric coefficients thereof, and FIG. 17 shows aberration diagrams.

TABLE 17

EXAMPLE 5•LENS DATA (n AND v ARE BASED ON d LINE)

| SURFACE NUMBER | RADIUS OF CURVATURE | SURFACE SPACING | n | v |
|---|---|---|---|---|
| *1 | −15.3257 | 3.1037 | 1.53158 | 55.08 |
| *2 | −34.7664 | 11.4247 | | |
| 3 | 40.3127 | 1.7647 | 1.62299 | 58.16 |
| 4 | 8.3917 | 9.8338 | | |
| 5 | −10.9413 | 7.9941 | 1.83481 | 42.72 |
| 6 | −16.9770 | 0.1377 | | |
| 7 | 188.6544 | 2.5038 | 1.89286 | 20.36 |
| 8 | −38.7881 | 1.9933 | | |
| 9 | 34.2031 | 0.9460 | 1.72825 | 28.46 |
| 10 | 16.8209 | 7.2415 | 1.49700 | 81.61 |
| 11 | −26.7371 | 0.5298 | | |
| 12 | 349.2887 | 0.9309 | 1.84666 | 23.78 |
| 13 | 18.5093 | 7.1110 | 1.49700 | 81.61 |
| 14 | −41.7340 | 0.1386 | | |
| *15 | 79.5713 | 2.7662 | 1.49100 | 57.58 |
| *16 | −621.3076 | DD[16] | | |
| 17 | 29.6563 | 7.5688 | 1.80400 | 46.58 |
| 18 | −95.4511 | 2.5605 | | |
| 19 | −36.6865 | 1.0339 | 1.51742 | 52.43 |
| 20 | 44.0816 | DD[20] | | |
| 21 | −51.4439 | 1.2418 | 1.48749 | 70.24 |
| 22 | 69.7223 | 2.2483 | | |
| 23 | 441.0518 | 7.4804 | 1.80518 | 25.42 |
| 24 | −34.1355 | 1.6469 | | |
| 25 | 28.8569 | 11.7241 | 1.80100 | 34.97 |
| 26 | −33.2020 | 1.5448 | 1.78472 | 25.68 |

TABLE 17-continued

EXAMPLE 5·LENS DATA (n AND v ARE BASED ON d LINE)

| SURFACE NUMBER | RADIUS OF CURVATURE | SURFACE SPACING | n | v |
|---|---|---|---|---|
| 27 | 24.1607 | DD[27] | | |
| 28 | 33.6046 | 3.5630 | 1.80100 | 34.97 |
| 29 | −180.2001 | 8.5971 | | |
| 30 | 13.5482 | 1.2464 | 1.51742 | 52.43 |
| 31 | 10.9987 | 3.2101 | | |
| 32(STOP) | ∞ | 3.4919 | | |
| 33 | −14.0473 | 4.4740 | 1.85478 | 24.80 |
| 34 | 70.6017 | 3.6976 | 1.59282 | 68.62 |
| 35 | −20.0695 | 0.1380 | | |
| 36 | 48.5692 | 4.7586 | 1.43875 | 94.66 |
| 37 | −23.3893 | DD[37] | | |
| 38 | 35.4283 | 3.8641 | 1.80809 | 22.76 |
| 39 | ∞ | 9.1746 | | |
| 40 | ∞ | 22.2759 | 1.51633 | 64.14 |
| 41 | ∞ | | | |

TABLE 18

EXAMPLE 5·SPECIFICATION (d LINE)

| | WIDE-ANGLE END | TELEPHOTO END |
|---|---|---|
| ZOOM RATIO | 1.0 | 1.5 |
| f | −5.71 | −8.57 |
| FNo. | 2.00 | 2.27 |
| 2ω [°] | 120.4 | 98.8 |

TABLE 19

EXAMPLE 5·SURFACE SPACING

| | WIDE-ANGLE END | TELEPHOTO END |
|---|---|---|
| DD[16] | 16.5809 | 19.4606 |
| DD[20] | 20.2889 | 25.0617 |
| DD[27] | 27.0637 | 5.4902 |
| DD[37] | 17.4423 | 31.3634 |

TABLE 20

EXAMPLE 5·ASPHERIC COEFFICIENT

| SURFACE NUMBER | 1 | 2 |
|---|---|---|
| KA | 2.4005572E−01 | 1.2982535E+00 |
| A3 | −9.4117956E−04 | −8.1119456E−04 |
| A4 | 8.2140376E−04 | 6.3727654E−04 |
| A5 | −6.1338797E−05 | −2.7193363E−05 |
| A6 | −1.6412446E−06 | −4.5371150E−06 |
| A7 | 4.2425029E−07 | 4.9118627E−07 |
| A8 | −9.2480460E−09 | −4.2465019E−09 |
| A9 | −1.4192032E−09 | −1.7105698E−09 |
| A10 | 7.8161464E−11 | 7.7499087E−11 |
| A11 | 1.7400643E−12 | 2.3931525E−12 |
| A12 | −2.2454204E−13 | −2.8190216E−13 |
| A13 | 1.7770892E−15 | 3.5062529E−15 |
| A14 | 3.0669185E−16 | 4.1255051E−16 |
| A15 | −7.6406657E−18 | −1.4330874E−17 |
| A16 | −1.7295229E−19 | −2.3154553E−19 |
| A17 | 8.1462036E−21 | 1.7632132E−20 |
| A18 | −1.0736468E−23 | −9.6081658E−23 |
| A19 | −2.9999139E−24 | −7.2952143E−24 |
| A20 | 3.4610499E−26 | 1.0689391E−25 |

TABLE 20-continued

EXAMPLE 5·ASPHERIC COEFFICIENT

| SURFACE NUMBER | 15 | 16 |
|---|---|---|
| KA | 1.0000000E+00 | 1.0000000E+00 |
| A3 | 8.4641293E−05 | −1.1528411E−04 |
| A4 | 6.0083889E−05 | 2.3260739E−04 |
| A5 | 1.6551479E−05 | −3.3901237E−05 |
| A6 | −7.5231031E−06 | 1.9336831E−06 |
| A7 | 1.5936698E−06 | 1.2051151E−06 |
| A8 | −4.8437602E−08 | −2.5129854E−07 |
| A9 | −3.6848452E−08 | 1.4573787E−09 |
| A10 | 4.6263308E−09 | 4.2460303E−09 |
| A11 | 2.9213247E−10 | −3.1764927E−10 |
| A12 | −8.8147072E−11 | −3.1421344E−11 |
| A13 | 2.0337483E−12 | 4.6018352E−12 |
| A14 | 6.9640960E−13 | 5.3879028E−14 |
| A15 | −4.6551873E−14 | −3.0930304E−14 |
| A16 | −2.0436648E−15 | 6.6051246E−16 |
| A17 | 2.7187232E−16 | 1.0269513E−16 |
| A18 | −1.9938241E−18 | −4.0507934E−18 |
| A19 | −5.4287538E−19 | −1.3563390E−19 |
| A20 | 1.5952204E−20 | 6.9559387E−21 |

Figure 6:
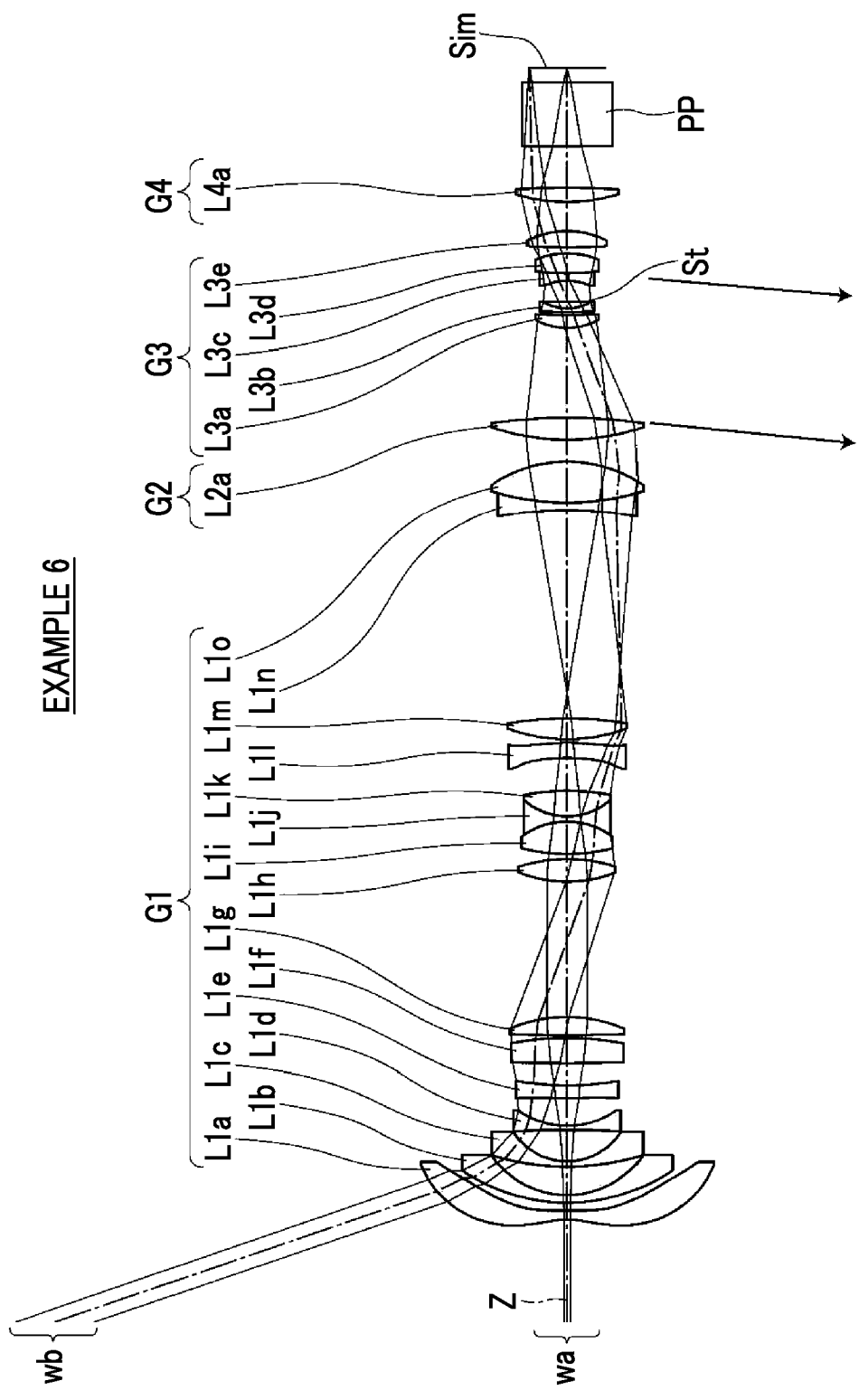
FIG. 6 is a cross-sectional view illustrating a configuration of a zoom lens of Example 6 of the present invention.

Next, a zoom lens of Example 6 will be described. FIG. 6 is a cross-sectional diagram illustrating a configuration of the zoom lens of Example 6.

The zoom lens of Example 6 includes, in order from the magnification side, a first lens group G1, a second lens group G2, a third lens group G3, and a fourth lens group G4. An intermediate image is formed in the first lens group G1. The first lens group G1 and the fourth lens group G4 remain stationary with respect to the reduction side imaging plane (image display surface Sim) during zooming. The second lens group G2 and the third lens group G3 are configured to move by changing spacings of the groups adjacent to each other in the direction of the optical axis during zooming.

The first lens group G1 includes fifteen lenses as lenses L1a to L1o. The second lens group G2 includes one lens as only a lens L2a. The third lens group G3 includes five lenses as lenses L3a to L3e. The fourth lens group G4 includes one lens as only a lens L4a.

Figure 18:
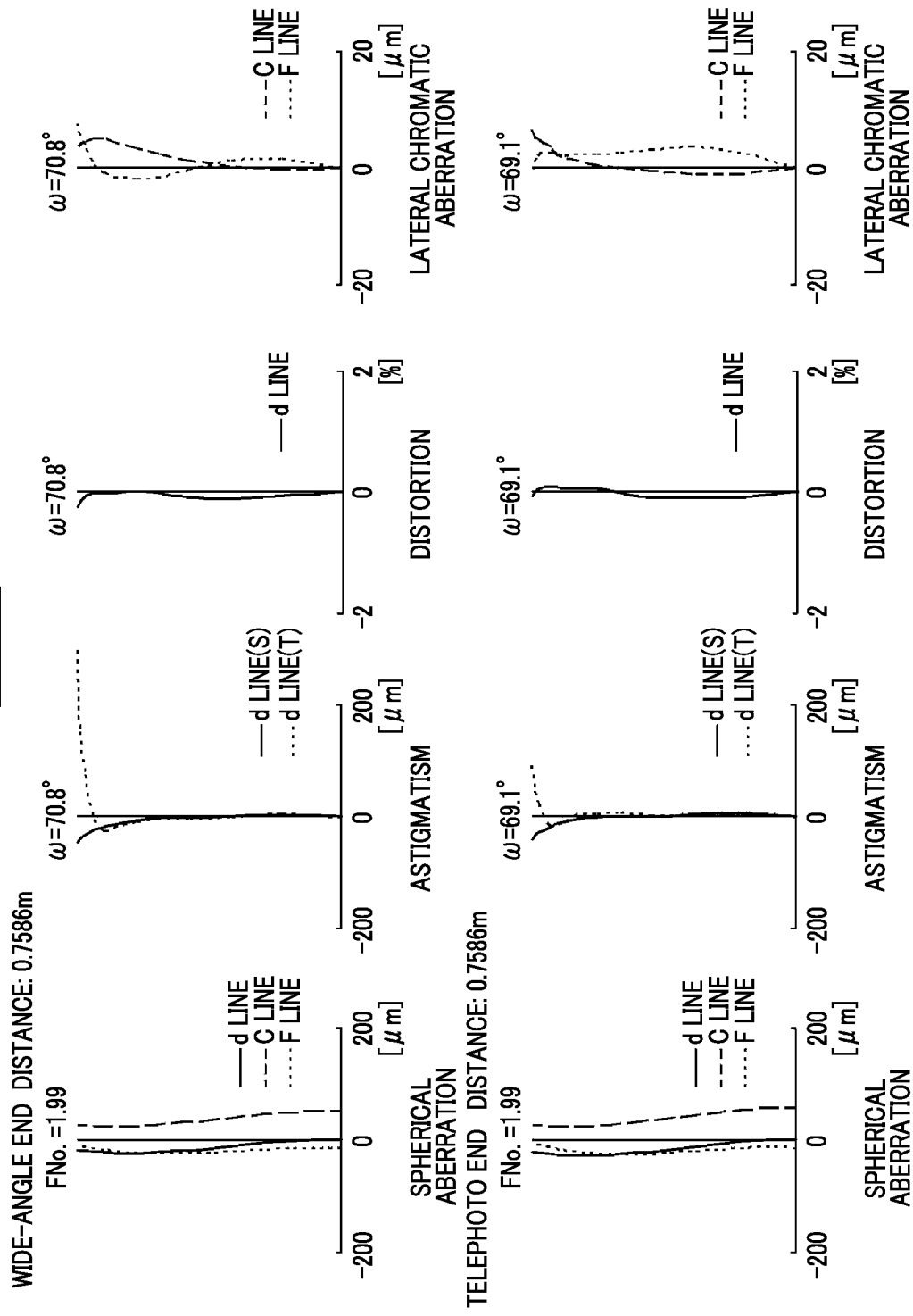
FIG. 18 is a diagram of aberrations of the zoom lens of Example 6 of the present invention.

Table 21 shows lens data of the zoom lens of Example 6, Table 22 shows data about specification, Table 23 shows surface spacings which are variable during zooming, Table 24 shows data about aspheric coefficients thereof, and FIG. 18 shows aberration diagrams.

TABLE 21

EXAMPLE 6·LENS DATA (n AND v ARE BASED ON d LINE)

| SURFACE NUMBER | RADIUS OF CURVATURE | SURFACE SPACING | n | v |
|---|---|---|---|---|
| *1 | −18.3142 | 2.4899 | 1.49100 | 57.58 |
| *2 | −96.9137 | 2.0712 | | |
| 3 | 48.9275 | 1.9993 | 1.76450 | 49.10 |
| 4 | 23.9647 | 7.6151 | | |
| 5 | 65.9865 | 1.4477 | 1.83400 | 37.16 |
| 6 | 16.7451 | 8.4092 | | |
| 7 | −262.7052 | 1.1035 | 1.76200 | 40.10 |
| 8 | 22.5206 | 7.2640 | | |
| *9 | 64.5661 | 3.4803 | 1.49100 | 57.58 |
| *10 | 47.6316 | 5.7784 | | |
| 11 | 459.6927 | 6.7869 | 1.74077 | 27.76 |
| 12 | −76.4039 | 0.6899 | | |
| 13 | 393.0750 | 4.9037 | 1.72047 | 34.71 |
| 14 | −37.8135 | 36.2305 | | |
| 15 | 34.5572 | 6.0416 | 1.53775 | 74.70 |
| 16 | −40.9192 | 1.3530 | | |
| 17 | 48.3048 | 8.6595 | 1.55352 | 71.72 |

TABLE 21-continued

EXAMPLE 6•LENS DATA (n AND v ARE BASED ON d LINE)

| SURFACE NUMBER | RADIUS OF CURVATURE | SURFACE SPACING | n | v |
|---|---|---|---|---|
| 18 | −20.1461 | 1.4095 | 1.80518 | 25.42 |
| 19 | 16.9499 | 6.8429 | 1.49700 | 81.54 |
| 20 | −59.0487 | 8.7868 | | |
| *21 | −43.6810 | 4.1374 | 1.49100 | 57.58 |
| *22 | −31.9961 | 0.8987 | | |
| 23 | 44.8348 | 5.5682 | 1.84666 | 23.78 |
| 24 | −92.5400 | 55.8754 | | |
| 25 | −93.4627 | 2.0689 | 1.80518 | 25.42 |
| 26 | 67.9624 | 10.9710 | 1.58144 | 40.89 |
| 27 | −35.2286 | DD[27] | | |
| 28 | 61.9752 | 5.8752 | 1.79952 | 42.22 |
| 29 | −135.9888 | DD[29] | | |
| 30 | 17.4375 | 3.3738 | 1.83481 | 42.72 |
| 31 | 106.9410 | 0.8537 | | |
| 32 | 167.9264 | 0.9631 | 1.74000 | 28.30 |
| 33 | 12.2493 | 1.7400 | | |
| 34(STOP) | ∞ | 5.6501 | | |
| 35 | −15.0061 | 2.0324 | 1.84666 | 23.78 |
| 36 | 70.3074 | 5.3081 | 1.53775 | 74.70 |
| 37 | −21.7095 | 1.6271 | | |
| 38 | 178.8720 | 4.3492 | 1.53775 | 74.70 |
| 39 | −23.3635 | DD[39] | | |
| 40 | 46.9154 | 3.8362 | 1.89286 | 20.36 |
| 41 | −188.9199 | 14.7937 | | |
| 42 | ∞ | 17.2414 | 1.51633 | 64.14 |
| 43 | ∞ | | | |

TABLE 22

EXAMPLE 6•SPECIFICATION (d LINE)

| | WIDE-ANGLE END | TELEPHOTO END |
|---|---|---|
| ZOOM RATIO | 1.0 | 1.1 |
| f | −3.47 | −3.81 |
| FNo. | 1.99 | 1.99 |
| 2ω [°] | 141.6 | 138.2 |

TABLE 23

EXAMPLE 6•SURFACE SPACING

| | WIDE-ANGLE END | TELEPHOTO END |
|---|---|---|
| DD[27] | 5.8860 | 0.3455 |
| DD[29] | 23.8400 | 27.3957 |
| DD[39] | 7.8289 | 9.8136 |

TABLE 24

EXAMPLE 6•ASPHERIC COEFFICIENT

| SURFACE NUMBER | 1 | 2 | 9 |
|---|---|---|---|
| KA | −1.2613865E+00 | −7.3647229E+00 | 1.0000000E+00 |
| A3 | 1.1196253E−03 | 1.9031889E−03 | 0.0000000E+00 |
| A4 | 6.1879132E−05 | −5.0287550E−04 | −1.4533914E−04 |
| A5 | −7.3041219E−06 | 1.5272557E−04 | 7.1537183E−06 |
| A6 | 1.8469896E−07 | −3.1440946E−05 | 1.3113009E−06 |
| A7 | 5.8099862E−09 | 4.4963146E−06 | −1.6648358E−07 |
| A8 | −4.0627724E−10 | −4.5741341E−07 | −2.8775798E−09 |
| A9 | 2.1741878E−12 | 3.3726144E−08 | 1.2313102E−09 |
| A10 | 3.8327193E−13 | −1.8233120E−09 | −2.7356804E−11 |
| A11 | −9.1297258E−15 | 7.2338783E−11 | −3.0053995E−12 |
| A12 | −1.1288974E−16 | −2.0816849E−12 | 1.2058813E−13 |
| A13 | 6.4368883E−18 | 4.2257416E−14 | 0.0000000E+00 |
| A14 | −3.1753242E−20 | −5.7339175E−16 | 0.0000000E+00 |

TABLE 24-continued

EXAMPLE 6•ASPHERIC COEFFICIENT

| | | | |
|---|---|---|---|
| A15 | −1.4578632E−21 | 4.6652540E−18 | 0.0000000E+00 |
| A16 | 1.7393012E−23 | −1.7206958E−20 | 0.0000000E+00 |
| A17 | | | 0.0000000E+00 |

| SURFACE NUMBER | 10 | 21 | 22 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −1.0652978E−04 | 1.0767184E−04 | 2.2917737E−04 |
| A5 | 9.5695242E−06 | −4.6749047E−06 | −1.5005036E−05 |
| A6 | 3.9287893E−07 | −2.0571848E−06 | −1.1577556E−06 |
| A7 | −1.1814696E−07 | 1.5517996E−07 | 1.8648484E−07 |
| A8 | 3.1171043E−09 | 1.7816833E−08 | 1.6385947E−09 |
| A9 | 5.3806466E−10 | −2.1237357E−09 | −1.1356529E−09 |
| A10 | −2.6654605E−11 | −8.7405600E−11 | 6.3097062E−12 |
| A11 | −7.7570364E−13 | 1.5134798E−11 | 4.2378755E−12 |
| A12 | 4.8619495E−14 | 1.5443689E−13 | −3.7212562E−14 |
| A13 | 0.0000000E+00 | −6.0858244E−14 | −9.3079102E−15 |
| A14 | 0.0000000E+00 | 3.1987853E−16 | 8.7785436E−17 |
| A15 | 0.0000000E+00 | 1.3207939E−16 | 1.0840632E−17 |
| A16 | 0.0000000E+00 | −1.0174698E−18 | −7.9476957E−20 |
| A17 | 0.0000000E+00 | −1.1978965E−19 | −5.1116703E−21 |

Figure 7:
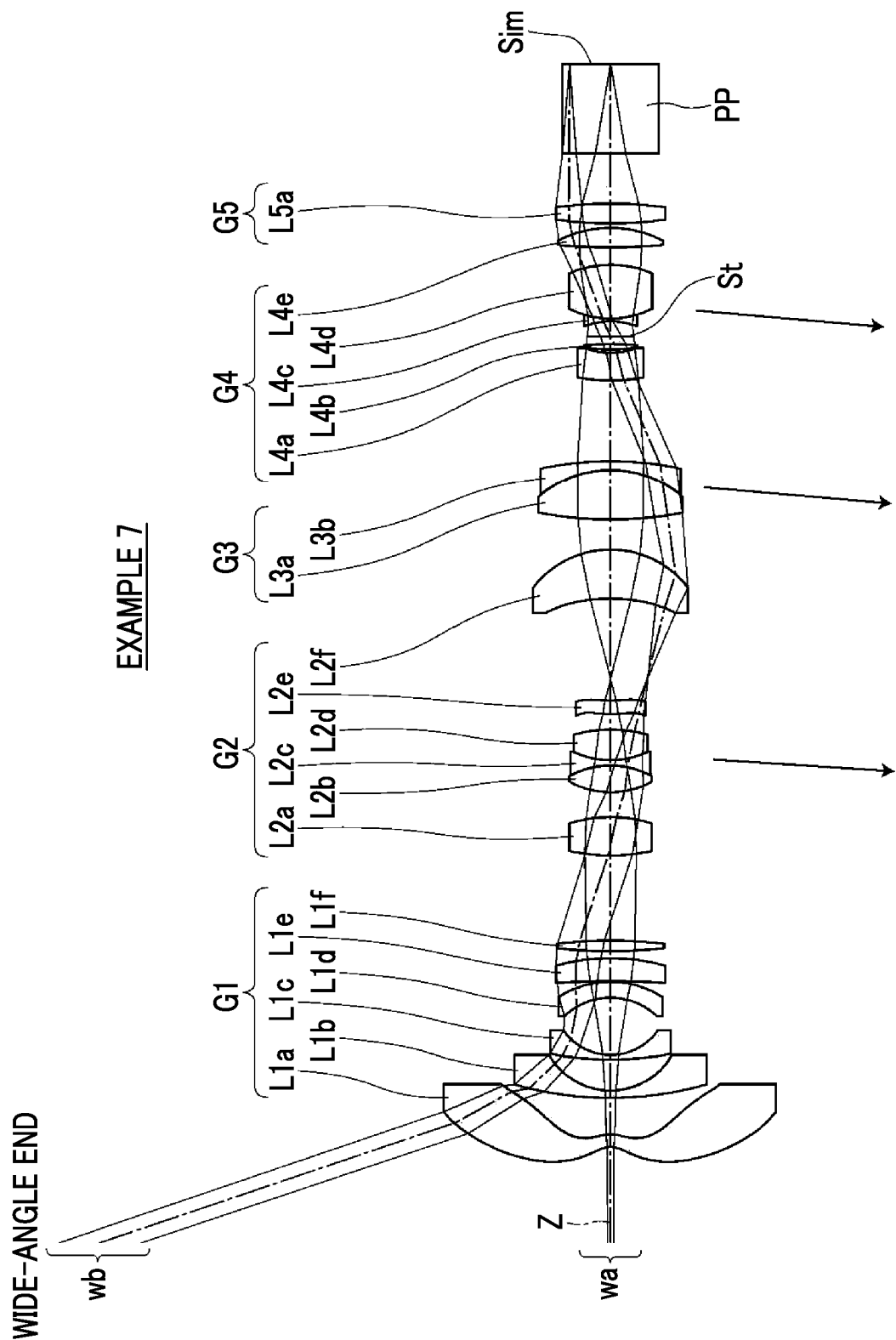
FIG. 7 is a cross-sectional view illustrating a configuration of a zoom lens of Example 7 of the present invention.

Next, a zoom lens of Example 7 will be described. FIG. 7 is a cross-sectional diagram illustrating a configuration of the zoom lens of Example 7.

The zoom lens of Example 7 includes, in order from the magnification side, a first lens group G1, a second lens group G2, a third lens group G3, a fourth lens group G4, and a fifth lens group G5. An intermediate image is formed in the second lens group G2. The first lens group G1 and the fifth lens group G5 remain stationary with respect to the reduction side imaging plane (image display surface Sim) during zooming. The second lens group G2, the third lens group G3, and the fourth lens group G4 are configured to move by changing spacings of the groups adjacent to each other in the direction of the optical axis during zooming.

The first lens group G1 includes six lenses as lenses L1a to L1f. The second lens group G2 includes six lenses as lenses L2a to L2f. The third lens group G3 includes two lenses as lenses L3a and L3b. The fourth lens group G4 includes five lenses as lenses L4a to L4e. The fifth lens group G5 includes one lens as only a lens L5a.

Figure 19:
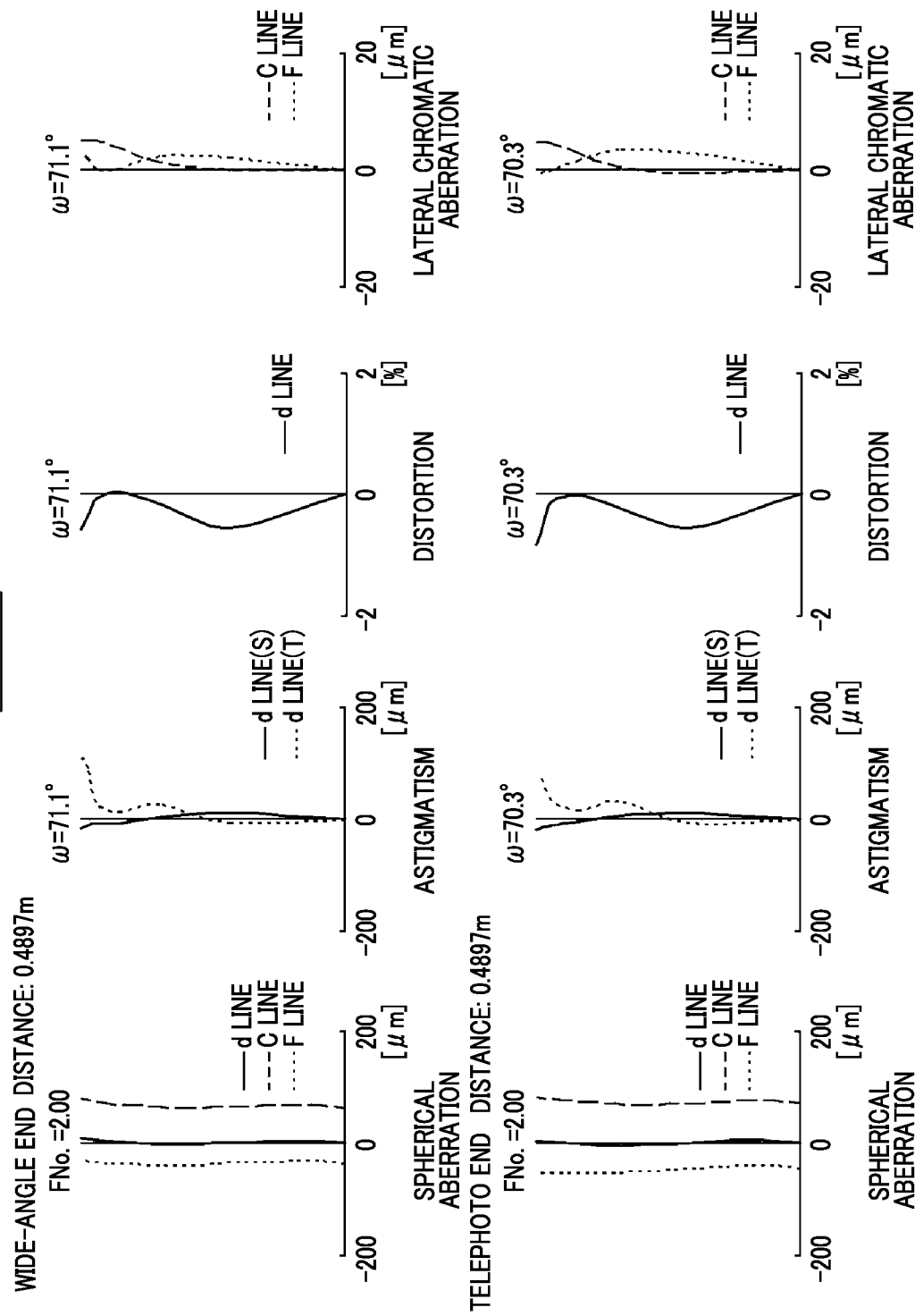
FIG. 19 is a diagram of aberrations of the zoom lens of Example 7 of the present invention.

Table 25 shows lens data of the zoom lens of Example 7, Table 26 shows data about specification, Table 27 shows surface spacings which are variable during zooming, Table 28 shows data about aspheric coefficients thereof, and FIG. 19 shows aberration diagrams.

TABLE 25

EXAMPLE 7•LENS DATA (n AND v ARE BASED ON d LINE)

| SURFACE NUMBER | RADIUS OF CURVATURE | SURFACE SPACING | n | v |
|---|---|---|---|---|
| *1 | −3.9258 | 3.1037 | 1.53158 | 55.08 |
| *2 | −6.6674 | 9.0167 | | |
| 3 | 84.5054 | 1.8402 | 1.69680 | 55.53 |
| 4 | 17.3088 | 7.6118 | | |
| *5 | 55.8371 | 1.2407 | 1.80400 | 46.58 |
| 6 | 13.9867 | 14.2116 | | |
| 7 | −16.1213 | 3.9488 | 1.59282 | 68.62 |
| 8 | −23.3208 | 0.1384 | | |
| 9 | −200.8834 | 5.7152 | 1.83481 | 42.72 |
| 10 | −49.0318 | 1.7248 | | |
| 11 | 107.6393 | 2.6253 | 1.90366 | 31.31 |
| 12 | −117.2064 | DD[12] | | |
| 13 | 48.1259 | 9.4978 | 1.49700 | 81.54 |

TABLE 25-continued

EXAMPLE 7•LENS DATA (n AND v ARE BASED ON d LINE)

| SURFACE NUMBER | RADIUS OF CURVATURE | SURFACE SPACING | n | v |
|---|---|---|---|---|
| 14 | −34.6322 | 6.2104 | | |
| 15 | 20.9019 | 6.6271 | 1.59282 | 68.62 |
| 16 | −20.6672 | 1.3306 | 1.80518 | 25.46 |
| 17 | 20.7742 | 7.5940 | 1.49700 | 81.54 |
| 18 | −33.2183 | 3.8261 | | |
| *19 | 23.8746 | 3.4286 | 1.49100 | 57.58 |
| *20 | 36.4478 | 25.0914 | | |
| *21 | −42.1535 | 12.2050 | 1.83400 | 37.16 |
| *22 | −23.7526 | DD[22] | | |
| 23 | 91.3107 | 12.4214 | 1.83481 | 42.72 |
| 24 | −26.5924 | 2.2066 | 1.84666 | 23.78 |
| 25 | −82.9830 | DD[25] | | |
| 26 | 39.8212 | 6.8970 | 1.89286 | 20.36 |
| 27 | 18.0179 | 0.8279 | | |
| 28 | 41.3339 | 1.3794 | 1.90366 | 31.31 |
| 29 | −68.8597 | 1.8857 | | |
| 30(STOP) | ∞ | 3.7475 | | |
| 31 | −16.9633 | 0.6900 | 1.84666 | 23.78 |
| 32 | 22.9259 | 13.3373 | 1.59282 | 68.62 |
| 33 | −25.6607 | 4.3219 | | |
| 34 | 140.1251 | 4.8737 | 1.49700 | 81.54 |
| 35 | −27.4746 | DD[35] | | |
| 36 | 90.2922 | 4.9518 | 1.89286 | 20.36 |
| 37 | −102.3716 | 12.4703 | | |
| 38 | ∞ | 22.2759 | 1.51633 | 64.14 |
| 39 | ∞ | | | |

TABLE 26

EXAMPLE 7•SPECIFICATION (d LINE)

| | WIDE-ANGLE END | TELEPHOTO END |
|---|---|---|
| ZOOM RATIO | 1.0 | 1.05 |
| f' | −3.39 | −3.56 |
| FNo. | 2.00 | 2.00 |
| 2ω [°] | 142.2 | 140.6 |

TABLE 27

EXAMPLE 7•SURFACE SPACING

| | WIDE-ANGLE END | TELEPHOTO END |
|---|---|---|
| DD[12] | 21.1893 | 21.1374 |
| DD[22] | 7.4621 | 4.1951 |
| DD[25] | 20.0685 | 21.6288 |
| DD[35] | 1.0616 | 2.8202 |

TABLE 28

EXAMPLE 7•ASPHERIC COEFFICIENT

| SURFACE NUMBER | 1 | 2 | 5 |
|---|---|---|---|
| KA | −1.7095288E+00 | −4.0432390E+00 | 1.0000000E+00 |
| A3 | 3.7980588E−03 | 3.1947917E−03 | |
| A4 | −6.8855043E−05 | −2.6705955E−04 | −3.0419920E−05 |
| A5 | −1.8832782E−05 | 2.2341850E−04 | |
| A6 | 1.2112954E−06 | −5.6914062E−05 | 1.1431133E−07 |
| A7 | 9.5009583E−09 | 8.1540380E−06 | |
| A8 | −3.0545738E−09 | −8.3028905E−07 | −5.7804966E−11 |
| A9 | 5.3192775E−11 | 6.5780530E−08 | |
| A10 | 3.6131407E−12 | −4.0301258E−09 | −2.9915434E−15 |
| A11 | −1.2403642E−13 | 1.7947509E−10 | |
| A12 | −1.9358350E−15 | −5.3941969E−12 | |
| A13 | 1.2359897E−16 | 1.0383180E−13 | |

TABLE 28-continued

EXAMPLE 7•ASPHERIC COEFFICIENT

| | | | |
|---|---|---|---|
| A14 | 4.4867357E−20 | −1.4902076E−15 | |
| A15 | −6.5401821E−20 | 2.7852683E−17 | |
| A16 | 4.6151956E−22 | −3.6274120E−19 | |
| A17 | 1.7941549E−23 | −6.3932566E−21 | |
| A18 | −2.0652057E−25 | 1.8413162E−22 | |
| A19 | −2.0089861E−27 | 1.3219347E−24 | |
| A20 | 2.9223794E−29 | −4.3919128E−26 | |

| SURFACE NUMBER | 19 | 20 | 21 |
|---|---|---|---|
| KA | −1.1452956E+02 | 3.8414928E+00 | 1.0000000E+00 |
| A3 | −5.1578410E−04 | −9.1363252E−04 | |
| A4 | 1.6124378E−03 | 3.3511935E−04 | −1.6924518E−06 |
| A5 | −5.0212685E−04 | −1.1248379E−04 | |
| A6 | 2.2052351E−05 | −2.5017511E−05 | −2.1647138E−08 |
| A7 | 9.9173935E−06 | 8.6185266E−06 | |
| A8 | −1.2398753E−06 | 1.7753935E−07 | 7.5379885E−12 |
| A9 | −7.8951964E−08 | −2.2635925E−07 | |
| A10 | 1.6799317E−08 | 5.5592846E−09 | 2.4173319E−15 |
| A11 | 3.1883320E−10 | 3.3275402E−09 | |
| A12 | −1.1702773E−10 | −1.5825195E−10 | |
| A13 | −5.7150368E−13 | −2.8011863E−11 | |
| A14 | 4.7045786E−13 | 1.7341278E−12 | |
| A15 | −1.6510937E−16 | 1.3432364E−13 | |
| A16 | −1.1031708E−15 | −9.7185723E−15 | |
| A17 | 2.1335677E−18 | −3.4097763E−16 | |
| A18 | 1.4056761E−18 | 2.7678648E−17 | |
| A19 | −2.2241176E−21 | 3.5467827E−19 | |
| A20 | −7.5435201E−22 | −3.1865180E−20 | |

| SURFACE NUMBER | 22 |
|---|---|
| KA | 1.0000000E+00 |
| A4 | 0.0000000E+00 |
| A6 | 0.0000000E+00 |
| A8 | 0.0000000E+00 |
| A10 | 0.0000000E+00 |

Figure 8:
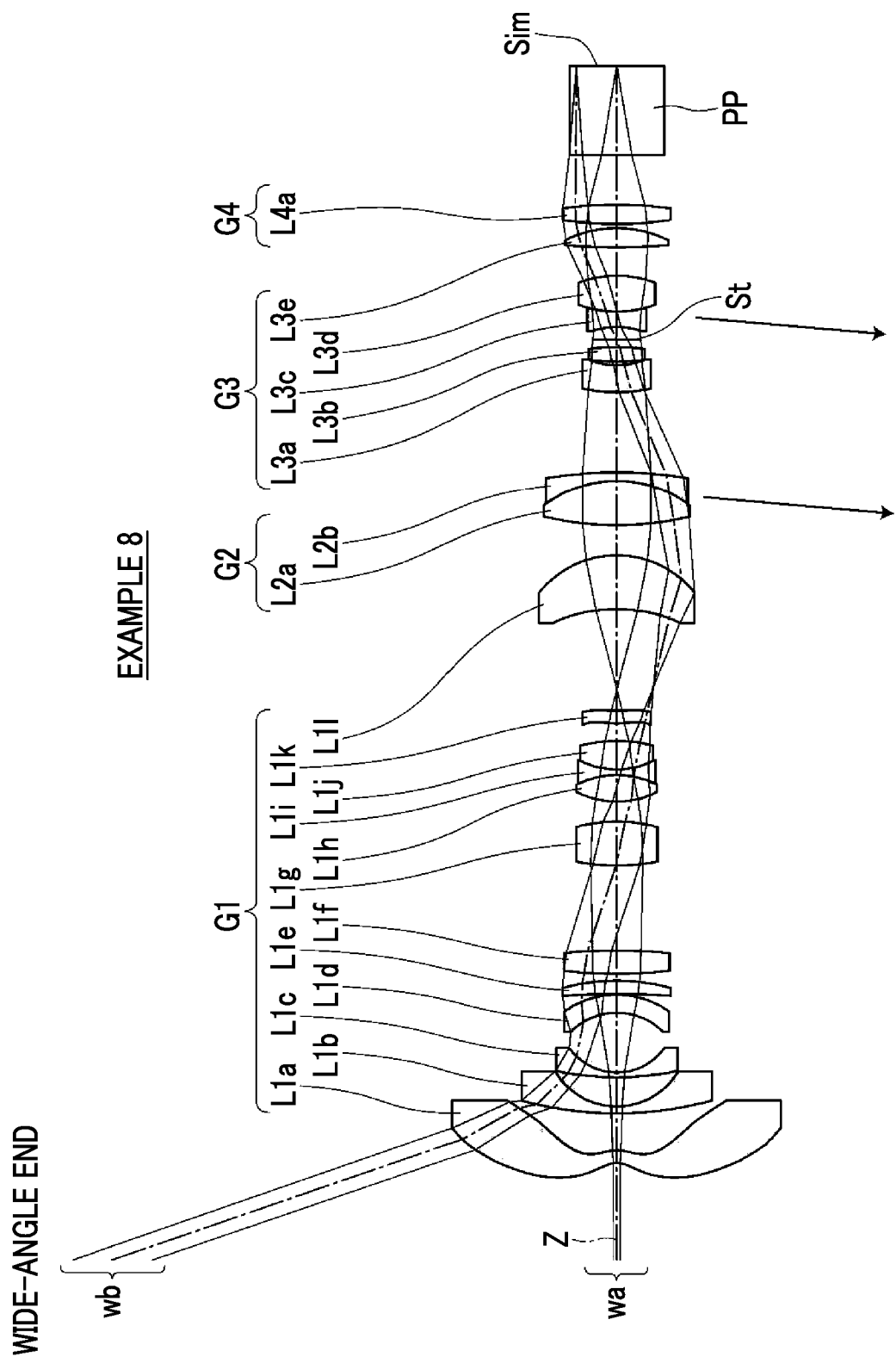
FIG. 8 is a cross-sectional view illustrating a configuration of a zoom lens of Example 8 of the present invention.

Next, a zoom lens of Example 8 will be described. FIG. 8 is a cross-sectional diagram illustrating a configuration of the zoom lens of Example 8.

The zoom lens of Example 8 includes, in order from the magnification side, a first lens group G1, a second lens group G2, a third lens group G3, and a fourth lens group G4. An intermediate image is formed in the first lens group G1. The first lens group G1 and the fourth lens group G4 remain stationary with respect to the reduction side imaging plane (image display surface Sim) during zooming. The second lens group G2 and the third lens group G3 are configured to move by changing spacings of the groups adjacent to each other in the direction of the optical axis during zooming.

The first lens group G1 includes twelve lenses as lenses L1a to L1l. The second lens group G2 includes two lenses as lenses L2a and L2b. The third lens group G3 includes five lenses as lenses L3a to L3e. The fourth lens group G4 includes one lens as only a lens L4a.

Figure 20:
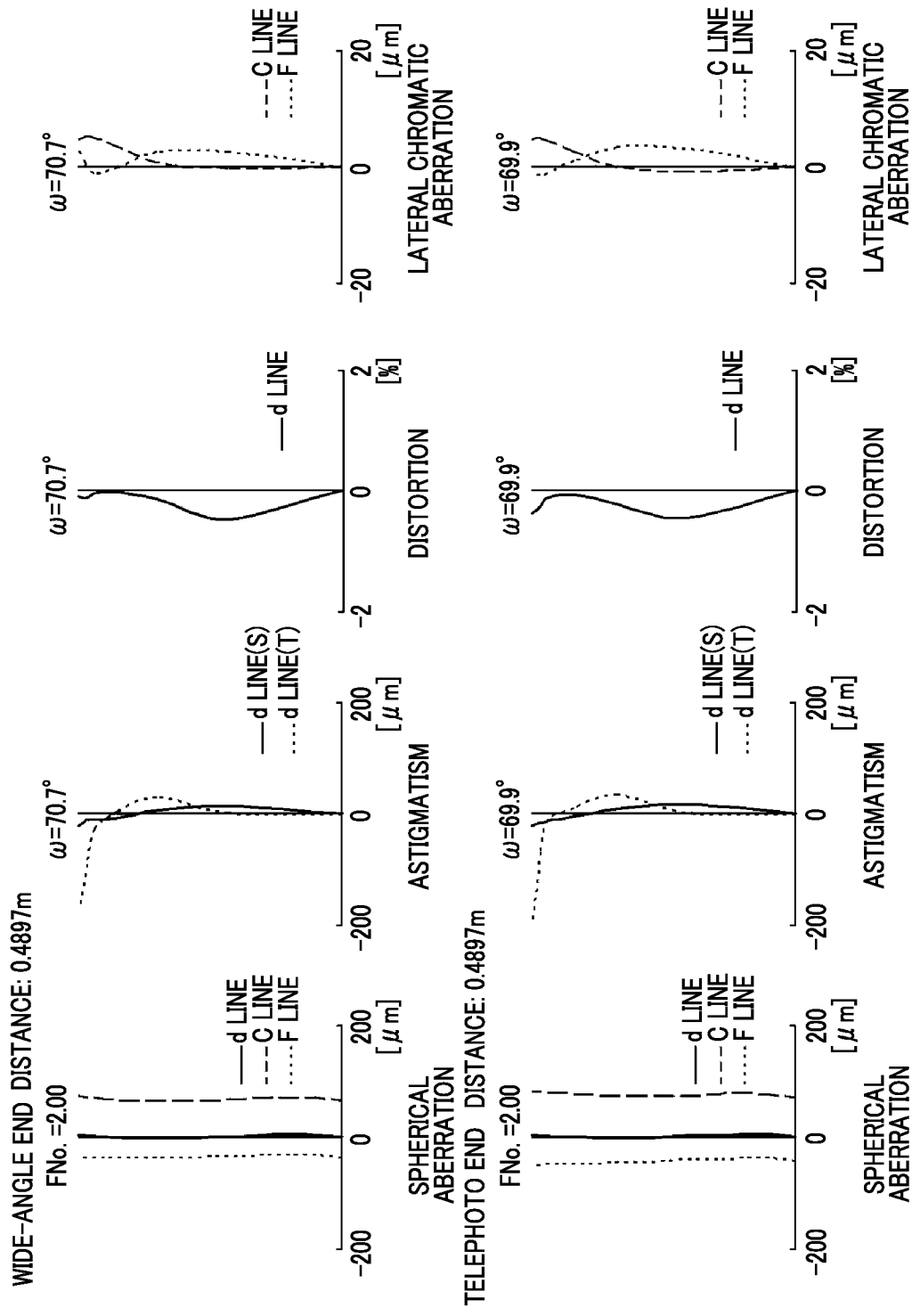
FIG. 20 is a diagram of aberrations of the zoom lens of Example 8 of the present invention.

Table 29 shows lens data of the zoom lens of Example 8, Table 30 shows data about specification, Table 31 shows surface spacings which are variable during zooming, Table 32 shows data about aspheric coefficients thereof, and FIG. 20 shows aberration diagrams.

TABLE 29

EXAMPLE 8•LENS DATA (n AND v ARE BASED ON d LINE)

| SURFACE NUMBER | RADIUS OF CURVATURE | SURFACE SPACING | n | v |
|---|---|---|---|---|
| *1 | −3.9261 | 3.1028 | 1.53158 | 55.08 |
| *2 | −6.6674 | 9.2268 | | |
| 3 | 87.9406 | 1.7243 | 1.69680 | 55.53 |
| 4 | 17.5353 | 7.2616 | | |
| *5 | 54.2864 | 1.2408 | 1.80400 | 46.58 |
| 6 | 14.2107 | 14.9180 | | |
| 7 | −15.9688 | 4.5125 | 1.59282 | 68.62 |
| 8 | −22.0377 | 0.1922 | | |
| 9 | −187.1105 | 3.3112 | 1.83481 | 42.72 |
| 10 | −50.1636 | 1.7243 | | |
| 11 | 109.2648 | 5.8546 | 1.90366 | 31.31 |
| 12 | −134.3402 | 21.2535 | | |
| 13 | 53.6247 | 10.9636 | 1.59282 | 68.62 |
| 14 | −38.6576 | 5.0139 | | |
| 15 | 21.6966 | 6.6322 | 1.59282 | 68.62 |
| 16 | −21.8692 | 1.4180 | 1.80518 | 25.46 |
| 17 | 19.6183 | 7.1138 | 1.49700 | 81.54 |
| 18 | −35.1083 | 4.4075 | | |
| *19 | 24.1707 | 3.1734 | 1.49100 | 57.58 |
| *20 | 39.6030 | 25.1690 | | |
| *21 | −41.1759 | 13.4971 | 1.83400 | 37.16 |
| *22 | −24.3035 | DD[22] | | |
| 23 | 75.9290 | 11.1603 | 1.83481 | 42.72 |
| 24 | −29.2766 | 2.2063 | 1.84666 | 23.78 |
| 25 | −104.0156 | DD[25] | | |
| 26 | 42.2806 | 6.7602 | 1.89286 | 20.36 |
| 27 | 18.8129 | 0.8641 | | |
| 28 | 47.3959 | 3.5848 | 1.90366 | 31.31 |
| 29 | −62.0620 | 1.8402 | | |
| 30(STOP) | ∞ | 3.2518 | | |
| 31 | −17.9944 | 3.8293 | 1.84666 | 23.78 |
| 32 | 27.2161 | 8.9730 | 1.59282 | 68.62 |
| 33 | −26.3998 | 7.0962 | | |
| 34 | 148.9135 | 4.8282 | 1.49700 | 81.54 |
| 35 | −28.1958 | DD[35] | | |
| 36 | 86.4463 | 4.8269 | 1.89286 | 20.36 |
| 37 | −100.4970 | 12.4117 | | |
| 38 | ∞ | 22.2759 | 1.51633 | 64.14 |
| 39 | ∞ | | | |

TABLE 30

EXAMPLE 8•SPECIFICATION (d LINE)

| | WIDE-ANGLE END | TELEPHOTO END |
|---|---|---|
| ZOOM RATIO | 1.0 | 1.05 |
| f | −3.44 | −3.61 |
| FNo. | 2.00 | 2.00 |
| 2ω [°] | 141.4 | 139.8 |

TABLE 31

EXAMPLE 8•SURFACE SPACING

| | WIDE-ANGLE END | TELEPHOTO END |
|---|---|---|
| DD[22] | 7.5586 | 4.2329 |
| DD[25] | 20.0872 | 21.4725 |
| DD[35] | 1.0117 | 2.9521 |

TABLE 32

EXAMPLE 8•ASPHERIC COEFFICIENT

| SURFACE NUMBER | 1 | 2 | 5 |
|---|---|---|---|
| KA | −1.7096202E+00 | −4.0425773E+00 | 1.0000000E+00 |
| A3 | 3.8021165E−03 | 3.1976851E−03 | |
| A4 | −6.9203959E−05 | −2.6675505E−04 | −3.0448817E−05 |
| A5 | −1.8877194E−05 | 2.2241895E−04 | |
| A6 | 1.2159913E−06 | −5.6650619E−05 | 1.1430408E−07 |
| A7 | 9.5627265E−09 | 8.1118225E−06 | |
| A8 | −3.0700011E−09 | −8.2528404E−07 | −5.7807943E−11 |
| A9 | 5.3319543E−11 | 6.5328545E−08 | |
| A10 | 3.6373704E−12 | −3.9995451E−09 | −2.9916774E−15 |
| A11 | −1.2452918E−13 | 1.7799017E−10 | |
| A12 | −1.9551069E−15 | −5.3454281E−12 | |
| A13 | 1.2422746E−16 | 1.0280014E−13 | |
| A14 | 5.1228778E−20 | −1.4742078E−15 | |
| A15 | −6.5800514E−20 | 2.7546286E−17 | |
| A16 | 4.6230070E−22 | −3.5855344E−19 | |
| A17 | 1.8068367E−23 | −6.3152675E−21 | |
| A18 | −2.0760382E−25 | 1.8172062E−22 | |
| A19 | −2.0251005E−27 | 1.3037456E−24 | |
| A20 | 2.9428653E−29 | −4.3274632E−26 | |

| SURFACE NUMBER | 19 | 20 | 21 |
|---|---|---|---|
| KA | −1.1452963E+02 | 3.8417266E+00 | 1.0000000E+00 |
| A3 | −4.8259692E−04 | −7.3834569E−04 | |
| A4 | 1.5476745E−03 | 2.3232706E−04 | −1.7065366E−06 |
| A5 | −5.0172623E−04 | −1.2011765E−04 | |
| A6 | 2.3616367E−05 | −2.0992650E−05 | −2.1663553E−08 |
| A7 | 9.8924709E−06 | 8.7048977E−06 | |
| A8 | −1.2594751E−06 | 8.9448159E−08 | 7.5361646E−12 |
| A9 | −7.8708984E−08 | −2.2482665E−07 | |
| A10 | 1.6937320E−08 | 6.7173772E−09 | 2.4170460E−15 |
| A11 | 3.1809099E−10 | 3.2716611E−09 | |
| A12 | −1.1757840E−10 | −1.6714905E−10 | |
| A13 | −5.7315864E−13 | −2.7350053E−11 | |
| A14 | 4.7161361E−13 | 1.7699804E−12 | |
| A15 | −1.4820445E−16 | 1.3044321E−13 | |
| A16 | −1.1040062E−15 | −9.7629965E−15 | |
| A17 | 2.0920832E−18 | −3.2961550E−16 | |
| A18 | 1.4047454E−18 | 2.7535087E−17 | |
| A19 | −2.1890990E−21 | 3.4144188E−19 | |
| A20 | −7.5289696E−22 | −3.1475857E−20 | |

| SURFACE NUMBER | 22 |
|---|---|
| KA | 1.0000000E+00 |
| A4 | 0.0000000E+00 |
| A6 | 0.0000000E+00 |
| A8 | 0.0000000E+00 |
| A10 | 0.0000000E+00 |

Figure 9:
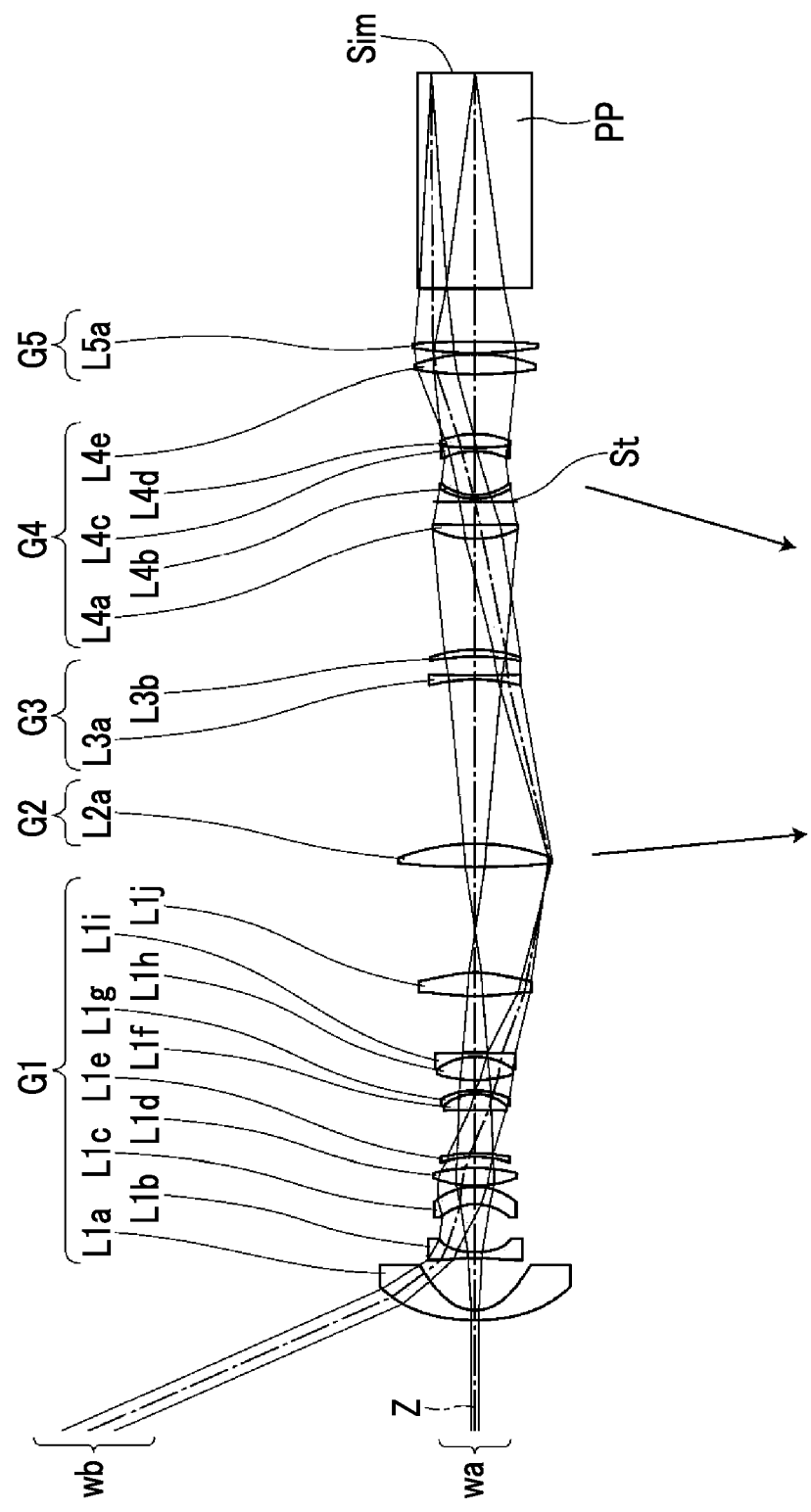
FIG. 9 is a cross-sectional view illustrating a configuration of a zoom lens of Example 9 of the present invention.

Next, a zoom lens of Example 9 will be described. FIG. 9 is a cross-sectional diagram illustrating a configuration of the zoom lens of Example 9.

The zoom lens of Example 9 includes, in order from the magnification side, a first lens group G1, a second lens group G2, a third lens group G3, a fourth lens group G4, and a fifth lens group G5. An intermediate image is formed between the first lens group G1 and the second lens group G2. The first lens group G1, third lens group G3, and fifth lens group G5 remain stationary with respect to the reduction side imaging plane (image display surface Sim) during zooming. The second lens group G2 and fourth lens group G4 are configured to move by changing spacings of the groups adjacent to each other in the direction of the optical axis during zooming.

The first lens group G1 includes ten lenses as lenses L1a to L1j. The second lens group G2 includes one lens as only a lens L2a. The third lens group G3 includes two lenses as lenses L3a and L3b. The fourth lens group G4 includes five lenses as lenses L4a to L4e. The fifth lens group G5 includes one lens as only a lens L5a.

Figure 21:
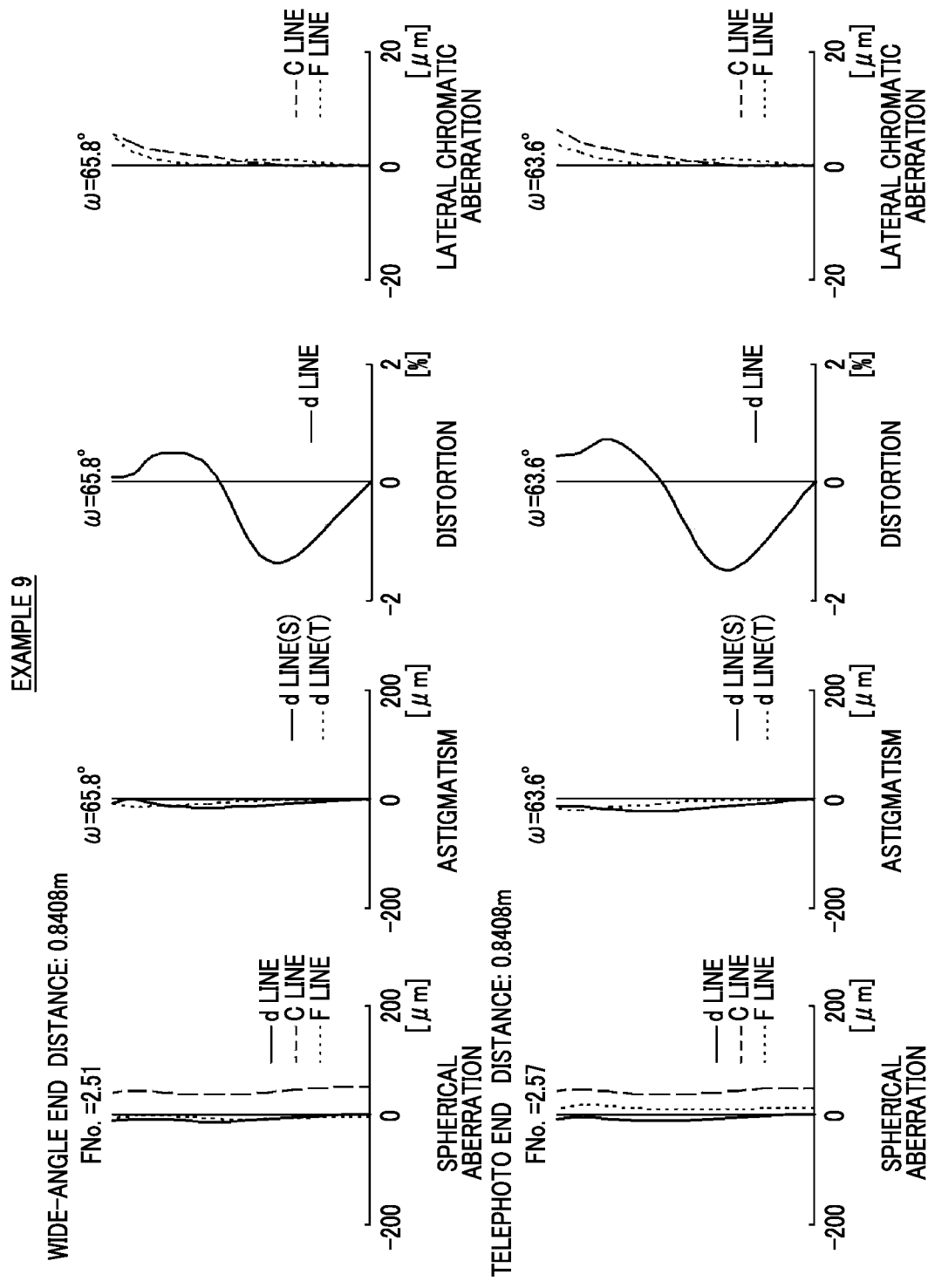
FIG. 21 is a diagram of aberrations of the zoom lens of Example 9 of the present invention.

Table 33 shows lens data of the zoom lens of Example 9, Table 34 shows data about specification, Table 35 shows surface spacings which are variable during zooming, Table 36 shows data about aspheric coefficients thereof, and FIG. 21 shows aberration diagrams.

TABLE 33

EXAMPLE 9•LENS DATA (n AND v ARE BASED ON d LINE)

| SURFACE NUMBER | RADIUS OF CURVATURE | SURFACE SPACING | n | v |
|---|---|---|---|---|
| *1 | 80.6473 | 2.2663 | 1.69350 | 53.18 |
| *2 | 9.1471 | 12.1164 | | |
| *3 | −31.3855 | 1.4168 | 1.80610 | 40.88 |
| *4 | 28.5427 | 11.0669 | | |
| 5 | −11.5837 | 4.0228 | 1.85150 | 40.78 |
| 6 | −14.1907 | 0.2266 | | |
| 7 | 26.1012 | 4.1199 | 1.85150 | 40.78 |
| 8 | −39.3966 | 2.3919 | | |
| 9 | −26.3672 | 0.8090 | 1.89286 | 20.36 |
| 10 | −42.4239 | 10.0949 | | |
| 11 | −130.4109 | 3.7052 | 1.49700 | 81.54 |
| 12 | −10.8701 | 0.7994 | 1.85478 | 24.80 |
| 13 | −16.7081 | 2.3929 | | |
| 14 | 29.6286 | 5.3920 | 1.49700 | 81.54 |
| 15 | −14.8446 | 0.9170 | 1.85478 | 24.80 |
| 16 | −383.4778 | 13.2031 | | |
| *17 | 68.7066 | 5.4422 | 1.69350 | 53.18 |
| *18 | −22.5650 | DD[18] | | |
| 19 | 172.1176 | 5.4189 | 1.85478 | 24.80 |
| 20 | −48.9826 | DD[20] | | |
| 21 | −40.0453 | 1.0256 | 1.51633 | 64.14 |
| 22 | 458.7553 | 4.2843 | | |
| 23 | −53.4461 | 1.5756 | 1.85478 | 24.80 |
| 24 | −31.7531 | DD[24] | | |
| 25 | 22.9231 | 3.2440 | 1.59522 | 67.73 |
| 26 | 800.8242 | 6.0807 | | |
| 27 | 15.1415 | 0.8276 | 1.51742 | 52.43 |
| 28 | 12.5991 | −1.5821 | | |
| 29(STOP) | ∞ | 11.7693 | | |
| 30 | −17.4861 | 0.7915 | 1.85478 | 24.80 |
| 31 | 56.7446 | 3.2223 | 1.49700 | 81.54 |
| 32 | −19.8211 | 13.5943 | | |
| 33 | 89.4278 | 4.7268 | 1.49700 | 81.54 |
| 34 | −40.5134 | DD[34] | | |
| 35 | 85.5280 | 2.6501 | 1.89286 | 20.36 |
| 36 | −229.9919 | 12.3069 | | |
| 37 | ∞ | 49.9717 | 1.51633 | 64.14 |
| 38 | ∞ | | | |

TABLE 34

EXAMPLE 9•SPECIFICATION (d LINE)

| | WIDE-ANGLE END | TELEPHOTO END |
|---|---|---|
| ZOOM RATIO | 1.0 | 1.2 |
| f' | −4.47 | −4.92 |
| FNo. | 2.51 | 2.57 |
| 2ω [°] | 131.6 | 127.2 |

TABLE 35

EXAMPLE 9•SURFACE SPACING

| | WIDE-ANGLE END | TELEPHOTO END |
|---|---|---|
| DD[18] | 24.4140 | 25.9129 |
| DD[20] | 38.0764 | 36.5775 |

TABLE 35-continued

EXAMPLE 9•SURFACE SPACING

| | WIDE-ANGLE END | TELEPHOTO END |
|---|---|---|
| DD[24] | 25.9106 | 21.2419 |
| DD[34] | 0.2266 | 4.8953 |

TABLE 36

EXAMPLE 9•ASPHERIC COEFFICIENT

| SURFACE NUMBER | 1 | 2 | 3 |
|---|---|---|---|
| KA | −1.5000009E+01 | −8.3138553E−01 | −1.9546431E+00 |
| A3 | 5.0192936E−04 | 1.5397733E−03 | 1.0217206E−03 |
| A4 | 1.3813260E−05 | −1.6804737E−04 | 1.0570408E−05 |
| A5 | −1.7493172E−06 | 6.6926079E−05 | 2.4547939E−07 |
| A6 | 4.5068924E−08 | −1.1336637E−05 | −5.0469845E−08 |
| A7 | 1.1460739E−09 | 1.3346904E−06 | −3.5471671E−09 |
| A8 | −5.7623835E−11 | −1.1195069E−07 | −2.0069276E−10 |
| A9 | 3.6117420E−13 | 6.6902463E−09 | −2.1817789E−11 |
| A10 | 4.9851959E−14 | −2.9503205E−10 | 1.6123686E−12 |
| A11 | −2.7350047E−16 | 9.3509927E−12 | 0.0000000E+00 |
| A12 | −7.5312433E−18 | −2.1179592E−13 | 0.0000000E+00 |
| A13 | −1.7597701E−18 | 3.5736699E−15 | 0.0000000E+00 |
| A14 | −2.6076418E−20 | −5.4826353E−19 | 0.0000000E+00 |
| A15 | −1.2760491E−21 | 4.4435133E−18 | 0.0000000E+00 |
| A16 | 1.7839243E−22 | −1.1322893E−18 | 0.0000000E+00 |
| A17 | 0.0000000E+00 | 0.0000000E+00 | |
| A18 | 0.0000000E+00 | 0.0000000E+00 | |

| SURFACE NUMBER | 4 | 17 | 18 |
|---|---|---|---|
| KA | −2.9301508E+00 | −1.4999997E+01 | −9.2436933E+00 |
| A3 | 8.7436548E−04 | −1.9554632E−04 | −4.8849906E−04 |
| A4 | 2.2674973E−04 | 1.1658459E−04 | 1.4274297E−04 |
| A5 | −8.5435837E−07 | −1.3930629E−05 | −5.7998387E−06 |
| A6 | 3.2122825E−07 | 1.5710087E−06 | −9.1208397E−07 |
| A7 | 3.4207549E−08 | −3.7222216E−07 | 1.2028741E−07 |
| A8 | 2.3164699E−09 | 5.2246701E−08 | −7.8678734E−09 |
| A9 | 3.2838785E−10 | −3.5217221E−09 | 5.1730820E−10 |
| A10 | 4.5502038E−11 | 6.2644007E−11 | −2.2754892E−11 |
| A11 | 0.0000000E+00 | 3.3491033E−12 | 8.4938115E−14 |
| A12 | 0.0000000E+00 | 2.0883187E−13 | 9.9028708E−16 |
| A13 | 0.0000000E+00 | −4.7126750E−14 | 1.8793747E−15 |
| A14 | 0.0000000E+00 | 2.3264908E−15 | −1.1902884E−16 |
| A15 | 0.0000000E+00 | −4.3412297E−17 | 3.0767507E−18 |
| A16 | 0.0000000E+00 | 4.7971008E−19 | 1.5636569E−19 |

Figure 10:
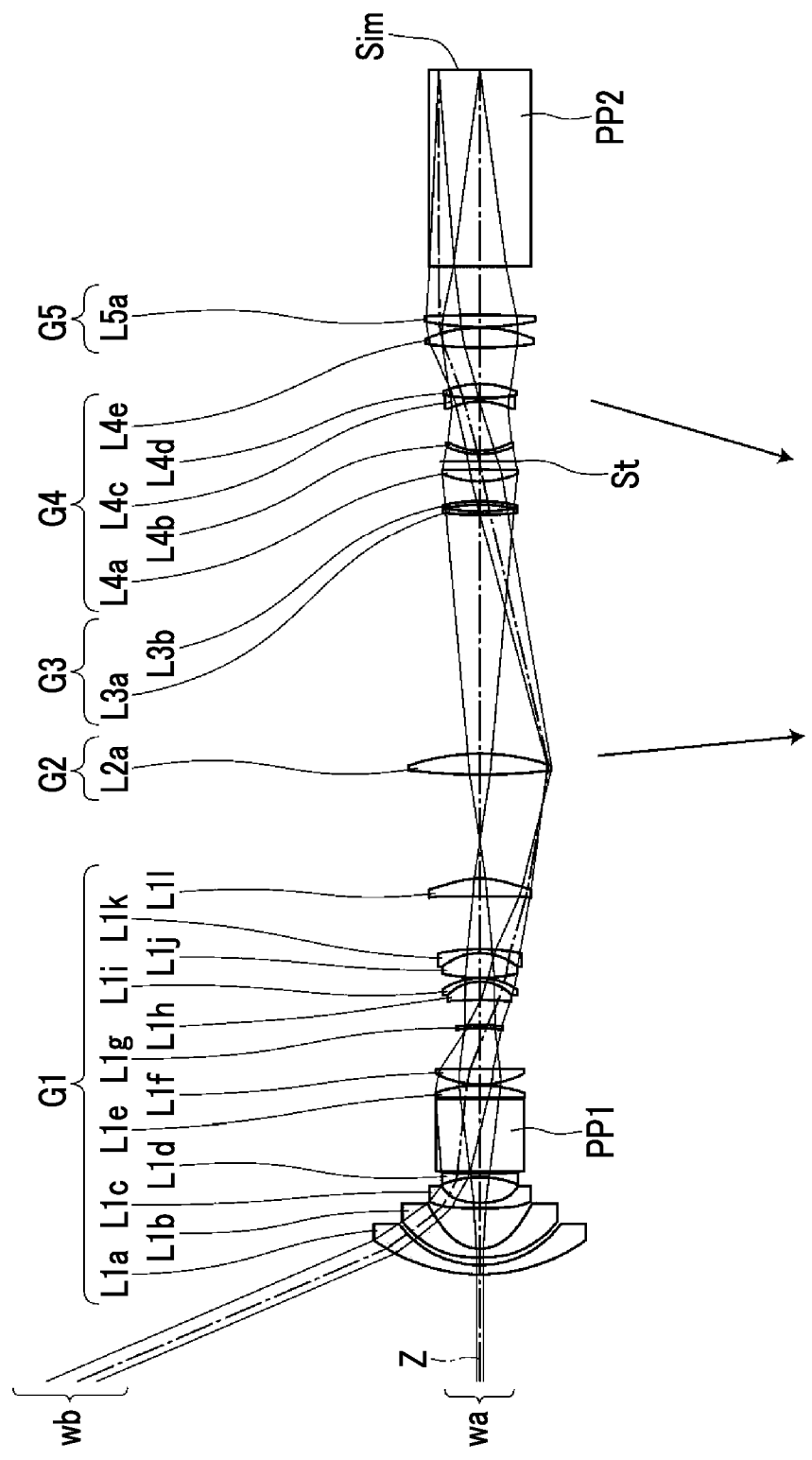
FIG. 10 is a cross-sectional view illustrating a configuration of a zoom lens of Example 10 of the present invention.
Figure 22:
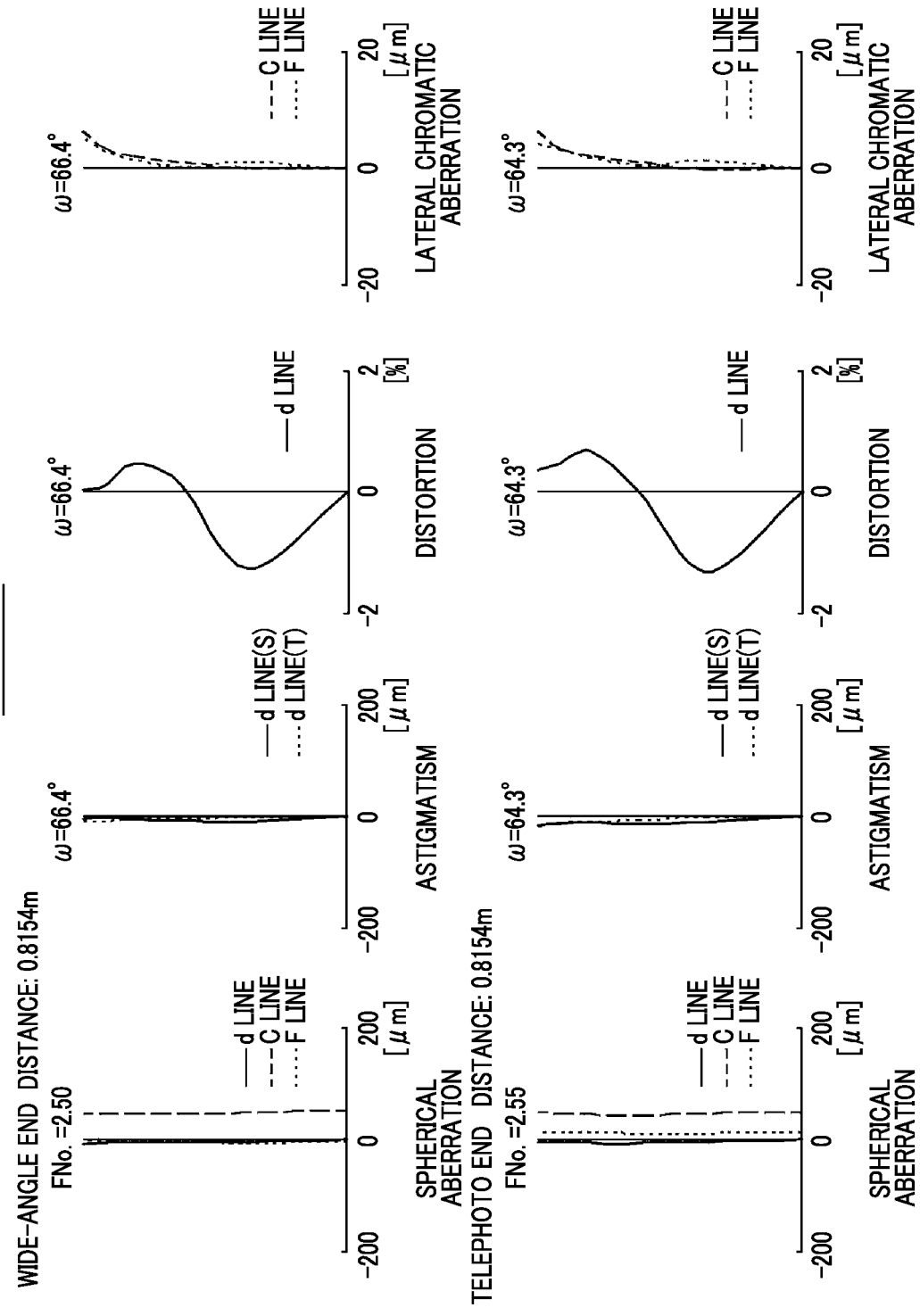
FIG. 22 is a diagram of aberrations of the zoom lens of Example 10 of the present invention.

Next, a zoom lens of Example 10 will be described. FIG. 10 is a cross-sectional diagram illustrating a configuration of the zoom lens of Example 10. The zoom lens of Example 10 has the same lens groups and has the same number of lenses as that of Example 9 except that the first lens group G1 includes twelve lenses as lenses L1a to L1l and an optical member PP1 such as a filter or a prism is further disposed in the first lens group G1. Table 37 shows lens data of the zoom lens of Example 10, Table 38 shows data about specification, Table 39 shows surface spacings which are variable during zooming, Table 40 shows data about aspheric coefficients thereof, and FIG. 22 shows aberration diagrams.

TABLE 37

EXAMPLE 10•LENS DATA (n AND v ARE BASED ON d LINE)

| SURFACE NUMBER | RADIUS OF CURVATURE | SURFACE SPACING | n | v |
|---|---|---|---|---|
| 1 | 43.5493 | 2.3077 | 1.48749 | 70.24 |
| 2 | 24.1070 | 1.8717 | | |
| *3 | 101.3646 | 2.1978 | 1.74320 | 49.29 |

TABLE 37-continued

EXAMPLE 10·LENS DATA (n AND v ARE BASED ON d LINE)

| SURFACE NUMBER | RADIUS OF CURVATURE | SURFACE SPACING | n | v |
|---|---|---|---|---|
| *4 | 10.7995 | 9.9458 | | |
| *5 | 357.4973 | 1.3738 | 1.80610 | 40.88 |
| *6 | 23.4037 | 6.2835 | | |
| 7 | −23.8538 | 0.9143 | 1.80610 | 33.27 |
| 8 | 150.0660 | 0.5495 | | |
| 9 | ∞ | 17.5824 | 1.56883 | 56.04 |
| 10 | ∞ | 0.2747 | | |
| 11 | 775.0687 | 3.0934 | 1.77250 | 49.60 |
| 12 | −32.7611 | 0.2203 | | |
| 13 | 22.5698 | 3.7803 | 1.85150 | 40.78 |
| 14 | 1455.2083 | 10.1488 | | |
| 15 | −30.0176 | 0.6430 | 1.89286 | 20.36 |
| 16 | −152.5180 | 6.1958 | | |
| 17 | −98.5244 | 4.5702 | 1.49700 | 81.54 |
| 18 | −10.8481 | 0.0169 | | |
| 19 | −10.8928 | 0.8802 | 1.85478 | 24.80 |
| 20 | −16.2185 | 0.0165 | | |
| 21 | 39.2965 | 6.1385 | 1.49700 | 81.54 |
| 22 | −13.9443 | 0.0160 | | |
| 23 | −13.9005 | 0.9716 | 1.85478 | 24.80 |
| 24 | −49.1119 | 12.9800 | | |
| *25 | −691.1619 | 4.4427 | 1.69350 | 53.18 |
| *26 | −18.8279 | DD[26] | | |
| 27 | 152.3088 | 5.1721 | 1.85478 | 24.80 |
| 28 | −52.1033 | DD[28] | | |
| 29 | 83.1611 | 0.8704 | 1.48749 | 70.24 |
| 30 | 51.7564 | 1.6021 | | |
| 31 | −46.4623 | 0.9161 | 1.85478 | 24.80 |
| 32 | −40.3936 | DD[32] | | |
| 33 | 23.2382 | 2.9106 | 1.59522 | 67.73 |
| 34 | −491.4993 | 3.8628 | | |
| 35 | 19.2688 | 0.7994 | 1.51742 | 52.43 |
| 36 | 15.2182 | −2.7477 | | |
| 37(STOP) | ∞ | 14.8108 | | |
| 38 | −17.9318 | 0.8558 | 1.85478 | 24.80 |
| 39 | 51.5347 | 0.1436 | | |
| 40 | 64.2360 | 3.3616 | 1.49700 | 81.54 |
| 41 | −23.2884 | 8.7646 | | |
| 42 | 95.0966 | 4.8923 | 1.49700 | 81.54 |
| 43 | −33.3077 | DD[43] | | |
| 44 | 66.3144 | 2.9233 | 1.89286 | 20.36 |
| 45 | −295.6039 | 11.9375 | | |
| 46 | ∞ | 48.4615 | 1.51680 | 64.20 |
| 47 | ∞ | | | |

TABLE 38

EXAMPLE 10·SPECIFICATION (d LINE)

| | WIDE-ANGLE END | TELEPHOTO END |
|---|---|---|
| ZOOM RATIO | 1.0 | 1.2 |
| f | −4.35 | −4.79 |
| FNo. | 2.50 | 2.55 |
| 2ω [°] | 132.8 | 128.6 |

TABLE 39

EXAMPLE 10·SURFACE SPACING

| | WIDE-ANGLE END | TELEPHOTO END |
|---|---|---|
| DD[26] | 25.5972 | 27.3540 |
| DD[28] | 59.0377 | 57.2809 |
| DD[32] | 4.8618 | 0.4992 |
| DD[43] | 0.2198 | 4.5824 |

TABLE 40

EXAMPLE 10·ASPHERIC COEFFICIENT

| SURFACE NUMBER | 3 | 4 | 5 |
|---|---|---|---|
| KA | −1.5000007E+01 | −1.4576312E+00 | −5.4774318E−10 |
| A3 | 1.7254107E−03 | 2.7681213E−03 | −2.6324255E−04 |
| A4 | −4.2496988E−05 | −2.2037422E−04 | 9.3099051E−05 |
| A5 | −5.9724591E−07 | 7.6979219E−05 | 9.4353221E−07 |
| A6 | 4.1013120E−08 | −1.3217029E−05 | −6.0240420E−08 |
| A7 | 1.9083180E−09 | 1.5993612E−06 | −5.2572057E−09 |
| A8 | −8.6390332E−11 | −1.3905058E−07 | −1.9081954E−10 |
| A9 | 1.2170722E−13 | 8.5387731E−09 | −2.2090743E−11 |
| A10 | 6.2887832E−14 | −3.8798505E−10 | 1.8529468E−12 |
| A11 | 1.6262859E−15 | 1.2645098E−11 | 0.0000000E+00 |
| A12 | 1.3401484E−16 | −3.0163614E−13 | 0.0000000E+00 |
| A13 | −7.9921787E−19 | 5.3287852E−15 | 0.0000000E+00 |
| A14 | 1.2835855E−19 | 1.8083257E−17 | 0.0000000E+00 |
| A15 | −1.5477827E−20 | 9.4744248E−18 | 0.0000000E+00 |
| A16 | −1.0995934E−21 | −9.1053100E−19 | 0.0000000E+00 |
| A17 | 0.0000000E+00 | 0.0000000E+00 | |
| A18 | 0.0000000E+00 | 0.0000000E+00 | |

| SURFACE NUMBER | 6 | 25 | 26 |
|---|---|---|---|
| KA | −6.5347449E+00 | −1.5000000E+01 | −3.0782784E+00 |
| A3 | −3.8578118E−04 | −3.6709915E−04 | −6.2508497E−04 |
| A4 | 3.4010059E−04 | 1.3792671E−04 | 1.6556743E−04 |
| A5 | −8.1669472E−06 | −1.5029243E−05 | −6.5113565E−06 |
| A6 | 6.3172104E−07 | 1.8073384E−06 | −1.0569726E−06 |
| A7 | 4.9565819E−08 | −4.4867499E−07 | 1.4613018E−07 |
| A8 | −1.9603076E−09 | 6.5012264E−08 | −9.5947743E−09 |
| A9 | −1.3817151E−10 | −4.4991912E−09 | 6.6740226E−10 |
| A10 | 9.1287309E−11 | 8.2773681E−11 | −3.0506800E−11 |
| A11 | 0.0000000E+00 | 4.4581574E−12 | 8.7982206E−14 |
| A12 | 0.0000000E+00 | 2.8743608E−13 | −1.5553915E−15 |
| A13 | 0.0000000E+00 | −6.8116372E−14 | 2.0846754E−15 |
| A14 | 0.0000000E+00 | 3.4193021E−15 | −1.9336142E−16 |
| A15 | 0.0000000E+00 | −7.0320149E−17 | 4.3416058E−18 |
| A16 | 0.0000000E+00 | 1.3984129E−18 | 6.0257943E−19 |

Figure 11:
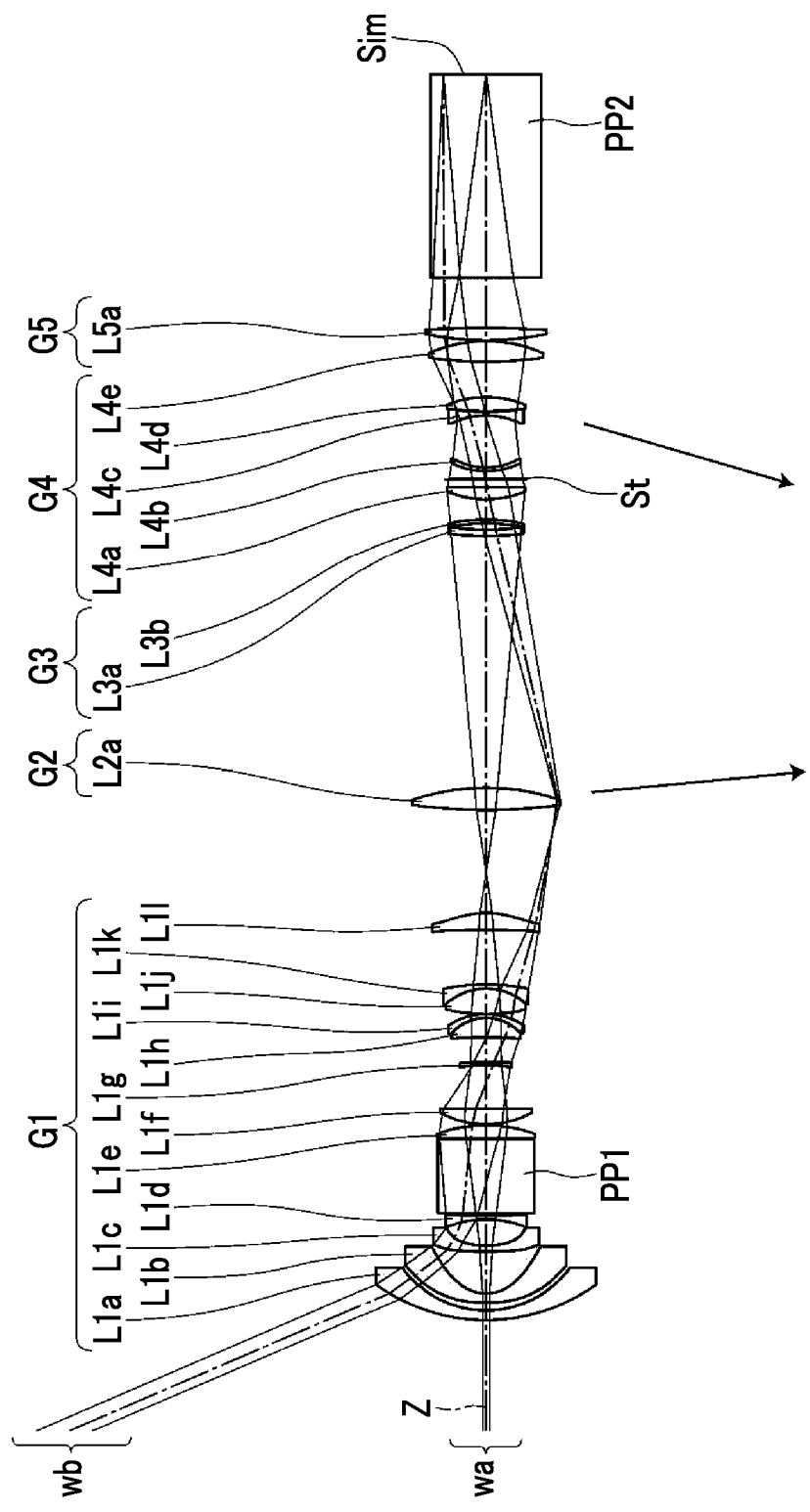
FIG. 11 is a cross-sectional view illustrating a configuration of a zoom lens of Example 11 of the present invention.
Figure 23:
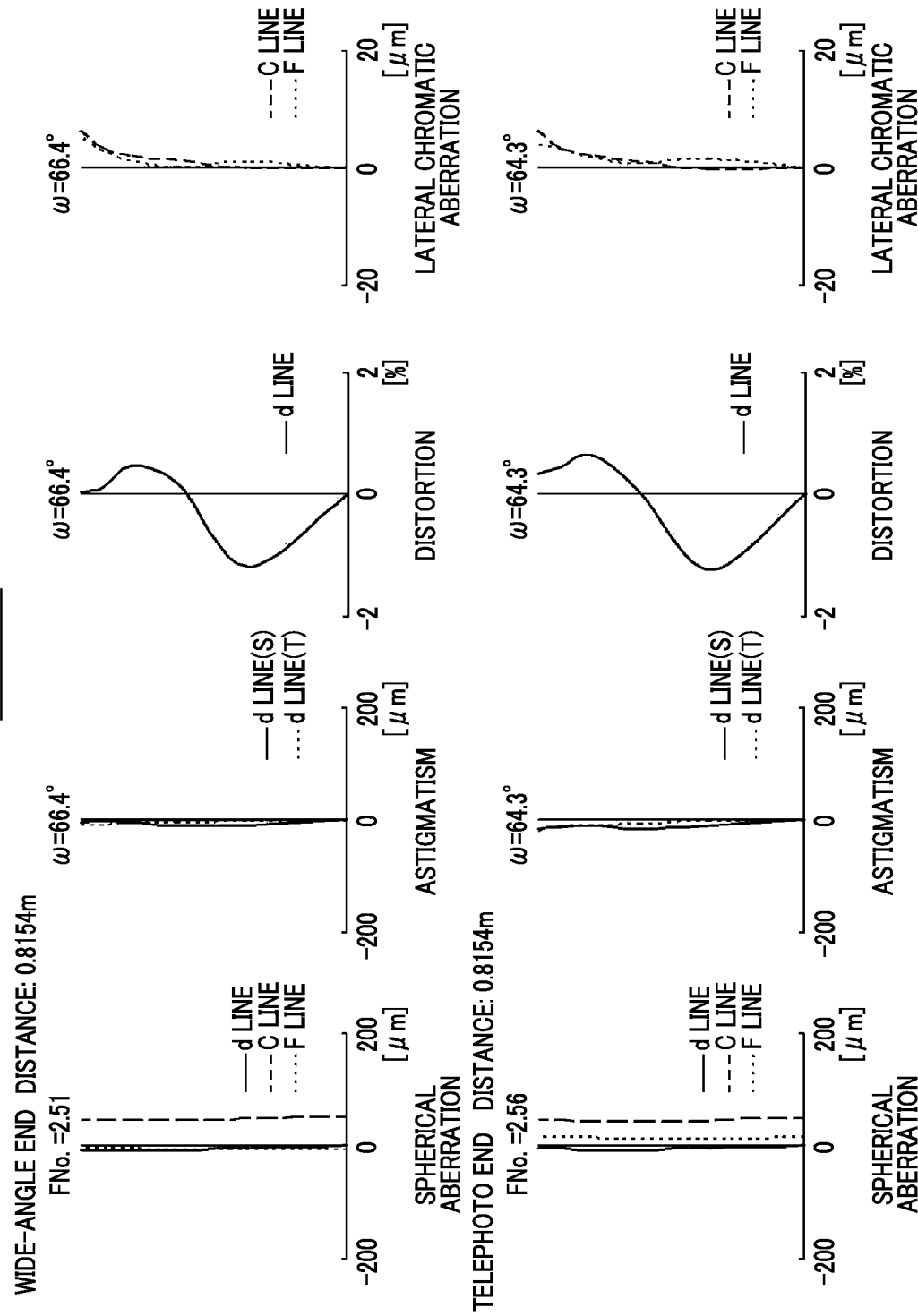
FIG. 23 is a diagram of aberrations of the zoom lens of Example 11 of the present invention.

Next, a zoom lens of Example 11 will be described. FIG. 11 is a cross-sectional diagram illustrating a configuration of the zoom lens of Example 11. The zoom lens of Example 11 has the same lens groups and has the same number of lenses as that of Example 10. Table 41 shows lens data of the zoom lens of Example 11, Table 42 shows data about specification, Table 43 shows surface spacings which are variable during zooming, Table 44 shows data about aspheric coefficients thereof, and FIG. 23 shows aberration diagrams.

TABLE 41

EXAMPLE 11·LENS DATA (n AND v ARE BASED ON d LINE)

| SURFACE NUMBER | SURFACE SPACING | SURFACE SPACING | n | v |
|---|---|---|---|---|
| 1 | 43.8581 | 2.3077 | 1.48749 | 70.24 |
| 2 | 24.1068 | 1.8638 | | |
| *3 | 99.7929 | 2.1978 | 1.74320 | 49.29 |
| *4 | 10.8115 | 9.9839 | | |
| *5 | 312.1093 | 1.3738 | 1.80610 | 40.88 |
| *6 | 23.2178 | 6.2608 | | |
| 7 | −24.0318 | 0.9157 | 1.80610 | 33.27 |
| 8 | 147.8776 | 0.5495 | | |
| 9 | ∞ | 17.5824 | 1.56883 | 56.04 |
| 10 | ∞ | 0.2747 | | |
| 11 | 643.0312 | 3.1011 | 1.77250 | 49.60 |
| 12 | −32.7815 | 0.2203 | | |
| 13 | 22.4774 | 3.7403 | 1.85150 | 40.78 |
| 14 | 854.0630 | 10.3939 | | |
| 15 | −29.6332 | 0.6429 | 1.89286 | 20.36 |
| 16 | −154.5876 | 5.9314 | | |
| 17 | −110.0067 | 4.6063 | 1.49700 | 81.54 |
| 18 | −10.7828 | 0.0169 | | |

TABLE 41-continued

EXAMPLE 11•LENS DATA (n AND ν ARE BASED ON d LINE)

| SURFACE NUMBER | SURFACE SPACING | SURFACE SPACING | n | ν |
|---|---|---|---|---|
| 19 | −10.8267 | 0.8801 | 1.85478 | 24.80 |
| 20 | −16.1231 | 0.0165 | | |
| 21 | 40.4879 | 6.0849 | 1.49700 | 81.54 |
| 22 | −13.8698 | 0.0160 | | |
| 23 | −13.8260 | 0.9716 | 1.85478 | 24.80 |
| 24 | −48.7780 | 12.8896 | | |
| *25 | −339.5718 | 4.1532 | 1.69350 | 53.18 |
| *26 | −18.9154 | DD[26] | | |
| 27 | 133.8577 | 5.2489 | 1.85478 | 24.80 |
| 28 | −53.3777 | DD[28] | | |
| 29 | 81.8394 | 1.4114 | 1.48749 | 70.24 |
| 30 | 53.0999 | 1.5397 | | |
| 31 | −49.3236 | 0.9294 | 1.85478 | 24.80 |
| 32 | −41.9046 | DD[32] | | |
| 33 | 23.2935 | 2.8683 | 1.59522 | 67.73 |
| 34 | −805.7511 | 3.8628 | | |
| 35 | 19.1716 | 0.8009 | 1.51742 | 52.43 |
| 36 | 15.0758 | −2.7477 | | |
| 37(STOP) | ∞ | 15.1810 | | |
| 38 | −17.9206 | 0.8641 | 1.85478 | 24.80 |
| 39 | 54.8697 | 0.1362 | | |
| 40 | 68.3061 | 3.3992 | 1.49700 | 81.54 |
| 41 | −23.1309 | 8.4139 | | |
| 42 | 96.6197 | 4.8727 | 1.49700 | 81.54 |
| 43 | −33.1682 | DD[43] | | |
| 44 | 69.3541 | 2.9119 | 1.89286 | 20.36 |
| 45 | −244.5488 | 11.9381 | | |
| 46 | ∞ | 48.4615 | 1.51680 | 64.20 |
| 47 | ∞ | | | |

TABLE 42

EXAMPLE 11•SPECIFICATION (d LINE)

| | WIDE-ANGLE END | TELEPHOTO END |
|---|---|---|
| ZOOM RATIO | 1.0 | 1.2 |
| f | −4.35 | −4.79 |
| FNo. | 2.51 | 2.56 |
| 2ω [°] | 132.8 | 128.6 |

TABLE 43

EXAMPLE 11•SURFACE SPACING

| | WIDE-ANGLE END | TELEPHOTO END |
|---|---|---|
| DD[26] | 24.5380 | 26.2860 |
| DD[28] | 60.0031 | 58.2551 |
| DD[32] | 4.8397 | 0.5151 |
| DD[43] | 0.2198 | 4.5444 |

TABLE 44

EXAMPLE 11•ASPHERIC COEFFICIENT

| SURFACE NUMBER | 3 | 4 | 5 |
|---|---|---|---|
| KA | −1.5000007E+01 | −1.4622018E+00 | −5.4774318E−10 |
| A3 | 1.7148403E−03 | 2.7291174E−03 | −3.1301751E−04 |
| A4 | −4.1139523E−05 | −2.1553986E−04 | 9.4372773E−05 |
| A5 | −6.3850074E−07 | 7.6905221E−05 | 9.4678795E−07 |
| A6 | 4.0464547E−08 | −1.3217289E−05 | −5.9591795E−08 |
| A7 | 1.9096290E−09 | 1.5994046E−06 | −5.2569334E−09 |
| A8 | −8.6629022E−11 | −1.3905639E−07 | −1.8770136E−10 |
| A9 | 9.6868845E−14 | 8.5384690E−09 | −2.2129787E−11 |
| A10 | 6.2280505E−14 | −3.8805536E−10 | 1.8814765E−12 |

TABLE 44-continued

EXAMPLE 11•ASPHERIC COEFFICIENT

| | | | |
|---|---|---|---|
| A11 | 1.8948633E−15 | 1.2644991E−11 | 0.0000000E+00 |
| A12 | 1.3439249E−16 | −3.0250740E−13 | 0.0000000E+00 |
| A13 | −7.0791591E−19 | 5.2974366E−15 | 0.0000000E+00 |
| A14 | 1.3732924E−19 | 1.9429898E−17 | 0.0000000E+00 |
| A15 | −1.5703611E−20 | 9.6659940E−18 | 0.0000000E+00 |
| A16 | −1.1623215E−21 | −8.9401512E−19 | 0.0000000E+00 |
| A17 | 0.0000000E+00 | 0.0000000E+00 | |
| A18 | 0.0000000E+00 | 0.0000000E+00 | |

| SURFACE NUMBER | 6 | 25 | 26 |
|---|---|---|---|
| KA | −6.7566765E+00 | −1.5000000E+01 | −3.0418931E+00 |
| A3 | −4.2516546E−04 | −3.6632389E−04 | −6.0239257E−04 |
| A4 | 3.4341383E−04 | 1.3903540E−04 | 1.6062672E−04 |
| A5 | −8.7709643E−06 | −1.5127602E−05 | −6.2697747E−06 |
| A6 | 6.4274946E−07 | 1.8190844E−06 | −1.0489575E−06 |
| A7 | 4.9948030E−08 | −4.4819984E−07 | 1.4632565E−07 |
| A8 | −1.8960761E−09 | 6.5019493E−08 | −9.5619825E−09 |
| A9 | −1.5087014E−10 | −4.4991447E−09 | 6.6740885E−10 |
| A10 | 8.8464869E−11 | 8.2697800E−11 | −3.0560676E−11 |
| A11 | 0.0000000E+00 | 4.4572955E−12 | 7.8188973E−14 |
| A12 | 0.0000000E+00 | 2.8767986E−13 | −2.4318354E−15 |
| A13 | 0.0000000E+00 | −6.8102330E−14 | 2.0393728E−15 |
| A14 | 0.0000000E+00 | 3.4187591E−15 | −1.8984228E−16 |
| A15 | 0.0000000E+00 | −7.0543566E−17 | 4.7701181E−18 |
| A16 | 0.0000000E+00 | 1.4069921E−18 | 6.0103775E−19 |

Figure 12:
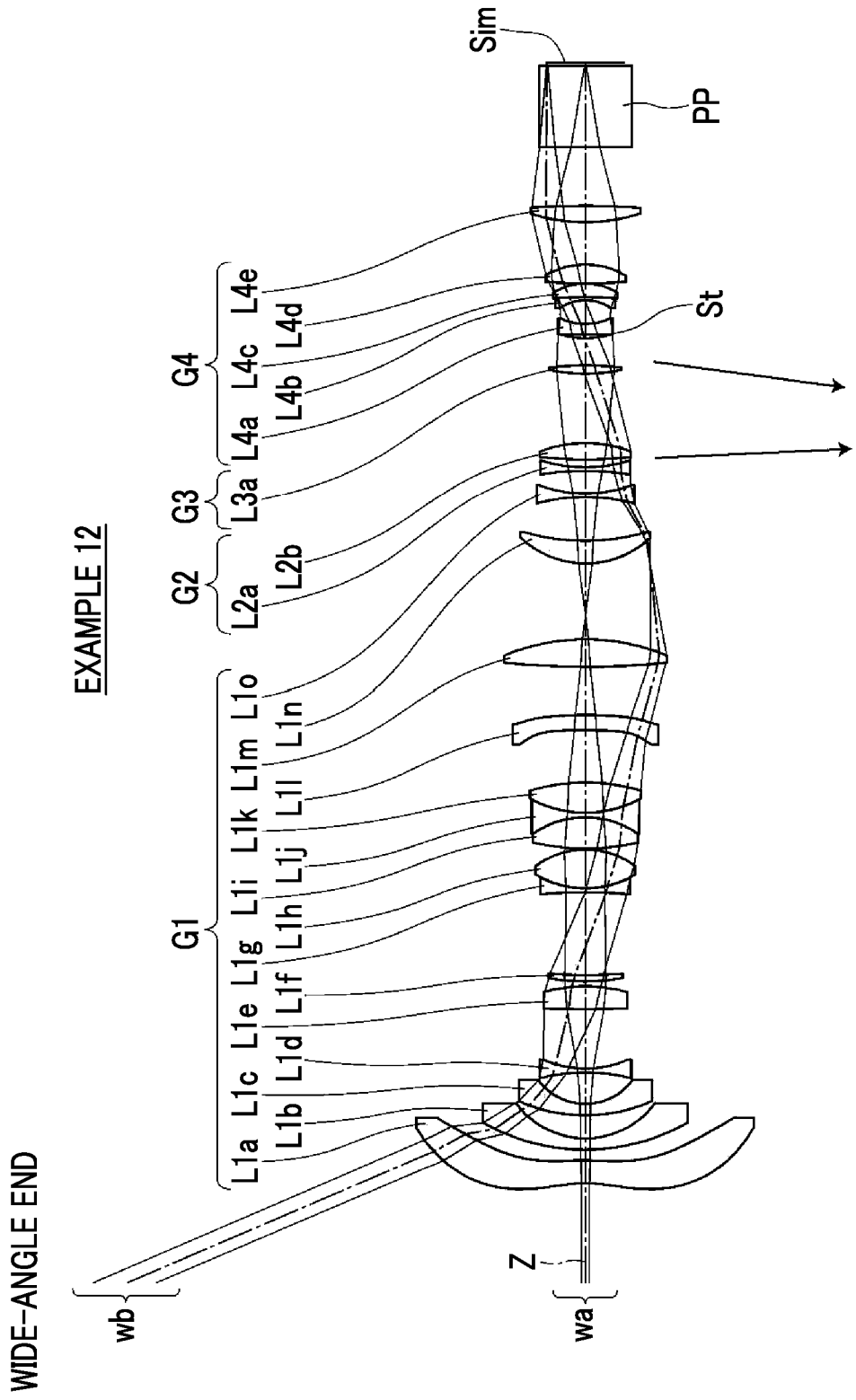
FIG. 12 is a cross-sectional view illustrating a configuration of a zoom lens of Example 12 of the present invention.

Next, a zoom lens of Example 12 will be described. FIG. 12 is a cross-sectional diagram illustrating a configuration of the zoom lens of Example 12.

The zoom lens of Example 12 includes, in order from the magnification side, a first lens group G1, a second lens group G2, a third lens group G3, and a fourth lens group G4. An intermediate image is formed in the first lens group G1. The first lens group G1 and the fourth lens group G4 remain stationary with respect to the reduction side imaging plane (image display surface Sim) during zooming. The second lens group G2 and the third lens group G3 are configured to move by changing spacings of the groups adjacent to each other in the direction of the optical axis during zooming.

The first lens group G1 includes fifteen lenses as lenses L1a to L1o. The second lens group G2 includes two lenses as lenses L2a and L2b. The third lens group G3 includes one lens as only a lens L3a. The fourth lens group G4 includes five lenses as lenses L4a to L4e.

Figure 24:
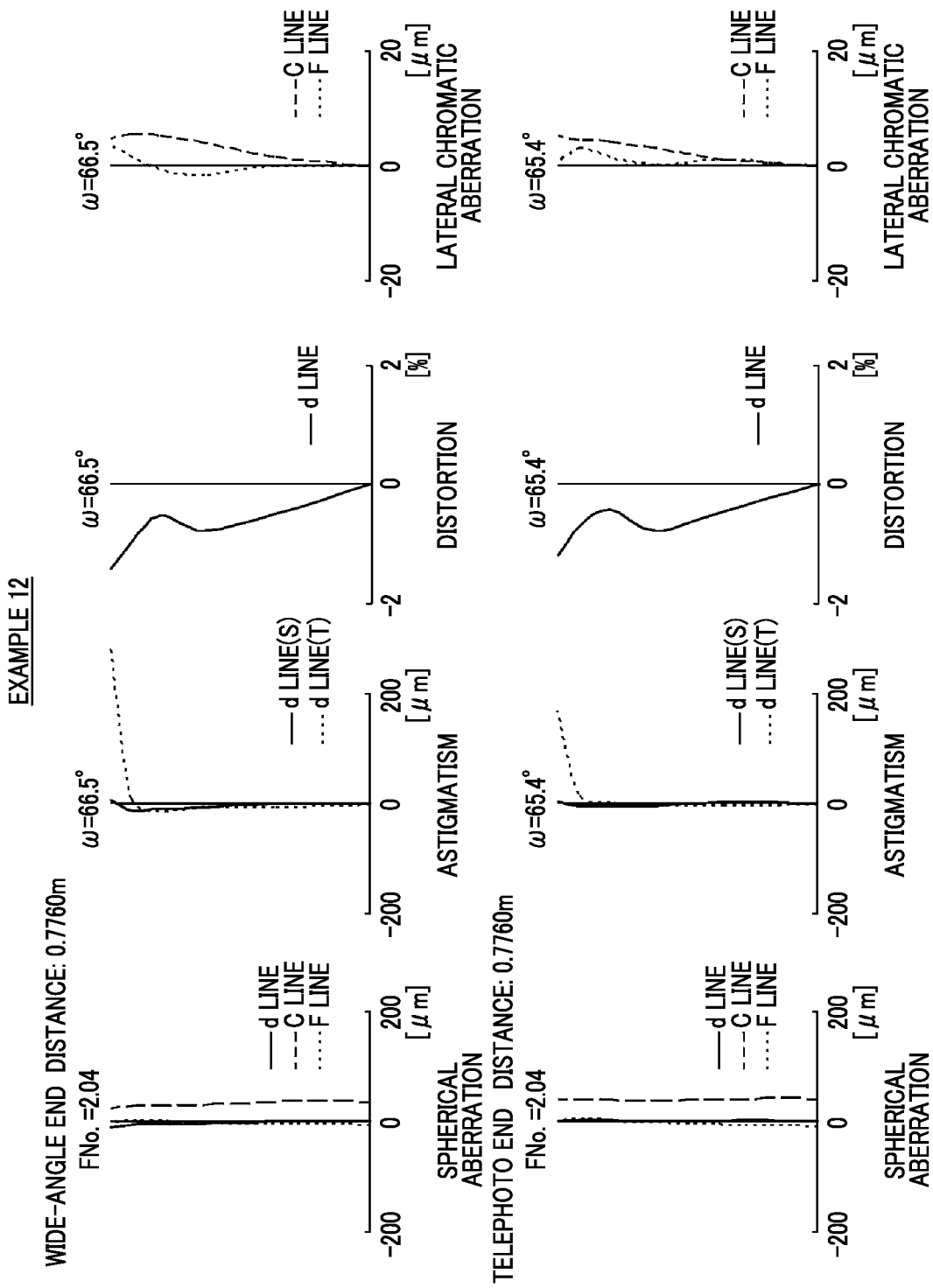
FIG. 24 is a diagram of aberrations of the zoom lens of Example 12 of the present invention.

Table 45 shows lens data of the zoom lens of Example 12, Table 46 shows data about specification, Table 47 shows surface spacings which are variable during zooming, Table 48 shows data about aspheric coefficients thereof, and FIG. 24 shows aberration diagrams.

TABLE 45

EXAMPLE 12•LENS DATA (n AND ν ARE BASED ON d LINE)

| SURFACE NUMBER | RADIUS OF CURVATURE | SURFACE SPACING | n | ν |
|---|---|---|---|---|
| *1 | −26.8240 | 6.0086 | 1.49100 | 57.58 |
| *2 | −59.2748 | 2.8138 | | |
| 3 | 52.9296 | 3.0043 | 1.69680 | 55.53 |
| 4 | 22.2042 | 6.0647 | | |
| 5 | 42.0590 | 3.0036 | 1.91082 | 35.25 |
| 6 | 14.9726 | 8.2664 | | |
| 7 | −47.9718 | 1.0645 | 1.67790 | 55.34 |
| 8 | 27.1712 | 15.6322 | | |
| 9 | 268.3152 | 6.0036 | 1.83400 | 37.16 |
| 10 | −40.7551 | 1.3055 | | |
| 11 | 53.4106 | 1.7102 | 1.89286 | 20.36 |
| 12 | 148.6430 | 21.7774 | | |

TABLE 45-continued

EXAMPLE 12•LENS DATA (n AND v ARE BASED ON d LINE)

| SURFACE NUMBER | RADIUS OF CURVATURE | SURFACE SPACING | n | v |
|---|---|---|---|---|
| 13 | −119.7356 | 1.0736 | 1.71736 | 29.52 |
| 14 | 25.3756 | 10.1677 | 1.49700 | 81.61 |
| 15 | −21.6515 | 0.2582 | | |
| 16 | 57.7764 | 8.2329 | 1.69680 | 55.53 |
| 17 | −23.7210 | 1.2258 | 1.80518 | 25.46 |
| 18 | 29.4272 | 7.9439 | 1.49700 | 81.61 |
| 19 | −49.4104 | 13.8069 | | |
| *20 | −110.8875 | 4.0343 | 1.49100 | 57.58 |
| *21 | −61.6001 | 12.4615 | | |
| 22 | 209.2060 | 7.2319 | 1.80518 | 25.46 |
| 23 | −54.5602 | 20.0085 | | |
| 24 | 24.4135 | 5.9549 | 1.80518 | 25.46 |
| 25 | 55.5728 | 11.5380 | | |
| 26 | −49.0525 | 1.1338 | 1.51742 | 52.43 |
| 27 | 34.2822 | DD[27] | | |
| 28 | −78.1637 | 1.0449 | 1.51633 | 64.14 |
| 29 | 38.3681 | 2.0222 | | |
| 30 | 105.9424 | 4.2918 | 1.80400 | 46.58 |
| 31 | −33.3591 | DD[31] | | |
| 32 | 48.2116 | 2.1756 | 1.59282 | 68.62 |
| 33 | −82.4081 | DD[33] | | |
| 34 | 24.0877 | 3.7248 | 1.53172 | 48.84 |
| 35 | 14.7601 | −2.7587 | | |
| 36(STOP) | ∞ | 9.0048 | | |
| 37 | −11.8748 | 0.7742 | 1.80518 | 25.46 |
| 38 | −116.7602 | 3.6749 | 1.59282 | 68.62 |
| 39 | −15.2041 | 0.0264 | | |
| 40 | 174.9138 | 4.8970 | 1.49700 | 81.61 |
| 41 | −20.7441 | 11.2230 | | |
| 42 | 46.8086 | 4.2888 | 1.89286 | 20.36 |
| 43 | −202.9853 | 16.3213 | | |
| 44 | ∞ | 21.4592 | 1.51633 | 64.14 |
| 45 | ∞ | | | |

TABLE 46

EXAMPLE 12•SPECIFICATION (d LINE)

| | WIDE-ANGLE END | TELEPHOTO END |
|---|---|---|
| ZOOM RATIO | 1.0 | 1.05 |
| f' | −4.37 | −4.59 |
| FNo. | 2.04 | 2.04 |
| 2ω [°] | 133.0 | 130.8 |

TABLE 47

EXAMPLE 12•SURFACE SPACING

| | WIDE-ANGLE END | TELEPHOTO END |
|---|---|---|
| DD[27] | 5.8813 | 6.8588 |
| DD[31] | 18.3439 | 14.4762 |
| DD[33] | 7.1794 | 10.0696 |

TABLE 48

EXAMPLE 12•ASPHERIC COEFFICIENT

| SURFACE NUMBER | 1 | 2 |
|---|---|---|
| KA | −2.2463406E−01 | −1.4999999E+01 |
| A3 | 6.8570926E−04 | 1.1927392E−03 |
| A4 | 2.5485348E−05 | −2.1973702E−04 |
| A5 | −1.8573512E−06 | 4.9200816E−05 |
| A6 | 2.8410400E−08 | −7.6434285E−06 |
| A7 | 8.6906023E−10 | 8.2604595E−07 |
| A8 | −3.5549187E−11 | −6.3512460E−08 |
| A9 | 4.0145010E−14 | 3.5390246E−09 |
| A10 | 1.8478805E−14 | −1.4456968E−10 |
| A11 | −2.7883496E−16 | 4.3338360E−12 |
| A12 | −3.0412131E−18 | −9.4241706E−14 |
| A13 | 1.1098143E−19 | 1.4457689E−15 |
| A14 | −3.7350058E−22 | −1.4824922E−17 |
| A15 | −1.3701679E−23 | 9.1124161E−20 |
| A16 | 1.2106973E−25 | −2.5376351E−22 |
| A17 | 0.0000000E+00 | 0.0000000E+00 |
| A18 | 0.0000000E+00 | 0.0000000E+00 |

| SURFACE NUMBER | 20 | 21 |
|---|---|---|
| KA | −1.5000000E+01 | −5.2188357E+00 |
| A3 | −4.6130151E−05 | −4.3502524E−05 |
| A4 | 7.5339825E−05 | 9.9238678E−05 |
| A5 | −1.0897990E−05 | −4.7089452E−06 |
| A6 | 1.0577440E−06 | −6.8742273E−07 |
| A7 | −2.3277578E−07 | 7.3453367E−08 |
| A8 | 3.0174811E−08 | −4.5209514E−09 |
| A9 | −1.8720490E−09 | 2.8405765E−10 |
| A10 | 3.0442191E−11 | −1.1025892E−11 |
| A11 | 1.5486017E−12 | 5.3554076E−14 |
| A12 | 8.9321390E−14 | 1.1611812E−15 |
| A13 | −1.8212927E−14 | 8.7299849E−16 |
| A14 | 8.3312913E−16 | −5.1594237E−17 |
| A15 | −1.4214044E−17 | 1.1107086E−18 |
| A16 | 5.5316899E−20 | −9.1667645E−21 |

Table 49 shows values corresponding to the conditional expressions (1) to (5) of the zoom lenses of Examples 1 to 12. It should be noted that, in the above-mentioned examples, the d line is set as the reference wavelength, and the values shown in the following Table 49 are values at the reference wavelength.

TABLE 49

| EXPRESSION NUMBER | CONDITIONAL EXPRESSION | EXAMPLE 1 | EXAMPLE 2 | EXAMPLE 3 | EXAMPLE 4 | EXAMPLE 5 | EXAMPLE 6 |
|---|---|---|---|---|---|---|---|
| (1) | \|fw\|/fA | 0.135 | 0.123 | 0.126 | 0.121 | 0.123 | 0.004 |
| (2) | \|fw\|/fB | 0.100 | 0.064 | 0.125 | 0.087 | 0.096 | 0.064 |
| (3) | fM/\|fw\| | 7.27 | 7.80 | 7.70 | 8.03 | 7.67 | 12.24 |
| (4) | Ymax/\|exPw\| | 0.03 | 0.04 | 0.03 | 0.04 | 0.04 | 0.05 |
| (5) | Bfw/\|fw\| | 4.16 | 4.61 | 4.23 | 4.17 | 4.17 | 7.54 |

| EXPRESSION NUMBER | CONDITIONAL EXPRESSION | EXAMPLE 7 | EXAMPLE 8 | EXAMPLE 9 | EXAMPLE 10 | EXAMPLE 11 | EXAMPLE 12 |
|---|---|---|---|---|---|---|---|
| (1) | \|fw\|/fA | 0.049 | 0.045 | 0.061 | 0.059 | 0.058 | 0.085 |
| (2) | \|fw\|/fB | 0.062 | 0.062 | 0.099 | 0.095 | 0.096 | 0.060 |
| (3) | fM/\|fw\| | 16.05 | 15.31 | 15.68 | 13.99 | 13.96 | 6.70 |

TABLE 49-continued

| | | | | | | | |
|---|---|---|---|---|---|---|---|
| (4) | Ymax/\|exPw\| | 0.02 | 0.02 | 0.02 | 0.02 | 0.02 | 0.03 |
| (5) | Bfw/\|fw\| | 8.01 | 7.87 | 10.12 | 10.08 | 10.08 | 6.96 |

As can be seen from the above-mentioned data, each of the zoom lenses of Examples 1 to 12 is a zoom lens of the system that satisfies conditional expressions (1) to (5) and forms an intermediate image, and is a zoom lens that has an F number as bright as 2.6 or less, has a total angle of view as a wide angle of 115° or more, and has high performance by satisfactorily suppressing fluctuation in aberrations during zooming.

Figure 25:
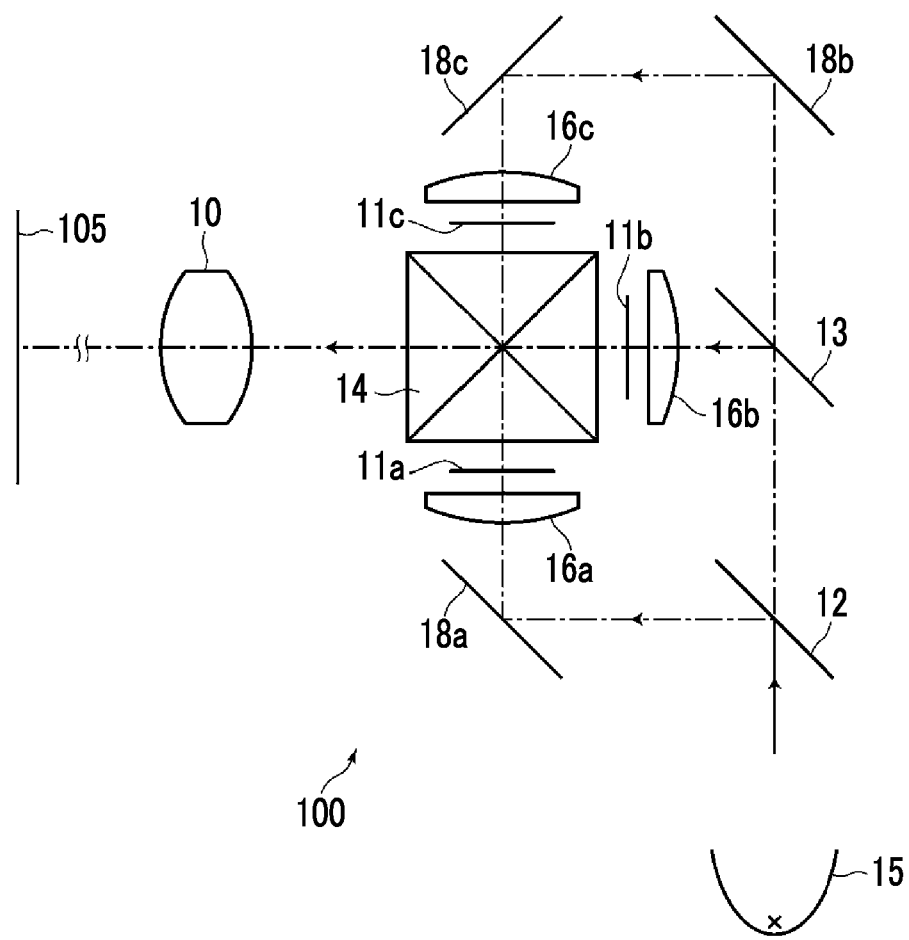
FIG. 25 is a schematic configuration diagram of a projection display device according to an embodiment of the present invention.

Next, a projection display device according to an embodiment of the present invention will be described. FIG. 25 is a schematic configuration diagram of the projection display device according to the embodiment of the present invention. The projection display device 100 shown in FIG. 25 has a zoom lens 10 according to the embodiment of the present invention, a light source 15, transmissive display elements 11a to 11c as light valves corresponding to respective color light beams, dichroic mirrors 12 and 13 for color separation, a cross dichroic prism 14 for color synthesis, condenser lenses 16a to 16c, and total reflection mirrors 18a to 18c for deflecting the optical path. In FIG. 25, the zoom lens 10 is schematically illustrated. Further, an integrator is disposed between the light source 15 and the dichroic mirror 12, but illustration thereof is omitted in FIG. 25.

White light originating from the light source 15 is separated into rays with three colors (G light, B light, R light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the zoom lens 10. The zoom lens 10 projects an optical image, which is formed by the light modulated through the transmissive display elements 11a to 11c, onto a screen 105.

Figure 26:
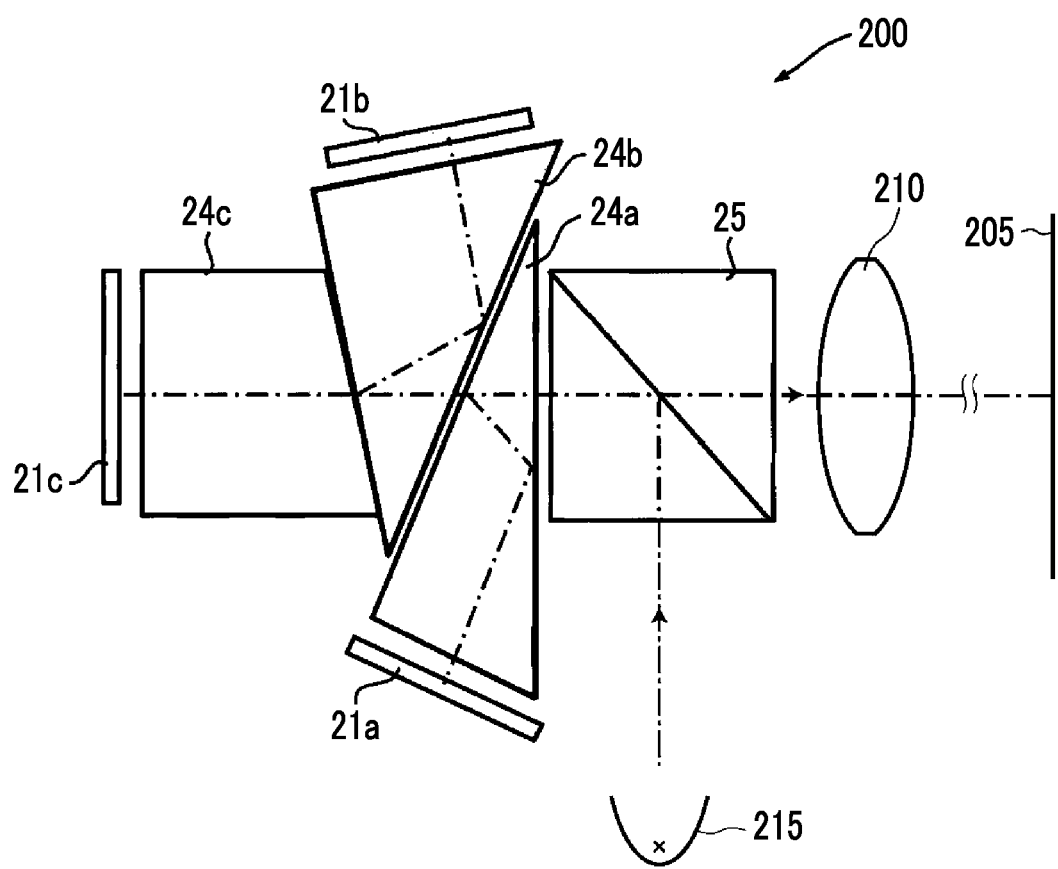
FIG. 26 is a schematic configuration diagram of a projection display device according to another embodiment of the present invention.

FIG. 26 is a schematic configuration diagram of a projection display device according to another embodiment of the present invention. The projection display device 200 shown in FIG. 26 has a zoom lens 210 according to the embodiment of the present invention, a light source 215, DMD elements 21a to 21c as light valves corresponding to respective color light beams, total internal reflection (TIR) prisms 24a to 24c for color separation and color synthesis, and a polarization separating prism 25 that separates illumination light and projection light. In FIG. 26, the zoom lens 210 is schematically illustrated. Further, an integrator is disposed between the light source 215 and the polarization separating prism 25, but illustration thereof is omitted in FIG. 26.

White light originating from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the zoom lens 210. The zoom lens 210 projects an optical image, which is formed by the light modulated through the DMD elements 21a to 21c, onto a screen 205.

Figure 27:
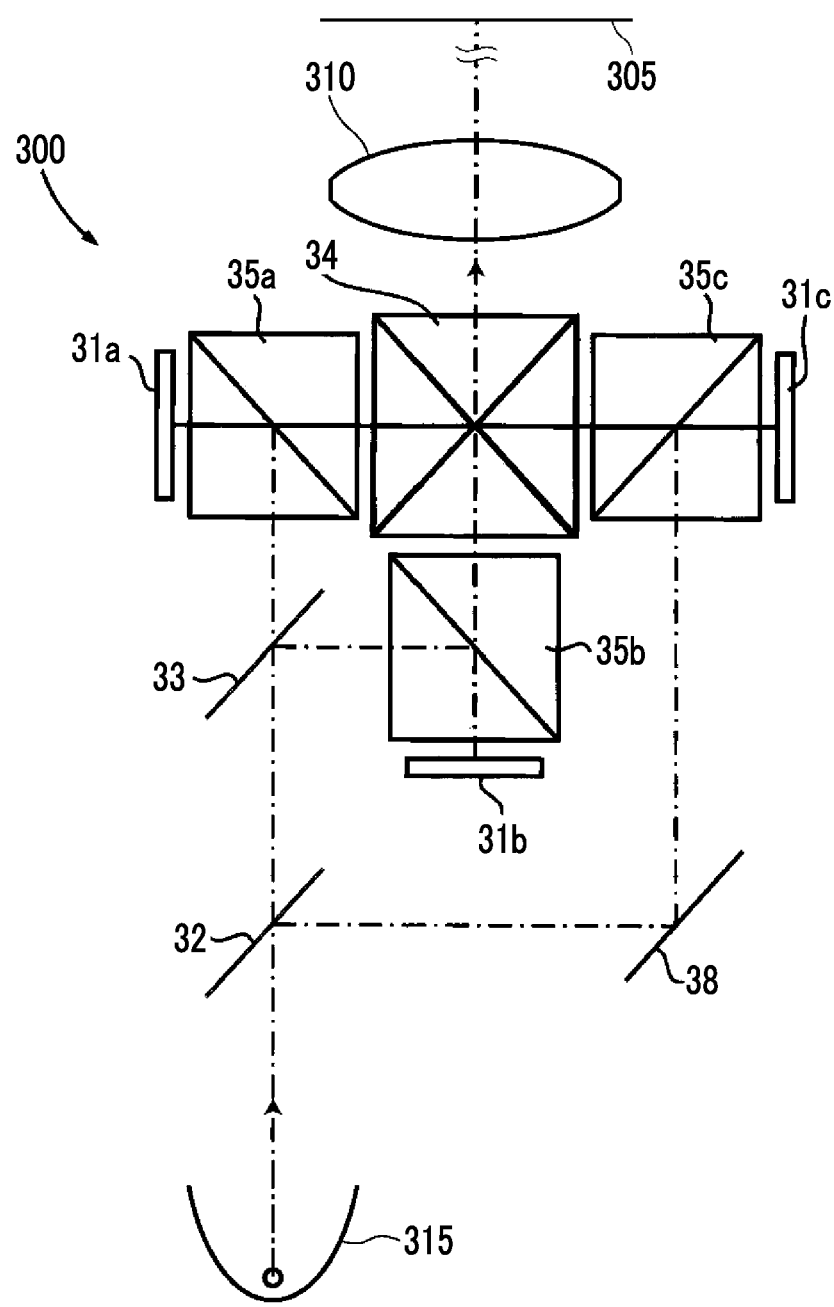
FIG. 27 is a schematic configuration diagram of a projection display device according to still another embodiment of the present invention.

FIG. 27 is a schematic configuration diagram of a projection display device according to still another embodiment of the present invention. The projection display device 300 shown in FIG. 27 has a zoom lens 310 according to the embodiment of the present invention, a light source 315, reflective display elements 31a to 31c as light valves corresponding to respective color light beams, dichroic mirrors 32 and 33 for color separation, a cross dichroic prism 34 for color synthesis, a total reflection mirror 38 for deflecting the optical path, and polarization separating prisms 35a to 35c. In FIG. 27, the zoom lens 310 is schematically illustrated. Further, an integrator is disposed between the light source 315 and the dichroic mirror 32, but illustration thereof is omitted in FIG. 27.

White light originating from the light source 315 is separated into rays with three colors (G light, B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the zoom lens 310. The zoom lens 310 projects an optical image, which is formed by the light modulated through the reflective display elements 31a to 31c, onto a screen 305.

Figure 28:
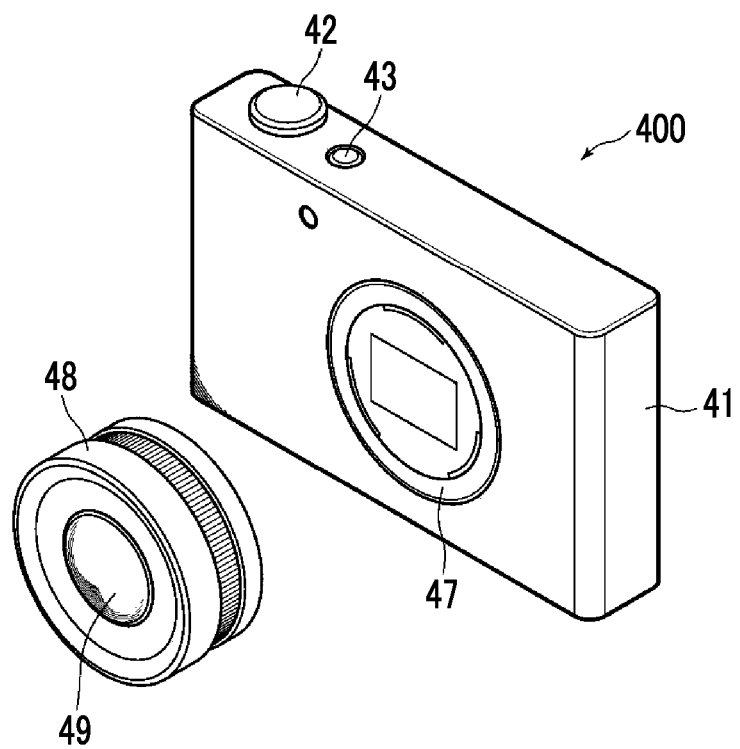
FIG. 28 is a perspective view of the front side of an imaging apparatus according to an embodiment of the present invention.
Figure 29:
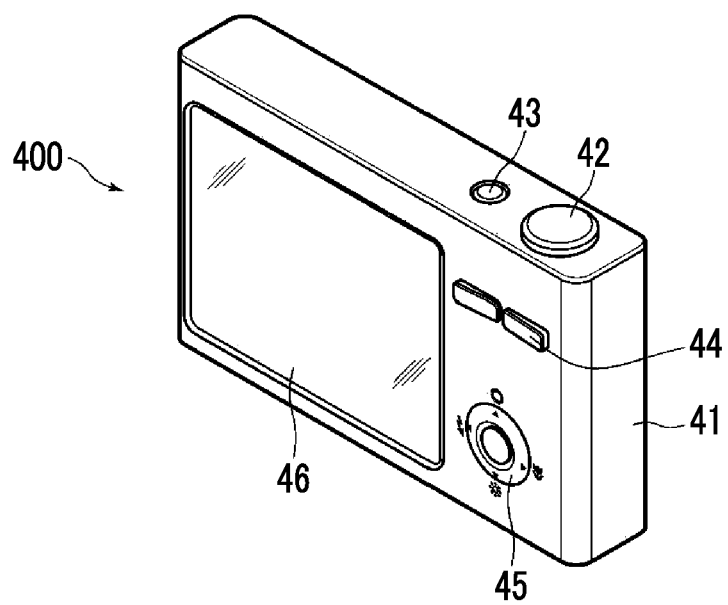
FIG. 29 is a perspective view of the rear side of the imaging apparatus shown in FIG. 28.

FIGS. 28 and 29 are external views of a camera 400 which is the imaging apparatus according to the embodiment of the present invention. FIG. 28 is a perspective view of the camera 400 viewed from the front side, and FIG. 29 is a perspective view of the camera 400 viewed from the rear side. The camera 400 is a single-lens digital camera on which an interchangeable lens 48 is detachably mounted and which has no reflex finder. The interchangeable lens 48 is configured such that a zoom lens 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown) such as a charge coupled device (CCD) outputs a captured image signal based on a subject image which is formed through the interchangeable lens 48. The signal processing circuit generates an image through processing of the captured image signal which is output from the imaging element. The recording medium records the generated image. The camera 400 captures a still image or a moving image by pressing the shutter button 42, and records image data, which is obtained through the recording medium.

The present invention has been hitherto described through embodiments and examples, but the zoom lens of the present invention is not limited to the above-mentioned embodiments and examples, and may be modified into various forms. For example, the radius of curvature, the surface spacing, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms.

Further, the imaging apparatus of the present invention is also not limited to the above-mentioned configurations. For example, the present invention may be applied to a single-lens reflex camera, a film camera, a video camera, and the like.

EXPLANATION OF REFERENCES

10, 210, 310: zoom lens
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: zoom lens
100, 200, 300: projection display device
105, 205, 305: screen
400: camera
G1 to G5: lens group
L1a to L5a: lens
PP, PP1, PP2: optical member
Sim: image display surface
St: aperture stop
wa: on-axis rays
wb: rays with maximum angle of view
Z: optical axis

What is claimed is:

1. A zoom lens that forms an intermediate image at a position conjugate to a reduction side imaging plane and forms the intermediate image again on a magnification side imaging plane, the zoom lens comprising
a plurality of lens groups including at least two movable lens groups, which move by changing spacings between lens groups among the plurality of lens groups that are adjacent to each other in a direction of an optical axis during zooming, at a position closer to a reduction side than the intermediate image,
wherein among the plurality of lens groups, a final lens group closest to the reduction side remains stationary with respect to the reduction side imaging plane during zooming,
an element of the zoom lens positioned most toward a magnification side is a lens; and
an F number of the zoom lens is 2.6 or less, and
wherein the following conditional expression (3) is satisfied, $$6 < fM/|fw| < 20, \qquad (3)$$

where fM is a focal length of the final lens group, and fw is a focal length of a whole system at a wide-angle end.

2. The zoom lens as defined in claim 1, wherein:
the final lens group consists of one lens.

3. The zoom lens as defined in claim 1, wherein:
the final lens group has a positive refractive power.

4. The zoom lens as defined in claim 1, comprising four or five lens groups as a whole,
wherein distances between adjacent lens groups change in the direction of the optical axis during zooming.

5. The zoom lens according to claim 1,
wherein the following conditional expression (1) is satisfied, $$0 < |fw|/fA < 0.145, \qquad (1)$$

where
fA is a focal length of a movable lens group closest to the reduction side among the plurality of movable lens groups.

6. The zoom lens according to claim 1,
wherein the following conditional expression (2) is satisfied, $$0.01 < |fw|/fB < 0.2, \qquad (2)$$

where
fB is a focal length of a second movable lens group from the reduction side among the plurality of movable lens groups.

7. The zoom lens according to claim 1,
wherein the following conditional expression (5) is satisfied, $$2 < Bfw/|fw|, \qquad (5)$$

where Bfw is a back focal length of a whole system as an air conversion length at a wide-angle end.

8. The zoom lens according to claim 5,
wherein the following conditional expression (1-1) is satisfied, $$0 < |fw|/fA < 0.14. \qquad (1\text{-}1)$$

9. The zoom lens according to claim 6,
wherein the following conditional expression (2-1) is satisfied, $$0.03 < |fw|/fB < 0.16. \quad (2\text{-}1)$$

10. The zoom lens according to claim 1,
wherein the following conditional expression (3-1) is satisfied, $$7 < fM/|fw| < 18. \quad (3\text{-}1)$$

11. The zoom lens according to claim 7,
wherein the following conditional expression (5-1) is satisfied, $$3 < Bfw/|fw| < 11. \quad (5\text{-}1)$$

12. The zoom lens according to claim 6,
wherein the following conditional expression (2-2) is satisfied, $$0.01 < |fw|/fB \le 0.1. \quad (2\text{-}2)$$

13. The zoom lens as defined in claim 1, wherein:
a total angle of view of the zoom lens is greater than or equal to 115 degrees.

14. The zoom lens as defined in claim 1, wherein:
a lens group closest to the magnification side remains stationary with respect to the reduction side imaging plane during zooming.

15. The zoom lens as defined in claim 1, wherein:
the zoom lens is telecentric on the reduction side.

16. A projection display device comprising:
a light valve from which an optical image is output based on image data; and
the zoom lens according to claim 1,
wherein the imaging optical system projects the optical image, which is output from the light valve, onto a screen.

17. An imaging apparatus comprising the zoom lens according to claim 1.

18. A zoom lens that forms an intermediate image at a position conjugate to a reduction side imaging plane and forms the intermediate image again on a magnification side imaging plane, the zoom lens comprising
a plurality of lens groups including at least two movable lens groups, which move by changing spacings between lens groups among the plurality of lens groups that are adjacent to each other in a direction of an optical axis during zooming, at a position closer to a reduction side than the intermediate image,
wherein among the plurality of lens groups, a final lens group closest to the reduction side remains stationary with respect to the reduction side imaging plane during zooming,
an element of the zoom lens positioned most toward a magnification side is a lens; and
an F number of the zoom lens is 2.6 or less, and
wherein the following conditional expression (4) is satisfied, $$0 < Y\text{max}/|exPw| < 0.1, \quad (4)$$

where Ymax is an effective image circle radius on the reduction side, and
exPw is a distance on the optical axis from the reduction side imaging plane to a paraxial exit pupil position at a wide-angle end in a case where the reduction side is set as an exit side.

19. The zoom lens according to claim 18,
wherein the following conditional expression (4-1) is satisfied, $$0 < Y\text{max}/|exPw| < 0.07. \quad (4\text{-}1)$$

20. A projection display device comprising:
a light valve from which an optical image is output based on image data; and
the zoom lens according to claim 18,
wherein the imaging optical system projects the optical image, which is output from the light valve, onto a screen.

21. An imaging apparatus comprising the zoom lens according to claim 18.

* * * * *